United States Patent
Sonehara

(10) Patent No.: US 7,607,779 B2
(45) Date of Patent: Oct. 27, 2009

(54) STEREOSCOPIC IMAGE DISPLAY DEVICE AND IMAGE DISPLAY DEVICE

(75) Inventor: Tomio Sonehara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 578 days.

(21) Appl. No.: 11/384,308

(22) Filed: Mar. 21, 2006

(65) Prior Publication Data

US 2006/0214875 A1    Sep. 28, 2006

(30) Foreign Application Priority Data

Mar. 28, 2005   (JP)   ............. 2005-090593
Mar. 28, 2005   (JP)   ............. 2005-090594
Mar. 28, 2005   (JP)   ............. 2005-090595

(51) Int. Cl.
*G03B 21/00*   (2006.01)

(52) U.S. Cl. ............. 353/7; 359/464; 359/465; 359/466; 359/477; 348/42; 348/47; 348/51; 348/52

(58) Field of Classification Search ........... 353/67, 353/8, 9, 10, 94, 7, 6; 348/42, 43, 44, 45, 348/46, 47, 48, 49, 50, 51, 52, 53, 54, 55, 348/56, 57, 58, 59, 60; 359/464, 465, 466, 359/471, 472, 475, 477, 479, 462, 463, 468, 359/469, 470, 473, 474, 476, 467
See application file for complete search history.

(56) References Cited

U.S. PATENT DOCUMENTS 5,902,030 A * 5/1999 Blanchard ............. 353/30
5,993,004 A   11/1999 Moseley et al.
7,130,119 B2 * 10/2006 Takahashi et al. ......... 359/462
2003/0227541 A1 * 12/2003 Aoki et al. .............. 348/58

FOREIGN PATENT DOCUMENTS

| JP | A 62-125341 | 6/1987 |
| JP | A 3-136028 | 6/1991 |
| JP | A 4-362623 | 12/1992 |
| JP | A 4-372938 | 12/1992 |
| JP | 08062722 A * | 3/1996 |
| JP | A-08-062722 | 3/1996 |
| JP | A 09-288314 | 11/1997 |

(Continued)

*Primary Examiner*—William C Dowling
*Assistant Examiner*—Bao-Luan Le
(74) *Attorney, Agent, or Firm*—Oliff & Berridge, PLC

(57) ABSTRACT

A stereoscopic image display device includes: a first display section emitting right-eye images composed of first-screen right-eye images and second-screen right-eye images; a second display section emitting left-eye images composed of first-screen left-eye images and second-screen left-eye images; a first reflecting section reflecting the first-screen right-eye images and the first-screen left-eye images; a second reflecting section reflecting the second-screen right-eye images and the second-screen left-eye images; a first screen onto which the first-screen right-eye images and the first-screen left-eye images, and on which parallax images are formed; a second screen onto which the second-screen right-eye images and the second-screen left-eye images, and on which parallax images are formed; and a parallax image selection section having a right-eye transmission section and a left-eye transmission section.

19 Claims, 28 Drawing Sheets

FOREIGN PATENT DOCUMENTS

| | | |
|---|---|---|
| JP | A 10-142557 | 5/1998 |
| JP | A-10-149089 | 6/1998 |
| JP | A 10-233982 | 9/1998 |
| JP | 11064975 A * | 3/1999 |
| JP | 2000122193 A * | 4/2000 |
| JP | A-2000-122175 | 4/2000 |
| JP | A 2000-122193 | 4/2000 |
| JP | A 2000-171896 | 6/2000 |
| JP | 2001136466 A * | 5/2001 |
| JP | A 2002-139794 | 5/2002 |
| JP | A 2003-141573 | 5/2003 |
| JP | A-2003-153136 | 5/2003 |
| JP | A 2004-4358 | 1/2004 |
| JP | A 2004-12628 | 1/2004 |
| JP | A 2004-96428 | 3/2004 |

\* cited by examiner

FIG. 29
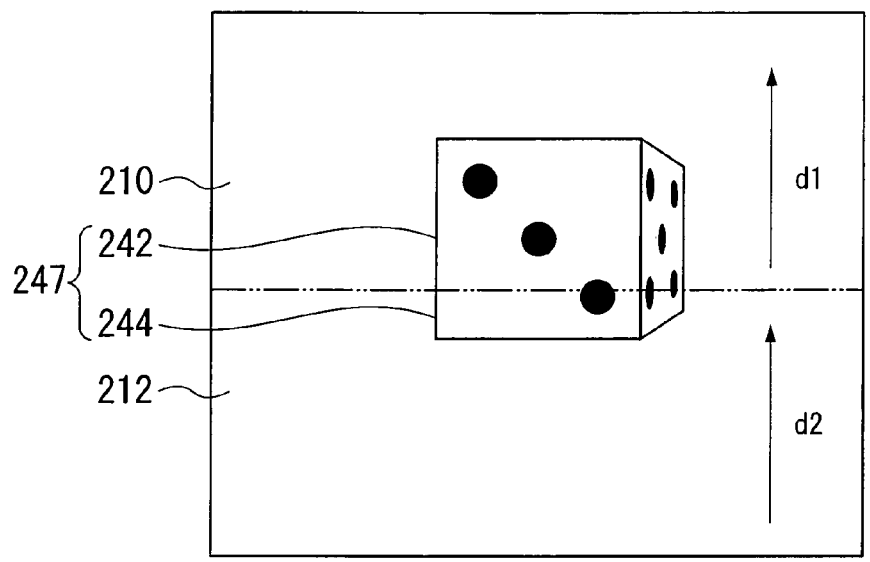
FIG. 30
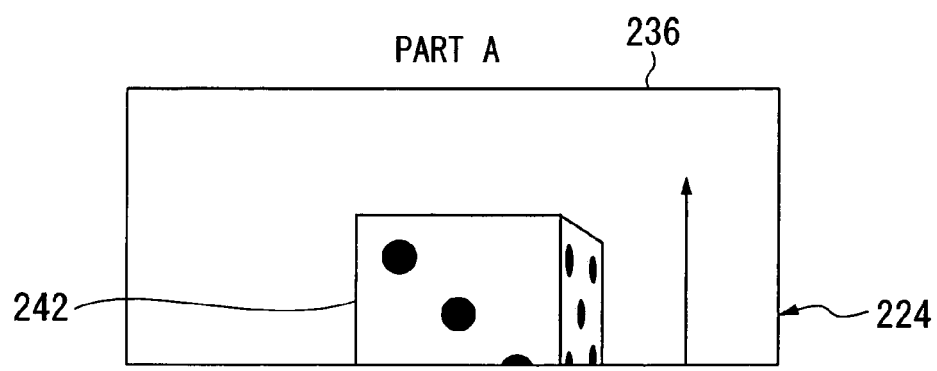
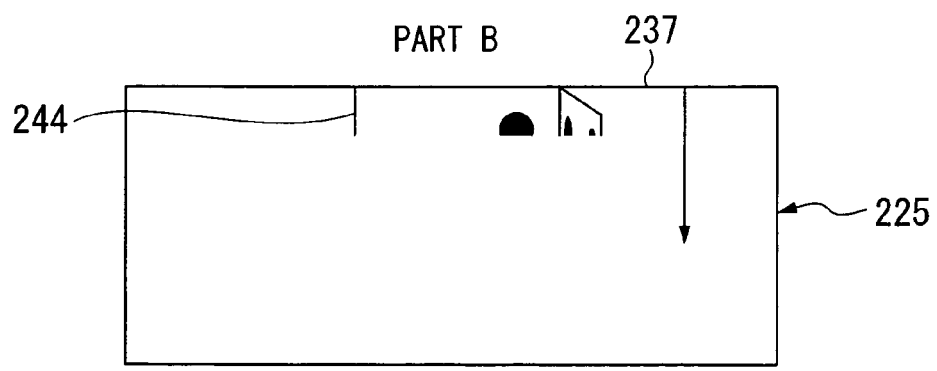

FIG. 33
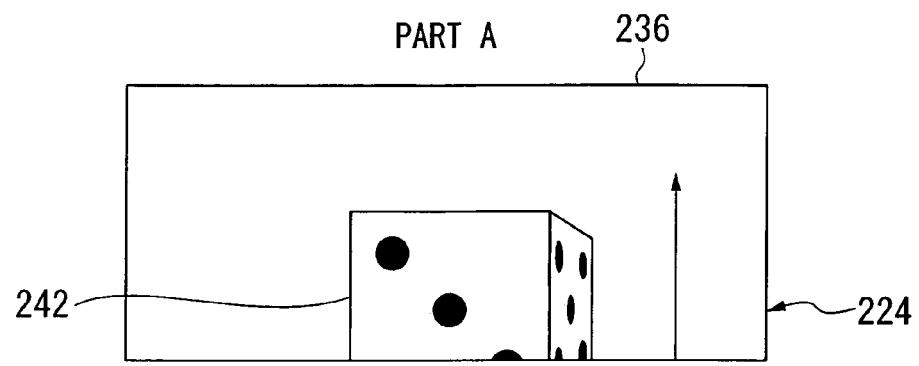
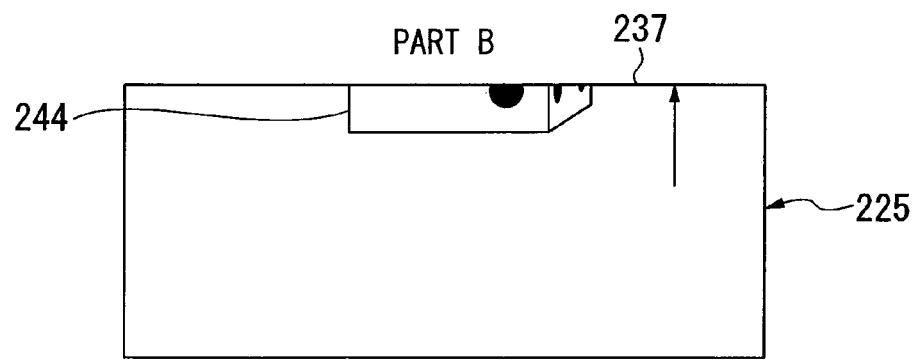
FIG. 34
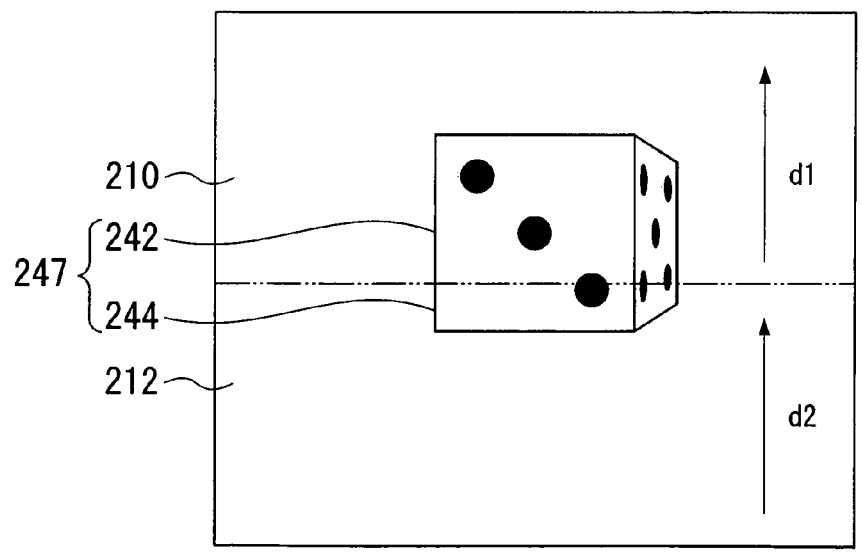

FIG. 36
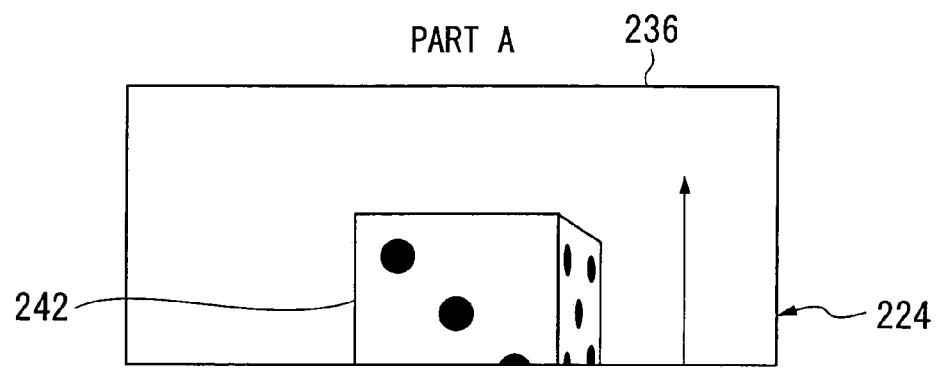
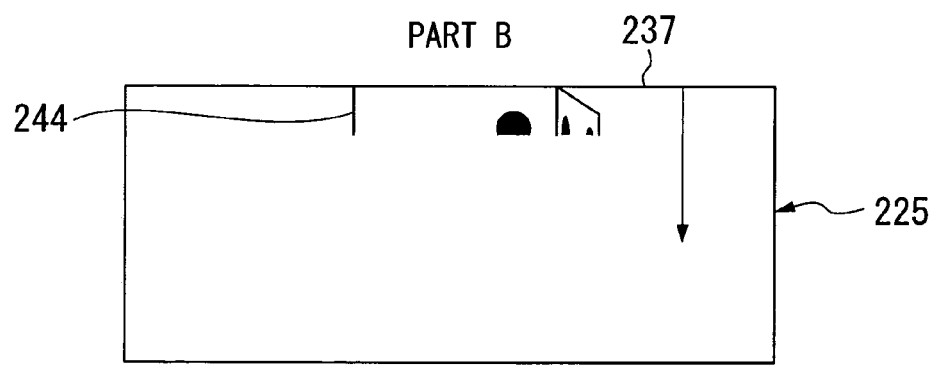
FIG. 37
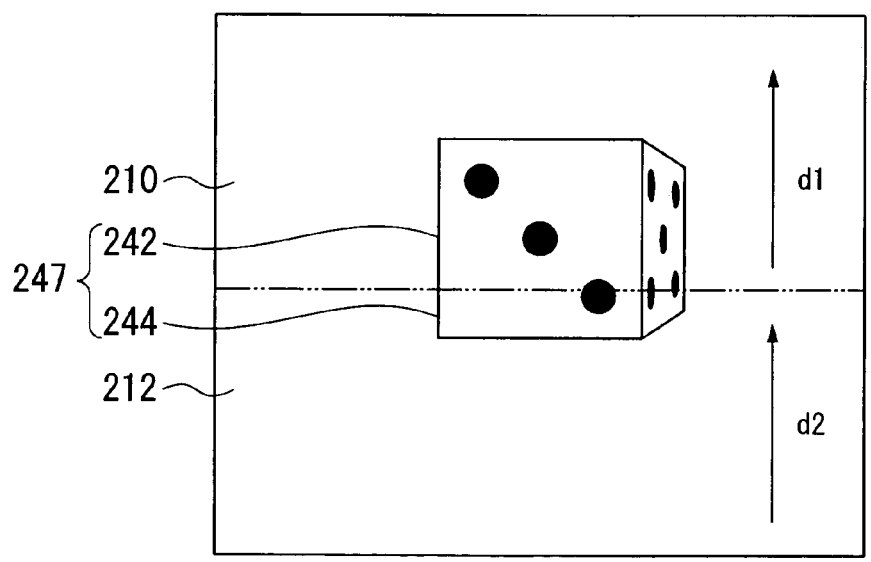

STEREOSCOPIC IMAGE DISPLAY DEVICE AND IMAGE DISPLAY DEVICE

CROSS-REFERENCE TO RELATED APPLICATION

This application claims priority to Japanese Patent Application 2005-090593 filed on Mar. 28, 2005, Japanese Patent Application 2005-090594 filed on Mar. 28, 2005, and Japanese Patent Application 2005-090595 filed on Mar. 28, 2005, the contents of which are incorporated herein by reference.

BACKGROUND

1. Technical Field

The present invention relates to a stereoscopic image display device and an image display device.

2. Related Art

According to a image display device, wide-ranging proposals have been made pertaining to, for example, rear projector image display devices projecting colored light from the rear of a screen, stereoscopic image display devices projecting colored light of mutually different polarization directions onto screens, wherein the projected images are perceived as stereoscopic images by the observer, and image devices projecting images from a plurality of projectors onto a plurality of large screens so as to give viewers a sense of presence.

In the invention disclosed in Japanese Unexamined Patent Application, First Publication No. 2000-122193, an image device is disclosed wherein images are projected onto four screens consisting of a front screen, left screen, right screen and floor screen from four projectors arranged so as to correspond to each screen. This invention provides images having a wide angle of visibility and a sense of presence to viewers.

In the invention disclosed in Japanese Unexamined Patent Application 10-233982, a virtual real system is disclosed wherein four screens are arranged at prescribed positions in a room, and prescribed images are displayed on each screen using four projectors arranged so as to respectively correspond to each screen, thereby satisfactorily realizing a sense of immersion and presence.

However, there are the following problems with the inventions disclosed in the aforementioned patent literature.

It is necessary to use large screens in order to provide viewers with images imparting a sense of presence. Accordingly, there is the problem in that a wide projection space is necessary in order to directly project images by projectors from the rear of the large screens. Furthermore, in the inventions disclosed in the aforementioned patent literature, it is necessary to use four (multiple) screens in order to ensure a wide angle of visibility. In addition, there is the problem in that, it is necessary to have four (multiple) projectors in order to project the images onto each screen. Moreover, there is the problem of increased cost due to the necessity of a plurality of screens, projectors, and a wide projection space.

SUMMARY

An advantage of some aspects of the invention is to provide a stereoscopic image display device and an image display device which are thinner, more compact and less expensive.

A first aspect of the invention provides a stereoscopic image display device including: a first display section emitting right-eye images composed of first-screen right-eye images and second-screen right-eye images; a second display section emitting left-eye images composed of first-screen left-eye images and second-screen left-eye images; a first reflecting section reflecting the first-screen right-eye images emitted from the first display section and the first-screen left-eye images emitted from the second display section; a second reflecting section reflecting the second-screen right-eye images emitted from the first display section and the second-screen left-eye images emitted from the second display section; a first screen onto which the first-screen right-eye images and the first-screen left-eye images that are reflected by the first reflecting section are projected, and on which parallax images composed of the first-screen right-eye images and the first-screen left-eye images are formed; a second screen onto which the second-screen right-eye images and the second-screen left-eye images that are reflected by the second reflecting section are projected, and on which parallax images composed of the second-screen right-eye images and the second-screen left-eye images are formed; and a parallax image selection section having a right-eye transmission section transmitting only the first-screen right-eye images and the second-screen right-eye images among the parallax images projected onto the first screen and the second screen, and a left-eye transmission section transmitting only the first-screen left-eye images and the second-screen left-eye images among the parallax images projected onto the first screen and the second screen.

According to this configuration, the right-eye images emitted from the first display section and the left-eye images emitted from the second display section are reflected by the reflecting section, and respectively projected onto the first screen and the second screen. Thus, in the first aspect of the invention, the images emitted from the display section are refracted (reflected) by the reflecting section, and projected onto the screens. Consequently, it is possible to narrow the projection space compared to the case where the images are directly projected from the rear of the screen. Moreover, according to the first aspect of the invention, it is possible to form parallax images and realize stereoscopic images by the two display section of the first display section and the second display section. Accordingly, it is possible to achieve thinner and more compact stereoscopic image display devices, and to reduce costs.

It is preferable that, in the stereoscopic image display device of the first aspect of the invention, an optical path length of an optical axis of the first-screen right-eye images from a point of the emission of the first-screen right-eye images by the first display section to a point of the projection of the first-screen right-eye images onto the first screen via the first reflecting section be identical to an optical path length of an optical axis of the second-screen right-eye images from a point of the emission of the second-screen right-eye images by the first display section to a point of the projection of the second-screen right-eye images onto the second screen via the-second reflecting section.

According to this configuration, the optical path length of the optical axis of the right-eye images from the first display section to their projection onto the first screen via the first reflecting section, and the optical path length of the optical axis of the right-eye images from the first display section to their projection onto the second screen via the second reflecting section, are optically equidistant, with the result that the focal points of the respective images projected onto each screen are identical. Consequently, it is possible to prevent the right-eye images projected onto the two screens of the first screen and the second screen from becoming out of focus.

It is preferable that, in the stereoscopic image display device of the first aspect of the invention, an optical path length of an optical axis of the first-screen left-eye images from a point of the emission of the first-screen left-eye images by the second display section to a point of the projection of the first-screen left-eye images onto the first screen via the first reflecting section be identical to an optical path length of an optical axis of the second-screen left-eye images from a point of the emission of the second-screen left-eye images by the second display section to a point of the projection of the second-screen left-eye images onto the second screen via the second reflecting section.

According to this configuration, the optical path length of the optical axis of the left-eye images from the second display section to their projection onto the first screen via the first reflecting section, and the optical path length of the optical axis of the left-eye images from the second display section to their projection onto the second screen via the second reflecting section, are optically equidistant, with the result that the focal points of the respective images projected onto each screen are identical. Consequently, it is possible to prevent the left-eye images projected onto the two screens of the first screen and the second screen from becoming out of focus.

It is preferable that, the stereoscopic image display device of the first aspect of the invention, further include: a first polarizing plate converting the right-eye images emitted from the first display section to a polarized light of a first direction; and a second polarizing plate converting the left-eye images emitted from the second display section to a polarized light of a second direction which intersects the first direction, the right-eye transmission section of the parallax image selection section transmit the polarized light of the first direction, and the left-eye transmission section transmit the polarized light of the second direction.

According to this configuration, the right-eye images become the polarized light of the first direction, while the left-eye images become the polarized light of the second direction. Consequently, parallax images of mutually different polarization directions can be formed on the screens by the right-eye images and the left-eye images. Accordingly, it is possible to obtain stereoscopic images by selecting fixed polarization directions using the parallax image selection section.

It is preferable that, the stereoscopic image display device of the first aspect of the invention, further include: a first wavelength separation section transmitting a light of a first wavelength band among the right-eye images emitted from the first display section; and a second wavelength separation section transmitting a light of a second wavelength band among the left-eye images emitted from the second display section, the right-eye transmission section of the parallax image selection section transmit the light of the first wavelength band, and the left-eye transmission section transmit the light of the second wavelength band.

According to this configuration, image light in the prescribed wavelength bands is obtained by using, for example, band pass filters in the separation section. For example, image light emitted from the first display section is transmitted only in the wavelength band of the color red, while image light emitted from the second display section is transmitted only in the wavelength band of the color blue. Consequently, parallax images of red and blue are projected onto the screens, and anaglyph stereoscopic images are obtained.

It is preferable that, in the stereoscopic image display device of the first aspect of the invention, at least one of the first reflecting section and the second reflecting section be arranged in a plurality behind the first screen and the second screen.

According to this configuration, as there is installation of a plurality of reflecting sections, the images can be subjected to a plurality of refractions, and projected onto the respective screens. Consequently, the projection space can be narrowed, and further economy of space can be achieved. Accordingly, it is possible to achieve thinner and more compact stereoscopic image display devices, and to reduce costs.

It is preferable that, in the stereoscopic image display device of the first aspect of the invention, the first screen be arranged in front of the parallax image selection section, the second screen extend from the lower end of the first screen toward the parallax image selection section.

It is also preferable that the first screen be the front screen, and that the second screen be the bottom screen.

According to this configuration, the optimal screen arrangement for the angle of visibility of the viewer is obtained by providing the two screens of the front screen and the bottom screen. Consequently, it is possible to reproduce a natural three-dimensional sense, and to realize stereoscopic images imparting a sense of presence.

It is preferable that, in the stereoscopic image display device of the first aspect of the invention, the first-screen right-eye images emitted from the first display section be reflected an odd number of times or an even number of times by the first reflecting section, and projected onto the first screen, the second-screen right-eye images emitted from the first display section be reflected an even number of times and projected onto the second screen, in the case where the first reflecting section conduct reflection an odd number of times and conduct projection onto the first screen, the second-screen right-eye images emitted from the first display section be reflected an odd number of times and projected onto the second screen, in the case where the first reflecting section conduct reflection an even number of times and conduct projection onto the first screen, and the second-screen right-eye images emitted from the first display section be emitted in a vertically inverted manner relative to the first-screen right-eye images emitted from the first display section.

It is preferable that, in the stereoscopic image display device of the first aspect of the invention, the first-screen left-eye images emitted from the second display section be reflected an odd number of times or an even number of times by the first reflecting section, and projected onto the first screen, the second-screen left-eye images emitted from the second display section be reflected an even number of times and projected onto the second screen, in the case where the first reflecting section conduct reflection an odd number of times and conduct projection onto the first screen, the second-screen left-eye images emitted from the second display section be reflected an odd number of times and projected onto the second screen, in the case where the first reflecting section conduct reflection an even number of times and conduct projection onto the first screen, and the second-screen left-eye images emitted from the second display section be emitted in a vertically inverted manner relative to the first-screen left-eye images emitted from the second display section.

In the case where the first reflecting section conducts reflection an odd number of times and the second reflecting section an even number of times, or where the first reflecting section conducts reflection an even number of times and the second reflecting section an odd number of times, images are projected in a vertically (top-bottom) inverted manner onto one or the other of the first screen or the second screen based on the relation of the plurality of reflecting mirrors arranged inside the case so that the image light reflected from the plurality of reflecting mirrors is not reflected or blocked by counterpart reflecting mirrors. According to this invention, the second-screen right-eye images (second-screen left-eye images) emitted from the display section are emitted in advance in a vertically inverted manner. Thus, according to the conditions of the plurality of reflecting mirrors, the second-screen right-eye images (second-screen left-eye images) emitted in a vertically inverted manner are projected onto the second screen in a vertically inverted manner. Consequently, the first-screen right-eye image (first-screen left-eye image) and the second-screen right-eye image (second-screen left-eye image) of the same direction are synthesized and projected, and a continuous image is formed on the first screen and the second screen.

A second aspect of the invention provides a stereoscopic image display device including: a display section conducting time-division emission of right-eye images composed of first-screen right-eye images and second-screen right-eye images, and left-eye images composed of first-screen left-eye images and second-screen left-eye images; a first reflecting section reflecting the first-screen right-eye images and the first-screen left-eye images that are emitted with time-division from the display section; a second reflecting section reflecting the second-screen right-eye images and the second-screen left-eye images that are emitted with time-division from the display section; a first screen onto which the first-screen right-eye images and the first-screen left-eye images reflected by the first reflecting section are projected with time-division; a second screen onto which the second-screen right-eye images and the second-screen left-eye images reflected by the second reflecting section are projected with time-division; and an image selection section having a right-eye transmission section transmitting the right-eye images which are projected with time-division onto the first screen and the second screen, and a left-eye transmission section transmitting the left-eye images which are projected with time-division onto the first screen and the second screen.

According to this configuration, the right-eye images and left-eye images emitted from the display section are reflected by the reflecting section, and respectively projected onto the first screen and the second screen. Thus, in the second aspect of the invention, the images emitted from the display section are refracted (reflected) by the reflecting section, and projected onto the screens. Consequently, it is possible to narrow the projection space compared to the case where images are directly projected from the rear of the screen.

Moreover, according to the second aspect of the invention, the images emitted from the display section can be projected onto the two screens by one display section, enabling projection onto multiple screens by one display section.

Furthermore, according to the second aspect of the invention, parallax images composed of right-eye images and left-eye images are formed on each screen by time-division projection of right-eye images and left-eye images onto each screen.

In synchronization with this, the image selection section is driven with time-division, right-eye images and left-eye images alternately enter the eyes of the viewer, and stereoscopic images are perceived.

Accordingly, it is possible to achieve thinner and more compact stereoscopic image display devices, and to reduce costs.

It is preferable that, in the stereoscopic image display device of the second aspect of the invention, an optical path length of an optical axis of the first-screen right-eye images from a point of the emission of the first-screen right-eye images by the display section to a point of the projection of the first-screen right-eye images onto the first screen via the first reflecting section be identical to an optical path length of an optical axis of the second-screen right-eye images from a point of the emission of the second-screen right-eye images by the display section to a point of the projection of the second-screen right-eye images onto the second screen via the second reflecting section.

According to this configuration, the optical path length of the optical axis of the first-screen right-eye images from the display section to their projection onto the first screen via the first reflecting section, and the optical path length of the optical axis of the right-eye images from the display section to their projection onto the second screen via the second reflecting section, are optically equidistant, with the result that the focal points of the respective images projected onto each screen are identical. Consequently, it is possible to prevent the right-eye images projected onto the two screens of the first screen and the second screen from becoming out of focus.

It is preferable that, in the stereoscopic image display device of the second aspect of the invention, an optical path length of an optical axis of the first-screen left-eye images from a point of the emission of the first-screen left-eye images by the display section to a point of the projection of the first-screen left-eye images onto the first screen via the first reflecting section be identical to an optical path length of an optical axis of the second-screen left-eye images from a point of the emission of the second-screen left-eye images by the display section to a point of the projection of the second-screen left-eye images onto the second screen via the second reflecting section.

According to this configuration, the optical path length of the optical axis of the first-screen left-eye images from the display section to their projection onto the first screen via the first reflecting section, and the optical path length of the optical axis of the left-eye images from the display section to their projection onto the second screen via the second reflecting section, are optically equidistant, with the result that the focal points of the respective images projected onto each screen are identical. Consequently, it is possible to prevent the left-eye images projected onto the two screens of the first screen and the second screen from becoming out of focus.

It is preferable that, in the stereoscopic image display device of the second aspect of the invention, the image selection section be liquid-crystal shutter spectacles.

According to this configuration, it is possible to realize stereoscopic images from the selective transmission by liquid crystal shutter spectacles of parallax images projected onto the first screen and second screen.

It is preferable that, in the stereoscopic image display device of the second aspect of the invention, at least one or the other of the first reflecting section and second reflecting section be arranged in a plurality behind the first screen and the second screen.

According to this configuration, as there is installation of a plurality of reflecting section, the images can be subjected to a plurality of refractions, and projected onto each screen. Consequently, the projection space can be narrowed, and further economy of space can be achieved. Accordingly, it is possible to achieve thinner and more compact stereoscopic image display devices, and to reduce costs.

It is preferable that, in the stereoscopic image display device of the second aspect of the invention, the first screen be arranged in front of the image selection section, and the second screen extends from the lower end of the first screen toward the image selection section.

It is also preferable that the first screen be the front screen, and that the second screen be the bottom screen.

According to this configuration, the optimal screen arrangement for the angle of visibility of the viewer is obtained by providing the two screens of the front screen and the bottom screen. Consequently, it is possible to realize stereoscopic images imparting a sense of presence.

It is preferable that, in the stereoscopic image display device of the second aspect of the invention, the first-screen right-eye images emitted from the display section be reflected an odd number of times or an even number of times by the first reflecting section, and projected onto the first screen, the second-screen right-eye images emitted from the display section be reflected an even number of times and projected onto the second screen, in the case where the first reflecting section conduct reflection an odd number of times and conduct projection onto the first screen, the second-screen right-eye images emitted from the display section be reflected an odd number of times and projected onto the second screen, in the case where the first reflecting section conduct reflection an even number of times and conduct projection onto the first screen, and the second-screen right-eye images emitted from the display section be emitted in a vertically inverted manner relative to the first-screen right-eye images emitted from the display section.

It is preferable that, in the stereoscopic image display device of the second aspect of the invention, the first-screen left-eye images emitted from the display section be reflected an odd number of times or an even number of times by the first reflecting section, and projected onto the first screen, the second-screen left-eye images emitted from the display section be reflected an even number of times and projected onto the second screen, in the case where the first reflecting section conduct reflection an odd number of times and conduct projection onto the first screen; the second-screen left-eye-images emitted from the display section be reflected an odd number of times and projected onto the second-screen, in the case where the first reflecting section conduct reflection an even number of times and conduct projection onto the first screen, and the second-screen left-eye images emitted from the display section be emitted in a vertically inverted manner relative to the first-screen left-eye images emitted from the display section.

In the case where the first reflecting section conducts reflection an odd number of times and the second reflecting section an even number of times, or where the first reflecting section conducts reflection an even number of times and the second reflecting section an odd number of times, images are projected in a vertically (top-bottom) inverted manner onto one or the other of the first screen or the second screen based on the relation of the plurality of reflecting mirrors arranged inside the case so that the image light reflected from the plurality of reflecting mirrors is not reflected or blocked by counterpart reflecting mirrors. According to this invention, the second-screen right-eye images (second-screen left-eye images) emitted from the display section are emitted in advance in a vertically inverted manner. Thus, according to the conditions of the plurality of reflecting mirrors, the second-screen right-eye images (second-screen left-eye images) emitted in a vertically inverted manner are projected onto the first screen or the second screen in a vertically inverted manner. Consequently, the first-screen right-eye images (first-screen left-eye images) and the second-screen right-eye images (second-screen left-eye images) of the same direction are synthesized and projected, and continuous images are formed on the first screen and the second screen.

A third aspect of the invention provides an image display device including: a first display section emitting first-screen images; a second display section emitting second-screen images; a first reflecting section reflecting the first-screen images emitted from the first display section; a second reflecting section reflecting the second-screen images emitted from the second display section; a first screen onto which the first-screen images reflected by the first reflecting section are projected; and a second screen onto which the second-screen images reflected by the second reflecting section are projected, wherein the first reflecting section and the second reflecting section are provided behind the first screen and the second screen, and at least one of the first reflecting section and the second reflecting section is provided in a plurality.

According to this configuration, the first-screen images emitted from the first display section are reflected by the first reflecting section, and projected onto the first screen, and the second-screen images emitted from the second display section are reflected by the second reflecting section, and projected onto the second screen. Thus, in the third aspect of the invention, the respective images emitted from the respective display section are subjected to a plurality of refractions (reflections) by the reflecting section, and projected onto the screens. Consequently, it is possible to narrow the projection space compared to the case where the images are directly projected from the rear of the screen. Accordingly, it is possible to achieve thinner and more compact image display devices, and to reduce costs.

In addition, it is possible to provide images that impart a sense of presence to viewers by providing two screens (multiple screens).

It is preferable that, in the image display device of the third aspect of the invention, an optical path length of an optical axis of the first-screen images from a point of the emission of the first-screen images by the first display section to a point of the projection of the first-screen images onto the first screen via the first reflecting section be identical to an optical path length of an optical axis of the second-screen images from a point of the emission of the second-screen images by the second display section to a point of the projection of the second-screen images onto the second screen via the second reflecting section.

According to this configuration, the optical path length of the optical axis of the first-screen images from the first display section to their projection onto the first screen, and the optical path length of the optical axis of the second-screen images from the second display section to their projection onto the second screen, are optically equidistant, with the result that the focal points of the respective images projected onto each screen are identical. Consequently, it is possible to prevent the two images projected onto the two screens of the first screen and the second screen from becoming out of focus.

It is preferable that, in the image display device of the third aspect of the invention, the second screen extend from the lower end of the first screen.

It is also preferable that the first screen be the front screen, and that the second screen be the bottom screen.

According to this configuration, the optimal screen arrangement for the angle of visibility of the viewer is obtained by providing the two screens of the front screen and the bottom screen. Consequently, it is possible to realize images that are natural and impart a sense of presence.

It is preferable that, in the image display device of the third aspect of the invention, the first-screen images emitted from the first display section be reflected an odd number of times or an even number of times by the first reflecting section, and projected onto the first screen, the second-screen images emitted from the second display section be reflected an even number of times by the second reflecting section and projected onto the second screen, in the case where the first reflecting section conduct reflection an odd number of times, the second-screen images emitted from the second display section be reflected an odd number of times by the second reflecting section and projected onto the second screen, in the case where the first reflecting section conduct reflection an even number of times, and the second-screen images emitted from the second display section be emitted in a vertically inverted manner relative to the first-screen images emitted from the first display section.

In the case where the first reflecting section conducts reflection an odd number of times and the second reflecting section an even number of times, or where the first reflecting section conducts reflection an even number of times and the second reflecting section an odd number of times, images are projected in a vertically (top-bottom) inverted manner onto one or the other of the first screen or the second screen based on the relation of the plurality of reflecting mirrors arranged inside the case so that the image light reflected from the plurality of reflecting mirrors is not reflected or blocked by counterpart reflecting mirrors. According to this invention, the images emitted from the second display section are emitted in advance in a vertically inverted manner. Thus, according to the conditions of the plurality of reflecting mirrors, the second-screen images emitted in a vertically inverted manner are projected onto the second screen in a vertically inverted manner. Consequently, the first-screen images and the second-screen images of the same direction are synthesized, and continuous images are projected onto the first screen and the second screen.

BRIEF DESCRIPTION OF THE DRAWINGS

The invention will be described with reference to the accompanying drawings, wherein like numbers reference like elements.

FIG. 29 is a view of images projected onto the screens of the image display device pertaining to the eighth embodiment.

FIG. 30 is a plan view of a display region of a liquid crystal light valve of each projector of the image display device pertaining to the eighth embodiment.

FIG. 33 is a plan view of a display region of a liquid crystal light valve of each projector of the image display device pertaining to the ninth embodiment.

FIG. 34 is a view of images projected onto the screens of the image display device pertaining to the ninth embodiment.

FIG. 36 is a plan view of a display region of a liquid crystal light valve of each projector of the image display device pertaining to the tenth embodiment.

FIG. 37 is a view of images projected onto the screens of the image display device pertaining to the tenth embodiment.

DESCRIPTION OF EXEMPLARY EMBODIMENTS

Embodiments are described below with reference to drawings. In the following descriptions, an XYZ orthogonal coordinate system is set, and the positional relations of the various members are described in reference to this XYZ orthogonal coordinate system. The specified direction in a horizontal plane is set as the X-axis direction, the direction that is orthogonal to the X-axis direction in the horizontal plane is set as the Y-axis direction, and the direction that is respectively orthogonal to the X-axis direction and Y-axis direction (that is, the vertical direction) is set as the Z-axis direction.

First Embodiment

Figure 1:
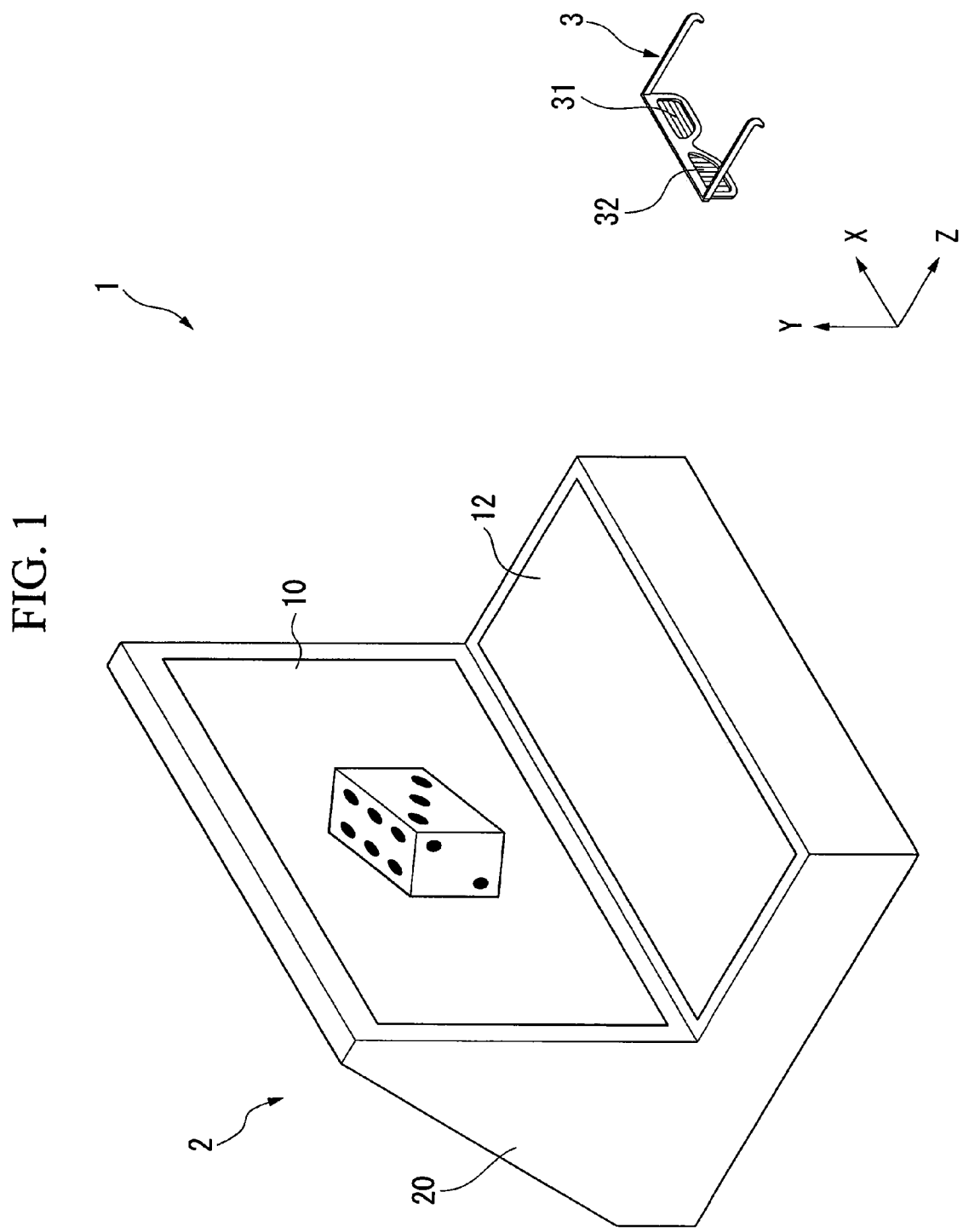
FIG. 1 is a perspective view of the schematic configuration of a stereoscopic image display device.

FIG. 1 is a perspective view of the schematic configuration of a stereoscopic image display device 1 pertaining to the first embodiment. The stereoscopic image display device 1 of the first embodiment is configured from an image display device 2 for displaying parallax images and spectacles 3 (a parallax image selection section) for generating stereoscopic images from parallax images.

As shown in FIG. 1, the spectacles 3 are worn by the viewer, and are provided with a right-eye transmission section 31 for transmitting only the right-eye images among the parallax images displayed on the screen, and a left-eye transmission section 32 for transmitting only the left-eye images among the parallax images displayed on the screen. Specifically, in the right-eye transmission section 31, a polarization axis forms in parallel with the X-axis direction that transmits, for example, only right-eye images of polarized light s. On the other hand, in the left-eye transmission section 32, a polarization axis forms in parallel with the Y-axis direction that transmits, for example, only left-eye images of polarized light p.

Next, the image display device 2 is described.

As shown in FIG. 1, the image display device 2 is composed of screens 10 and 12 onto which the images are projected, and a case 20 provided on the rear side of the screens 10 and 12.

As shown in FIG. 1, the screens 10 and 12 consist of a front screen 10 (first screen) arranged in front of the viewer, and a bottom screen 12 (second screen) arranged on the bottom side of the viewer. The bottom screen 12 extends toward the viewer from the lower end of the front screen 10, whereby a continuous integrated screen is formed by the front screen 10 and the bottom screen 12.

Figure 2:
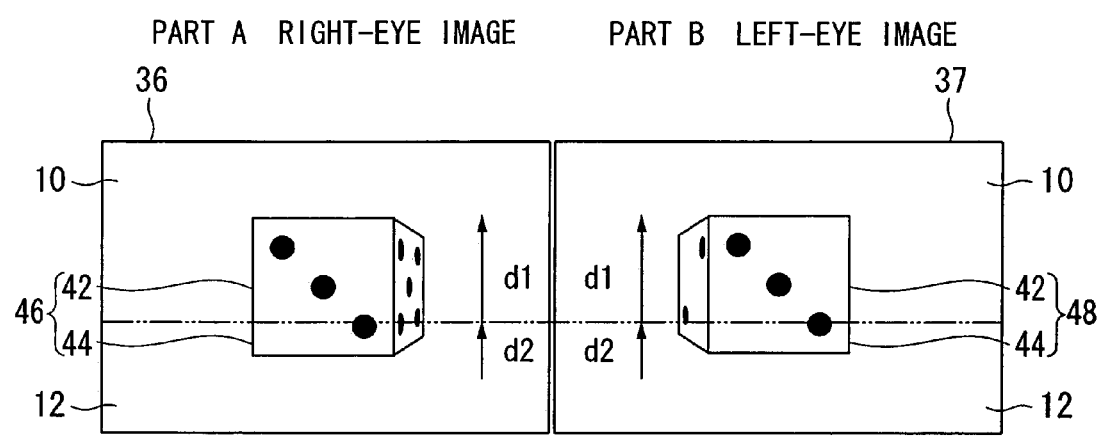
FIG. 2 is a view of images projected onto screens.
Figure 3:
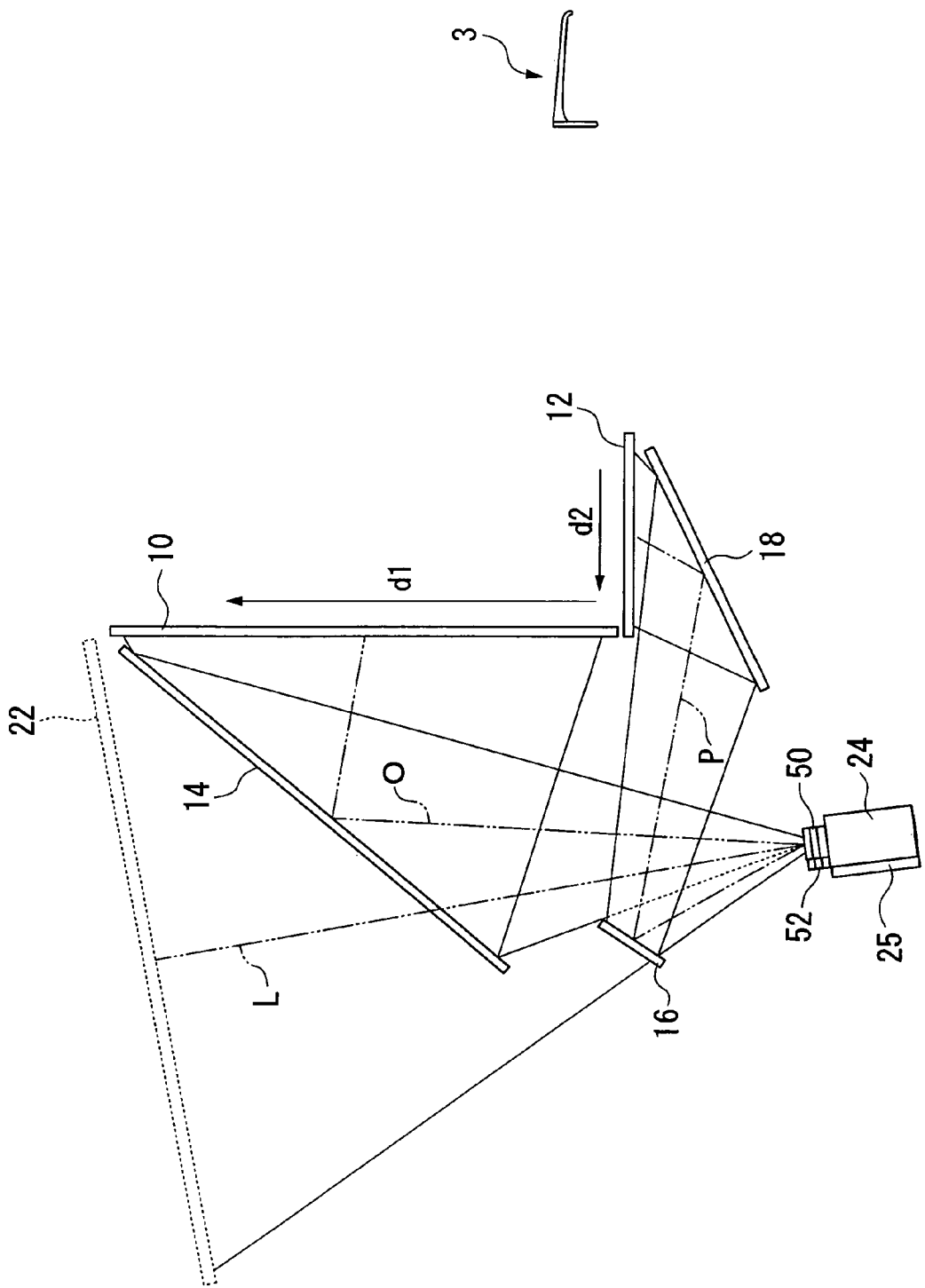
FIG. 3 is a cross-sectional view of the schematic configuration of the image display device pertaining to the first embodiment.

FIG. 2 Part A and Part B are views for the case where the front screen 10 and bottom screen 12 are seen from the viewer side. As shown in FIG. 2 Part A, a front-screen right-eye image 42 (first-screen right-eye image) is projected onto the front screen 10, while a bottom-screen right-eye image 44 (second-screen right-eye image) is projected onto the bottom screen 12. A continuous image 46 is formed by the front-screen right-eye image 42 and bottom-screen right-eye image 44. The direction of the arrow marks shown on the front screen 10 in FIG. 2 and the below-mentioned FIG. 3 is the direction in which the images are frontal when the viewer views the images, and this arrow-mark direction is referred to as image front direction d1 in the first embodiment. Similarly, the arrow-mark direction of the bottom screen 12 is referred to as image front direction d2. As the left-eye images projected in FIG. 2 Part B are similar to the above-described right-eye images (first-screen left-eye image and second-screen left-eye image), a description thereof is omitted.

Next, the internal structure of the case 20 of the image display device 2 of the first embodiment is described in detail.

FIG. 3 is a cross-sectional view of a typical schematic configuration of the interior of the case 20 of the image display device 2 of the first embodiment.

The interior of the case 20 of the image display device 2 is provided with a right-eye image projector 24 and a left-eye image projector 25 for generating images for projection onto the screens, and with a front-screen reflecting mirror 14 (first reflecting section), a first bottom-screen reflecting mirror 16 (second reflecting section) and a second bottom-screen reflecting mirror 18 (second reflecting section) for reflecting the generated images and guiding them in the direction of the screens. The following description pertains first to the right-eye image projector 24.

The right-eye image projector 24 is a projector for generating right-eye images, and is arranged at the bottom rear inside the case 20 so that its emission side is inclined at the prescribed angle relative to the projection surfaces of the screens 10 and 12. As the right-eye image projector 24, a 3-panel (3-LCD system) liquid crystal projector is used which employs three liquid crystal light valves as the optical modulation elements.

With this method, a dichroic mirror transmits only light of the specified wavelength from the light emitted by a light source, and splits it into R (red), G (green) and B (blue); the light that has passed through each light valve is synthesized with a dichroic prism, and is then projected onto the screen. It is also possible to use a single-panel liquid crystal projector employing one light valve as the optical modulation element, and a projector employing a micro-mirror array device as the optical modulation element.

In addition, a first polarizing plate 50 for transmitting and emitting only the polarized light s which is parallel to the X-axis direction (first direction) is arranged on the emission side of the right-eye image projector 24.

Figure 4:
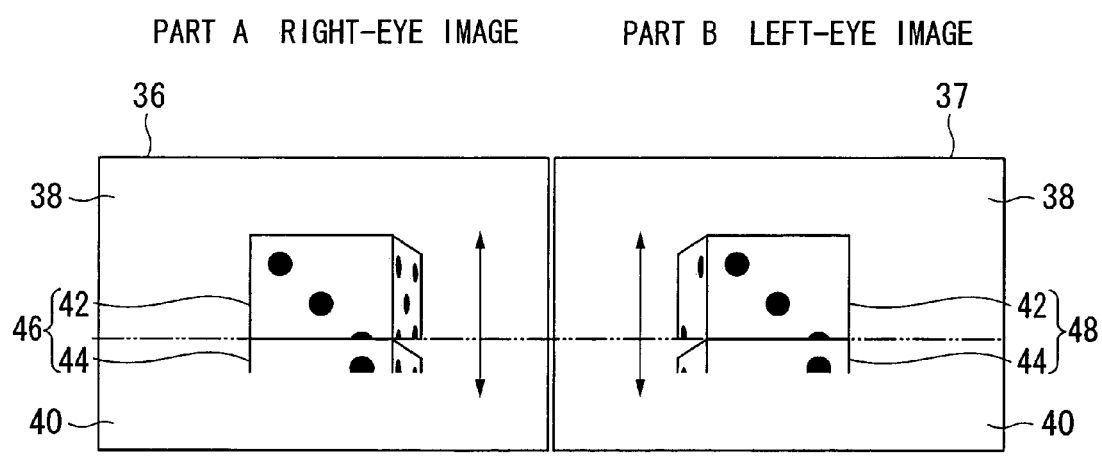
FIG. 4 is a plan view of a display region of a liquid crystal light valve of the image display device pertaining to the first embodiment.

FIG. 4 Part A is a plan view of a typical representation of a display region 36 of a liquid crystal light valve of the right-eye image projector 24, and FIG. 4 Part B is a plan view of a typical representation of a display region 37 of a liquid crystal light valve of the left-eye image projector 25. As shown in FIG. 4, the display region 36 of the right-eye image projector 24 is divided into a front-screen display region 38 that outputs the front-screen image projected onto the front screen 10, and a bottom-screen display region 40 that outputs the bottom-screen image projected onto the bottom screen 12. Consequently, the right-eye image projector 24 is able to emit the front-screen image and the bottom-screen image as respectively independent images.

In the first embodiment, as shown in FIG. 2 and FIG. 4, the top and bottom of the front screen 10 respectively correspond to the top and bottom of the front-screen display region 38. Moreover, the viewer side (front side) and the opposite side facing away from the viewer (back side) of the bottom screen 12 correspond to the top and bottom of the bottom-screen display region 40. The directional arrows shown in FIG. 2 and FIG. 4 also correspond to this.

Returning to FIG. 3, the front-screen reflecting mirror 14 is arranged in the emission direction of the front-screen image at the rear side of the front screen 10. The first bottom-screen reflecting mirror 16 is arranged in the emission direction of the bottom-screen image. The second bottom-screen reflecting mirror 18 is arranged in the reflection direction of the first bottom-screen reflecting mirror 16 underneath the bottom screen 12. Thus, in the first embodiment, the front-screen reflecting mirror 14 is arranged in an odd number of units, and the bottom-screen reflecting mirrors 16 and 18 are arranged in an even number of units. Consequently, the front-screen reflecting mirror 14 only receives and reflects the front-screen image 42, while the bottom-screen reflecting mirrors only receive and reflect the bottom-screen image 44.

Next, a description is provided regarding the operations where right-eye images are emitted from the right-eye image projector 24, and projected onto the front screen 10 and bottom screen 12.

First, as shown in FIG. 4 Part A, the right-eye image projector 24 emits the front-screen image 42 generated in the same direction as the image front direction d1 of the front screen 10 shown in FIG. 2 Part A. On the other hand, as shown in FIG. 4 Part A, the right-eye image projector 24 emits the bottom-screen image 44 generated in a vertically inverted manner in the direction opposite to the image front direction d2 of the bottom screen 12 shown in FIG. 2 Part A.

The front-screen image 42 emitted from the right-eye image projector 24 is received by the front-screen reflecting mirror 14. The incoming front-screen image 42 is reflected by the front-screen reflecting mirror 14, and projected onto the front screen 10.

As shown in FIG. 2 Part A, the image direction of the front-screen image 42 projected onto the front screen 10 conforms to the image direction of the front-screen image 42 emitted from the right-eye image projector 24 shown in FIG. 4 Part A. Accordingly, the image direction of the front-screen image 42 projected onto the front screen 10 conforms to image front direction d1 of the front screen 10.

On the other hand, the bottom-screen image 44 emitted from the right-eye image projector 24 is received by the first bottom-screen reflecting mirror 16. The incoming bottom-screen image 44 is reflected by the first bottom-screen reflecting mirror 16, is received by the second bottom-screen reflecting mirror 18, is further reflected by the second bottom-screen reflecting mirror 18, and is projected onto the bottom screen 12. As shown in FIG. 2 Part A, the image direction of the bottom-screen image 44 projected onto the bottom screen 12 is the reverse (vertical inversion) of the image direction of the bottom-screen image 44 emitted from the right-eye image projector 24 shown in FIG. 4 Part A. Consequently, the image direction of the bottom-screen image 44 projected onto the bottom screen 12 conforms to image front direction d2 of the bottom screen 12.

In this manner, a continuous image 46 conforming to the image front directions d1 and d2 of the screens is displayed on the front screen 10 and bottom screen 12.

In the first embodiment, the following relation exists with regard to the optical path length of the optical axis of each image from each projector to projection onto the respective screen.

The screen 22 shown in FIG. 3 is a virtual screen for the case where a right-eye image 46 emitted from the right-eye image projector 24 is not refracted by a reflecting mirror, and proceeds directly to projection. In the first embodiment, the optical path length of the optical axis O of the front-screen image 42 that is emitted from the right-eye image projector 24, reflected by the front-screen reflecting mirror 14, and projected onto the front screen 10, and the optical path length of the optical axis P of the bottom-screen image 44 that is emitted from the right-eye image projector 24, reflected by the first bottom-screen reflecting mirror 16 and second bottom-screen reflecting mirror 18, and projected onto the bottom screen 12 are set so as to be identical to the optical path length of the virtual optical axis L. Accordingly, the optical path length of the optical axis O of the front-screen image 42 projected onto the front screen 10 is identical to the optical path length of the optical axis P of the bottom-screen image 44 projected onto the bottom screen 12.

In the first embodiment, the front-screen reflecting mirror 14, first bottom-screen reflecting mirror 16, second bottom-screen reflecting mirror 18, front screen 10 and bottom screen 12 are arranged at prescribed positions so that the optical path length of the optical axis O of the front-screen image 42 and the optical path length of the optical axis P of the bottom-screen image 44 are identical. It is also possible to make the optical path lengths of the optical axes O and P of the right-eye image 46 which is emitted from the right-eye image projector 24 and projected onto each screen 10 and 12, identical to the optical path lengths of the optical axes O and P of the left-eye image 48 which is emitted from left-eye image projector 25 and projected onto each screen 10 and 12.

Next, the left-eye image projector 25 is described.

The left-eye image projector 25 is provided at the back (Z-axis direction) of the right-eye image projector 24 in FIG. 3, and adopts the same configuration and the like as the above-described right-eye image projector 24. As shown in FIG. 3, a second polarizing plate 52 for transmitting and emitting only polarized light p that is parallel to the Y-axis direction (second direction) is arranged on the emission side of the left-eye image projector 25. The front-screen reflecting mirror 14, the bottom-screen reflecting mirrors, the front screen 10 and the bottom screen 12 are used in common with the right-eye image projector 24.

Accordingly, the front-screen image 42 (first-screen left-eye image) emitted from the left-eye image projector 25 is reflected by the front-screen reflecting mirror 14, and projected onto the front screen 10. Similarly, the bottom-screen image 44 (second-screen left-eye image) is reflected by the first bottom-screen reflecting mirror 16 and second bottom-screen reflecting mirror 18, and projected onto the bottom screen 12. At this time, in the first embodiment, the optical path length of the optical axis of the front-screen image 42 and the optical path length of the optical axis of the bottom-screen image 44 are identical.

In this manner, parallax images composed of the right-eye image 46 and left-eye image 48 shown in FIG. 2 Part A and Part B are respectively formed on the front screen 10 and bottom screen 12. When the viewer wears the spectacles and views the parallax images, the right-eye images among the parallax images projected onto the front screen 10 and the bottom screen 12 are transmitted by the right-eye transmission section of the spectacles 3, and the right-eye image is received by the right eye of the viewer. On the other hand, the left-eye images among the parallax images projected onto the front screen 10 and the bottom screen 12 are transmitted by the left-eye transmission section of the spectacles 3, and the left-eye image is received by the left eye of the viewer. As a result, independent images are provided to the right eye and left eye of the viewer. Consequently, the brain of the observer synthesizes the right-eye image 46 and left-eye image 48, and the observer perceives the parallax images projected onto the front screen 10 and the bottom screen 12 as a stereoscopic image.

Figure 5:
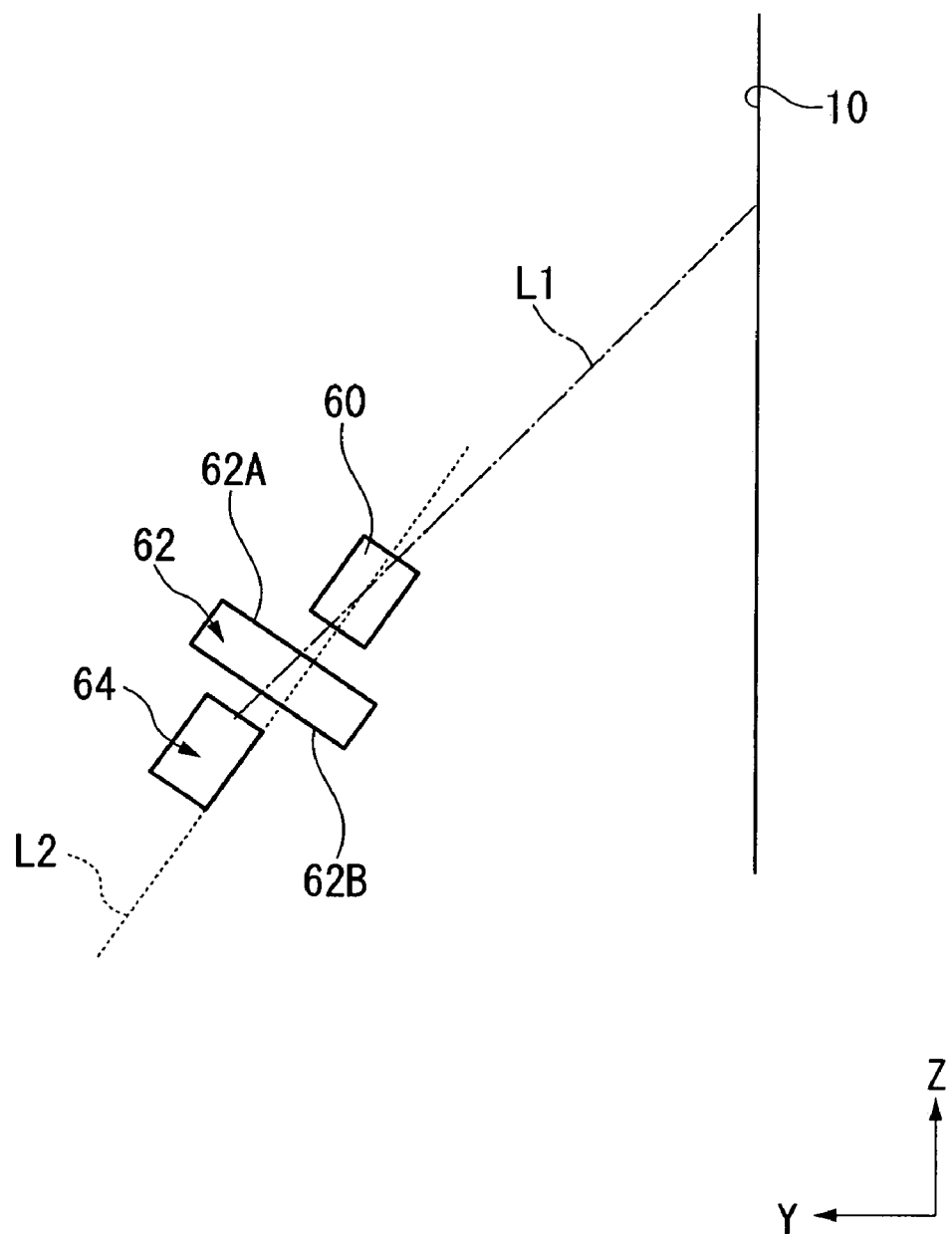
FIG. 5 is a view of principles of a shift optical system which corrects distortions projected onto a screen.

In the first embodiment, a thinner image display device is achieved by arranging the projectors and the like so that the optical axes of the images emitted from the projectors are in a non-vertical direction relative to the respective projection surfaces of each screen, and by projecting the image light onto each screen from prescribed angles. However, in this case, distortions occur in the images projected onto each screen, because the image light is projected from a non-vertical direction relative to each screen. As a method for correcting this distortion, the method disclosed in Japanese Unexamined Patent Application, First Publication No. 2002-139794, may be adopted. FIG. 5 is a drawing that simplifies the principles of the shift optical system that corrects this distortion. For example, in the case where the right-eye image projector 24 is provided with a projection system 60 (enlargement system), a liquid crystal light valve 62 and a light source device 64, the light emission face 62A of the liquid crystal light valve 62 is arranged in the vertical direction relative to optical axis L2 of the projection system 60. In addition, the light source device 64 is arranged so that the center axis (see optical path L1) of the light beam emitted from the liquid crystal light valve 62 and the optical axis L2 of the projection system 60 are askew. Consequently, light (green light) is emitted from the light source device 64 in a non-vertical direction relative to light incidence face 62B of the liquid crystal light valve 62. This type of method corrects the distortions projected onto each screen in the first embodiment.

It is also possible to correct the distortion of projected images by constructing an optical system (a so-called gate optical system) where the center axis of the light beam emitted from the liquid crystal light valve 62 conforms to the optical axis of the projection system 60, and the light emission face of the liquid crystal light valve 62 is arranged non-vertically relative to the optical axis of the projection system 60.

According to the first embodiment, the right-eye image 46 emitted from the right-eye image projector 24 and the left-eye image 48 emitted from the left-eye image projector 25 are reflected by the reflecting mirrors, and projected onto the front screen 10 and the bottom screen 12. In short, in the first embodiment, the image is refracted (reflected) by the reflecting mirrors, and projected onto the screens. Moreover, according to the first embodiment, it is possible to form parallax images and realize stereoscopic images by the two display section of the right-eye image projector and the left-eye image projector. Consequently, it is possible to narrow the projection space compared to the case where the images are directly projected from the rear of the screen. Accordingly, it is possible to achieve a thinner and more compact stereoscopic image display device 1, and to reduce costs.

In addition, according to the first embodiment, the optical path length of the optical axis of the right-eye images (left-eye images) from the right-eye projector 24 (left-eye image projector 25) to their projection onto the front screen 10 via the front-screen reflecting mirror and the optical path length of the optical axis of the right-eye images (left-eye images) from the right-eye projector 24 (left-eye image projector 25) to their projection onto the bottom screen 12 via the bottom-screen reflecting mirrors are optically equidistant, with the result that the focal points of the respective images projected onto the front screen 10 and the bottom screen 12 are identical. Consequently, it is possible to prevent the-right-eye images (left-eye images) projected onto the two screens of the front screen 10 and the bottom screen 12 from becoming out of focus.

Furthermore, according to the first embodiment, the optimal screen arrangement for the angle of visibility of the viewer is obtained by providing the two screens of the front screen 10 and the bottom screen 12. Consequently, it is possible to reproduce a natural three-dimensional sense, and to realize stereoscopic images imparting a sense of presence.

Furthermore, in the stereoscopic image display device 1 of the first embodiment, the front-screen reflecting mirror 14 is arranged in an odd number of units, and the bottom-screen reflecting mirrors 16 and 18 are arranged in an even number of units, with the result that the front-screen right-eye image 42 (front-screen left-eye image) is reflected an odd number of times, and the bottom-screen right-eye image 44 (bottom-screen left-eye image) is reflected an even number of times, and respectively projected onto each screen 10 and 12. Accordingly, in the first embodiment, the bottom-screen right-eye image 44 (bottom-screen left-eye image) emitted from the projector 24 is vertically inverted in advance, and emitted. Consequently, the front-screen right-eye image 42 (front-screen left-eye image) and the bottom-screen right-eye image 44 (bottom-screen left-eye image) of the same direction are synthesized and projected, and a continuous right-eye image 46 (left-eye image) is formed on the front screen 10 and the bottom screen 12.

Second Embodiment

A second embodiment is described below with reference to drawings.

In the foregoing embodiment, parallax images are projected onto the screens from right-eye images and left-eye images separated by polarization, and stereoscopic images are viewed using spectacles that transmit only polarized light of the prescribed direction.

In contrast, the second embodiment differs in the point that the so-called analglyph system is adopted where parallax images are projected onto the screens from right-images and left-eye images separated by wavelength, and stereoscopic images are viewed using spectacles that transmit only wavelengths of the prescribed directions. As the remaining basic configuration of the stereoscopic image display device is the same as that of the aforementioned first embodiment, shared components are given the same code numbers, and detailed explanation thereof is omitted.

Figure 6:
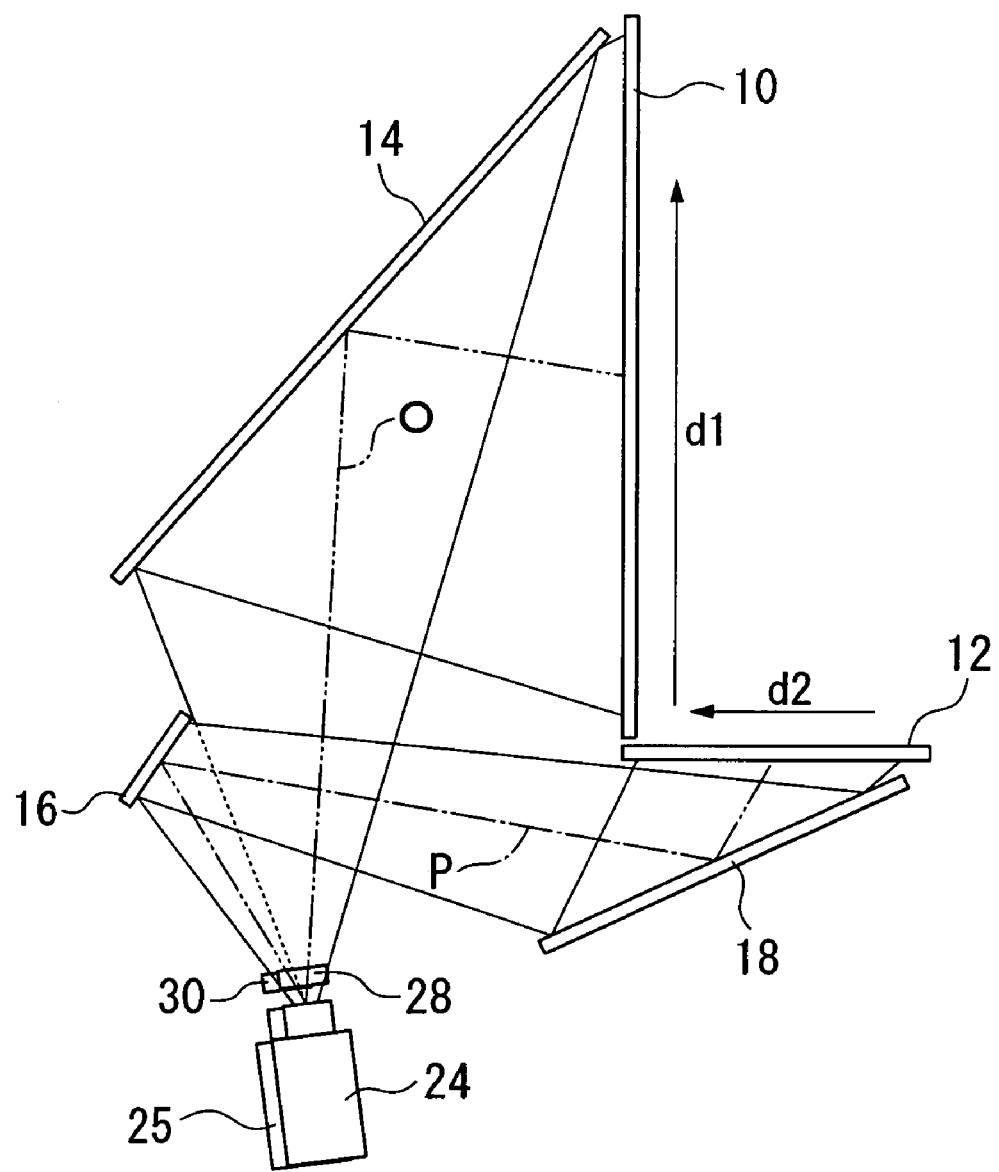
FIG. 6 is a cross-sectional view of the schematic configuration of the image display device pertaining to the second embodiment.

FIG. 6 is a cross-sectional view of a typical schematic configuration of the interior of the case 20 of the image display device 2 of the second embodiment.

In the second embodiment, a first filter 28 (first wavelength separation section) for transmitting only wavelengths in the red wavelength band is arranged on the emission side of the right-eye image projector 24. By this means, only the red wavelengths in the right-eye image 46 emitted from the right-eye image projector 24 are transmitted, reflected by the reflecting mirrors, and projected onto the front screen 10 and bottom screen 12 respectively. On the other hand, a second filter 30 (second wavelength separation section) for transmitting only wavelengths in the blue (color with the relation of red and a complementary color) wavelength band is arranged on the emission side of the left-eye image projector 25. By this means, only the blue wavelengths in the left-eye image 48 emitted from the left-eye image projector 25 are transmitted, reflected by the reflecting mirrors, and projected onto the front screen 10 and bottom screen 12. In this manner, parallax images composed of a red right-eye image 46 and a blue left-eye image 48 are formed on the front screen 10 and bottom screen 12.

With regard to the spectacles worn by the viewer, a blue-colored film is affixed to the right-eye transmission-section 31, and a red-colored film is affixed to the left-eye transmission section 32. Accordingly, when the viewer wears the spectacles, and views the parallax images, a red right-eye image 46 is transmitted by the right-eye transmission section 31 of the spectacles, and a red right-eye image 46 enters the right eye of the viewer. On the other hand, a blue left-eye image 48 is transmitted by the left-eye transmission section 32 of the spectacles, and a blue left-eye image 48 enters the left eye of the viewer. In this manner, independent images are provided to the right eye and the left eye of the viewer. As a result, the brain of the observer synthesizes the right-eye image 46 and the left-eye image 48, and the observer perceives the parallax images projected onto the front screen 10 and bottom screen 12 as a stereoscopic image.

According to the second embodiment, it is possible to realize an anaglyph-system stereoscopic image display device 1.

In addition, as with the foregoing embodiment, it is possible to narrow the projection space used for refraction by reflecting mirrors of the images emitted from the projectors and for their projection onto the screens. Accordingly, it is possible to achieve a thinner and more compact stereoscopic image display device 1, and to reduce costs.

Third Embodiment

A third embodiment is described below with reference to drawings.

In the foregoing embodiments, the front-screen image is reflected once by a reflecting mirror, and projected onto the front screen, and the bottom-screen image is reflected twice by reflecting mirrors, and projected onto the bottom screen. In contrast, the third embodiment differs in the point that the bottom-screen image is reflected three times, and projected onto the bottom screen. As the remaining basic configuration of the stereoscopic image display device is the same as that of the aforementioned first embodiment, shared components are given the same code numbers, and-detailed explanation thereof is omitted.

Figure 7:
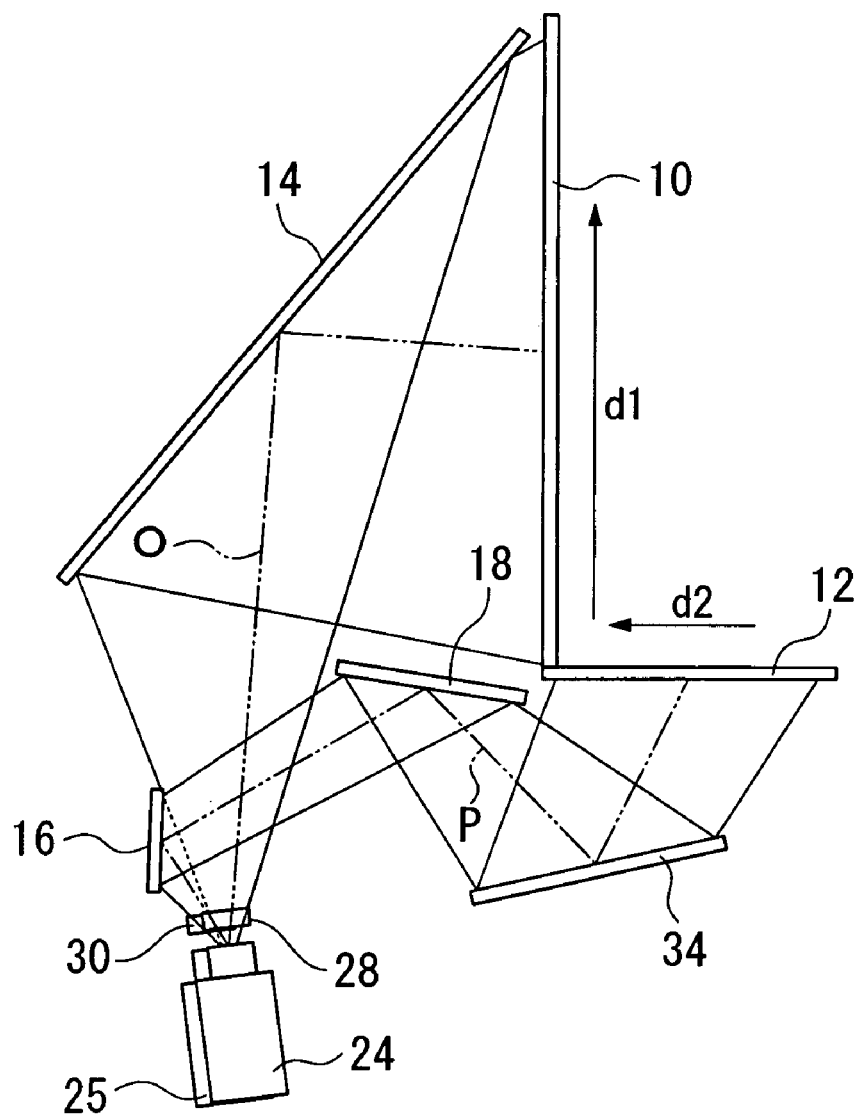
FIG. 7 is a cross-sectional view of the schematic configuration of the image display device pertaining to the third embodiment.
Figure 8:
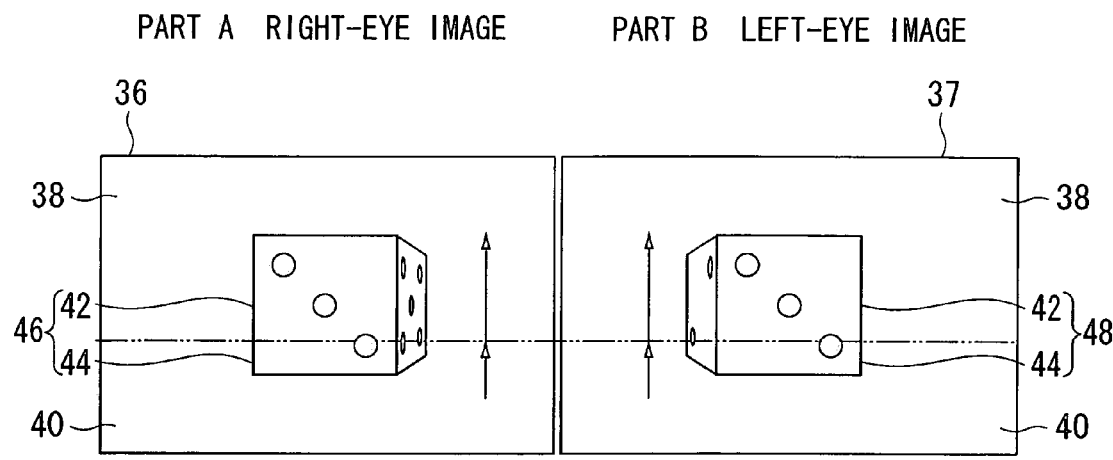
FIG. 8 is a plan view of a display region of a liquid crystal light valve of the image display device pertaining to the third embodiment.
Figure 9:
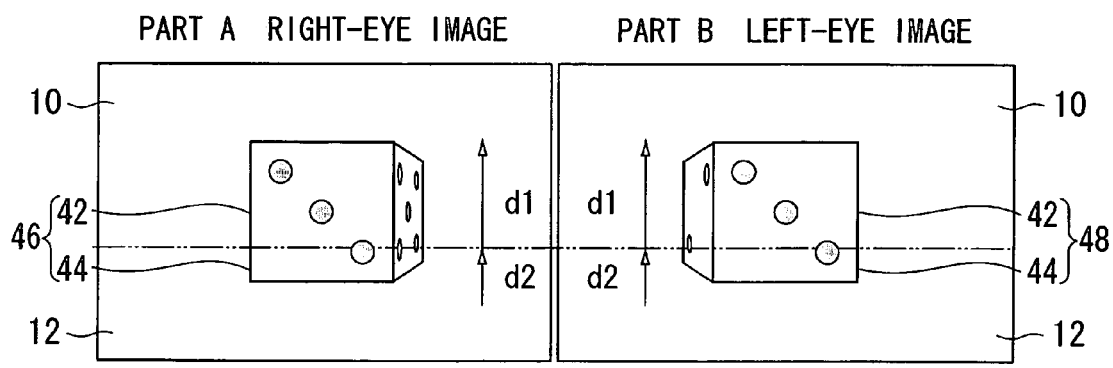
FIG. 9 is a view of images projected onto the screens of the image display device pertaining to the third embodiment.

FIG. 7 is a cross-sectional view of a typical schematic configuration of the image display device 2 of the third embodiment. FIG. 8 Part A and FIG. 8 Part B are typical plan views respectively showing the display region 36 of a liquid crystal light valve of the right-eye image projector 24, and the display region 37 of a liquid crystal light valve of the left-eye image projector 25. FIG. 9 Part A and Part B are typical plan views respectively showing the front screen 10 and bottom screen 12 of the third embodiment.

As shown in FIG. 7, the first bottom-screen reflecting mirror 16 is arranged in the emission direction of the bottom-screen image 44. The second bottom-screen reflecting mirror 18 is arranged in the reflection direction of the first bottom-screen reflecting mirror 16. Furthermore, the third bottom-screen reflecting mirror 34 (second reflecting section) is arranged in the reflection direction of the second bottom-screen reflecting mirror 18 underneath the bottom screen 12. In short, in the third embodiment, the front-screen reflecting mirror 14 is arranged in an odd number of units, and the bottom-screen reflecting mirrors 16, 18 and 34 are arranged in an odd number of units.

Next, the operations are described where a right-eye image is emitted from the right-eye image projector 24, and projected onto the front screen 10 and bottom screen 12. As the left-eye image projector 25 conducts the same operations as the right-eye image projector 24, a description thereof is omitted.

As shown in FIG. 8 Part A, the right-eye image projector 24 emits the front-screen image 42 generated in the same direction as image front direction d1 of the front screen 10, and the bottom-screen image 44 generated in the same direction as image front direction d2 of the bottom screen 12.

The front-screen image 42 emitted from the right-eye image projector 24 is received by the front-screen reflecting mirror 14. The incoming front-screen image 42 is reflected by the front-screen reflecting mirror 14, and projected onto the front screen 10.

As shown in FIG. 9 Part A, the image direction of the front-screen image 42 projected onto the front screen 10 conforms to the image direction of the front-screen image 42 emitted from the right-eye image projector 24 shown in FIG. 8 Part A. Accordingly, the image direction of the front-screen image 42 projected onto the front screen 10 conforms to image front direction d1 of the front screen 10.

The bottom-screen image 44 emitted from the right-eye image projector 24 is received by the first bottom-screen reflecting mirror 16. The incoming bottom-screen image 44 is reflected by the first bottom-screen reflecting mirror 16, and is received by the second bottom-screen reflecting mirror 18. The incoming bottom-screen image 44 is reflected by the second bottom-screen reflecting mirror 18, is further reflected by the third bottom-screen reflecting mirror 34, and is projected onto the bottom screen 12. As shown in FIG. 9 Part A, the image direction of the bottom-screen image 44 projected onto the bottom screen 12 conforms to the image direction of the bottom-screen image 44 emitted from the right-eye image projector 24 shown in FIG. 8 Part A. Accordingly, the image direction of the bottom-screen image 44 projected onto the bottom screen 12 conforms to image front direction d2 of the bottom screen 12. In this manner, a continuous image 46 that conforms to image front directions d1 and d2 of the screens is displayed on the front screen 10 and bottom screen 12.

With regard to the third embodiment, the same operative effects may be cited as the foregoing embodiments. In short, it is possible to narrow the projection space used for the plurality of refractions by reflecting mirrors of the images emitted from the projectors and for their projection onto the screens. Accordingly, it is possible to achieve a thinner and more compact stereoscopic image display device 1, and to reduce costs.

Furthermore, in the stereoscopic image display device 1 of the third embodiment, the front-screen reflecting mirror 14 is arranged in an odd number of units, and the bottom-screen reflecting mirrors 16, 18 and 34 are arranged in an odd number of units, with the result that the front-screen right-eye image 42 (front-screen left-eye image) is reflected an odd number of times, and the bottom-screen right-eye image 44 (bottom-screen left-eye image) is reflected an odd number of times, and respectively projected onto each screen 10 and 12. Accordingly, in the third embodiment, the front-screen right-eye image 42 (front-screen left-eye image) and the bottom-screen right-eye image 44 (bottom-screen left-eye image) emitted from the projector 24 are emitted in the same image direction. Consequently, the front-screen right-eye image 42 (front-screen left-eye image) and the bottom-screen right-eye image 44 (bottom-screen left-eye image) of the same direction are synthesized and projected, and a continuous right-eye image 46 (left-eye image) is formed on the front screen 10 and the bottom screen 12.

Fourth Embodiment

A fourth embodiment is described below with reference to drawings.

In the foregoing first embodiment and the foregoing second embodiment, the front-screen image was reflected once by the reflecting mirror, and projected onto the front screen, while the bottom-screen image was reflected twice by reflecting mirrors, and projected onto the bottom screen. In contrast, the fourth embodiment differs in that the front-screen image is reflected twice by reflecting mirrors, and projected onto the front screen, while the bottom-screen image is reflected three times, and projected onto the bottom screen. As the remaining basic configuration of the stereoscopic image display device is the same as that of the aforementioned first embodiment, shared components are given the same code numbers, and detailed explanation thereof is omitted.

Figure 10:
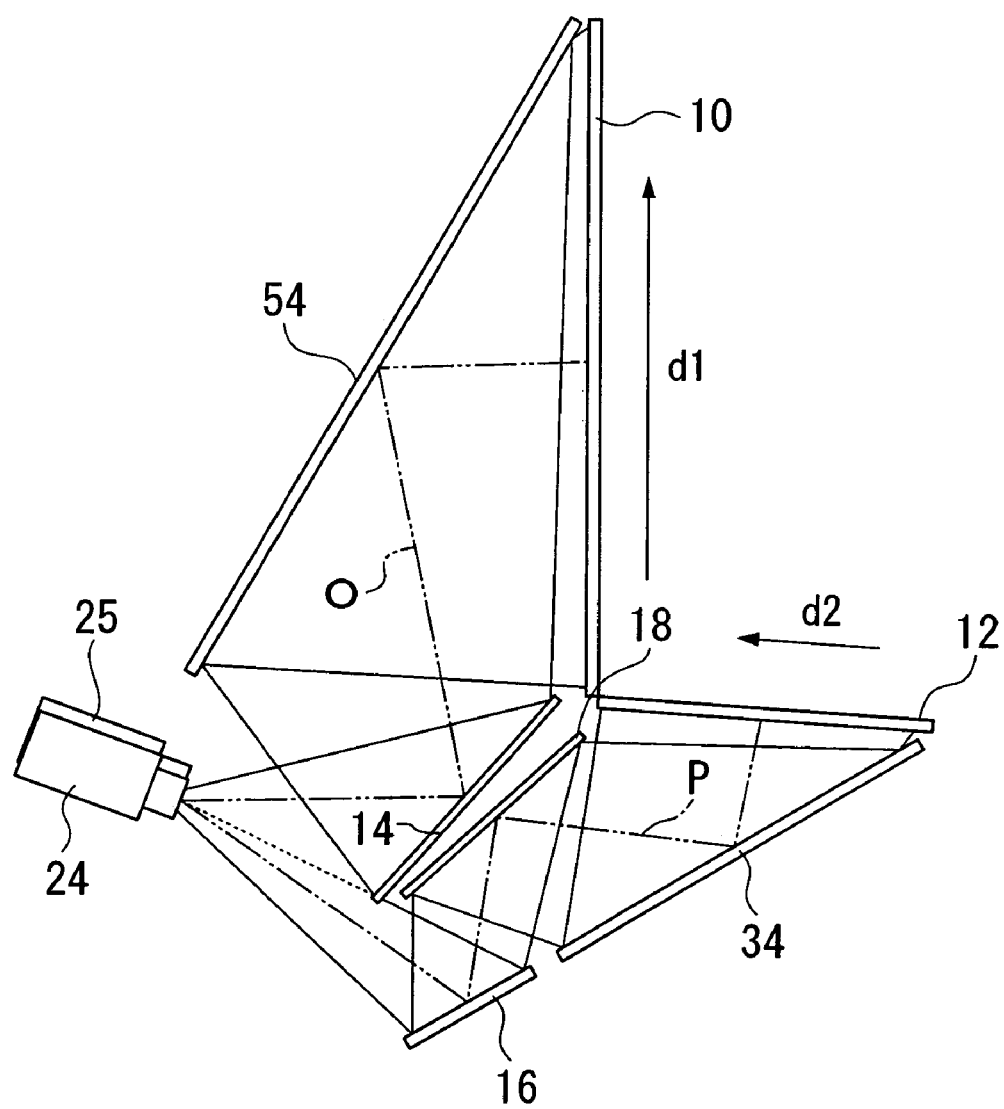
FIG. 10 is a cross-sectional view of the schematic configuration of the image display device pertaining to the fourth embodiment.
Figure 11:
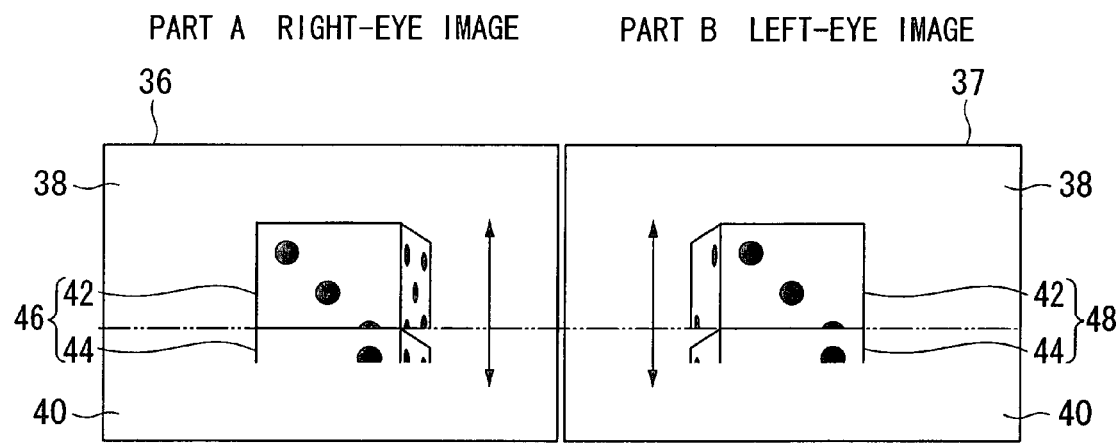
FIG. 11 is a plan view of a display region of a liquid crystal light valve of the image display device pertaining to the fourth embodiment.
Figure 12:
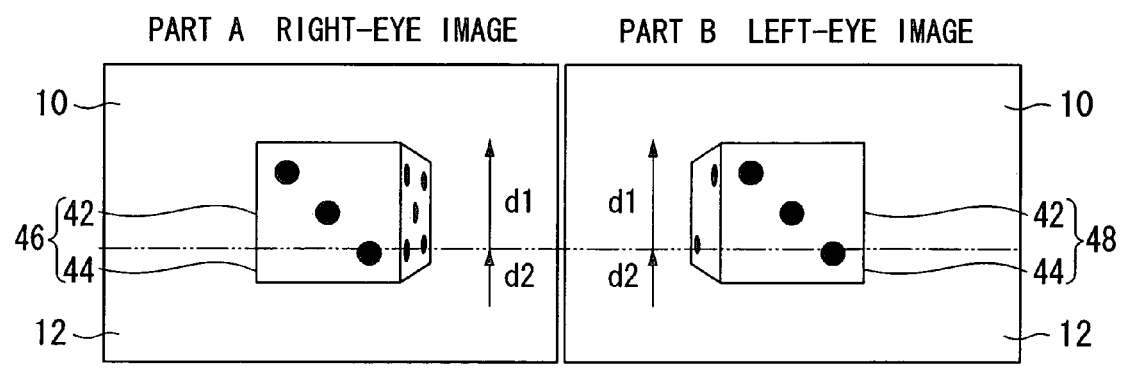
FIG. 12 is a view of images projected onto the screens of the image display device pertaining to the fourth embodiment.

FIG. 10 is a cross-sectional view of a typical schematic configuration of the image display device 2 of the fourth embodiment. FIG. 11 Part A and FIG. 11 Part B are typical plan views respectively showing the display region 36 of a liquid crystal light valve of the right-eye image projector 24, and the display region 37 of a liquid crystal light valve of the left-eye image projector 25. FIG. 12 Part A and Part B are typical plan views respectively showing the front screen 10 and bottom screen 12 of the fourth embodiment.

As shown in FIG. 10, the first front-screen reflecting mirror 14 (first reflecting section) is arranged in the emission direction of the front-screen image 42. The second front-screen reflecting mirror 54 (first reflecting section) is arranged in the reflection direction of the first front-screen reflecting mirror 14 behind the front screen 10. The first bottom-screen reflecting mirror 16 is arranged in the emission direction of the bottom-screen image 44. The second bottom-screen reflecting mirror 18 is arranged in the reflection direction of the first bottom-screen reflecting mirror 16. Furthermore, the third bottom-screen reflecting mirror 34 is arranged in the reflection direction of the second bottom-screen reflecting mirror 18 underneath the bottom screen 12. In short, in the fourth embodiment, the front-screen reflecting mirrors 14 and 54 are arranged in an even number of units, and the bottom-screen reflecting mirrors 16, 18 and 34 are arranged in an odd number of units.

Next, the operations are described where a right-eye image is emitted from the right-eye image projector 24, and projected onto the front screen 10 and bottom screen 12. As the left-eye image projector 25 conducts the same operations as the right-eye image projector 24, a description thereof is omitted.

As shown in FIG. 11 Part A, the right-eye image projector 24 emits the front-screen image 42 generated in the same direction as the image front direction d1 of the front screen 10.

On the other hand, as shown in FIG. 11 Part A, the right-eye image projector 24 emits the bottom-screen image 44 generated in a vertically inverted manner in the direction opposite to the image front direction d2 of the bottom screen 12.

The front-screen image 42 emitted from the right-eye image projector 24 is received by the front-screen reflecting mirror 14. The incoming front-screen image 42 is reflected by the first front-screen reflecting mirror 14 and the second front-screen reflecting mirror 54, and is projected onto the front screen 10. As shown in FIG. 12 Part A, the image direction of the front-screen image 42 projected onto the front screen 10 conforms to the image direction of the front-screen image 42 emitted from the right-eye image projector 24 shown in FIG. 11 Part A. Accordingly, the direction of the front-screen image 42 projected onto the front screen 10 conforms to the image front direction d1 of the front screen 10.

Moreover, the bottom-screen image 44 emitted from the right-eye image projector 24 is received by the first bottom-screen reflecting mirror 16. The incoming bottom-screen image 44 is reflected by the first bottom-screen reflecting mirror 16, and is received by the second bottom-screen reflecting mirror 18. The incoming bottom-screen image 44 is reflected by the second bottom-screen reflecting mirror 18, is further reflected by the third bottom-screen reflecting mirror 34, and is projected onto the bottom screen 12. As shown in FIG. 12 Part A, the image direction of the bottom-screen image 44 projected onto the bottom screen 12 is the reverse (vertical inversion) of the image direction of the bottom-screen image 44 emitted from the right-eye image projector 24 shown in FIG. 11 Part A. Consequently, the direction of the bottom-screen image 44 projected onto the bottom screen 12 conforms to the image front direction d2 of the bottom screen 12. In this manner, a continuous image 46 that conforms to image front directions d1 and d2 of the screens is displayed on the front screen 10 and bottom screen 12.

With regard to the fourth embodiment, the same operative effects may be cited as the foregoing embodiments. In short, it is possible to narrow the projection space used for the plurality of refractions by reflecting mirrors of the images emitted from the projectors and for their projection onto the screens. Accordingly, it is possible to achieve a thinner and more compact stereoscopic image display device 1, and to reduce costs.

Furthermore, in the stereoscopic image display device I of the fourth embodiment, the front-screen reflecting mirrors 14 and 54 are arranged in an even number of units, and the bottom-screen reflecting mirrors 16, 18 and 34 are arranged in an odd number of units, with the result that the front-screen right-eye image 42 (front-screen left-eye image) is reflected an even number of times, and the bottom-screen right-eye image 44 (bottom-screen left-eye image) is reflected an odd number of times, and respectively projected onto each screen 10 and 12. Accordingly, in the fourth embodiment, the bottom-screen right-eye image 44 (bottom-screen left-eye image) emitted from the projector 24 is vertically inverted in advance, and emitted. Consequently, the front-screen right-eye image 42 (front-screen left-eye image) and the bottom-screen right-eye image 44 (bottom-screen left-eye image) of the same direction are synthesized and projected, and a continuous right-eye image 46 (left-eye image) is formed on the front screen 10 and the bottom screen 12.

In the foregoing embodiments, parallax images were formed on the screens, and a stereoscopic image display device was realized using polarizing spectacles. In contrast, it is also acceptable to split the image emitted from a single projector into a front-screen image and a bottom-screen image, and to project the front-screen image onto the front screen and the bottom-screen image onto the bottom screen. Consequently, it is not possible to obtain a stereoscopic image, but it is possible to narrow the projection space used for the plurality of refractions by reflecting mirrors of the images emitted from the projectors and for their projection onto the screens.

Accordingly, it is possible to achieve a thinner image display device with reduced cost, and realize an image with a sense of presence. As explained in the foregoing embodiments, it is also possible to arrange a plurality of reflecting mirrors behind the screens. In this case, the reflecting mirrors are arranged at prescribed positions so that the optical path length of the optical axis of the front-screen image from its emission from the projector to its projection onto the screen is identical to the optical path length of the optical axis of the bottom-screen image.

Fifth Embodiment

Figure 13:
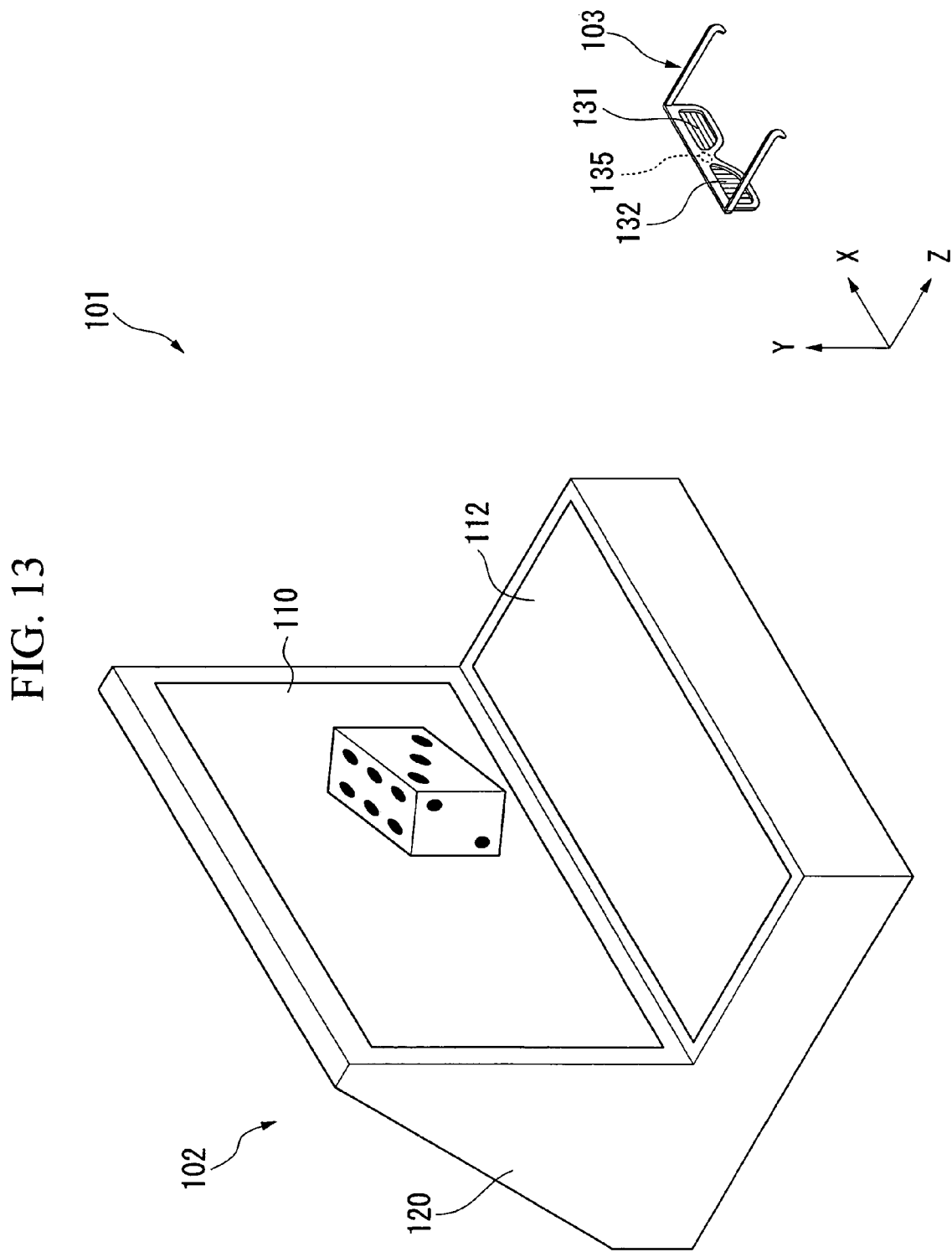
FIG. 13 is a perspective view of the schematic configuration of a stereoscopic image display device.

FIG. 13 is a perspective view of the schematic configuration of a stereoscopic image display device 101 pertaining to the fifth embodiment. The stereoscopic image display device 101 pertaining to the fifth embodiment is composed of an image display device 102 for projecting images, and spectacles 103 (image selection section) for generating stereoscopic images from the images.

As shown in FIG. 13, the image display device 102 is composed of screens 110 and 112 onto which images are projected, and a case 120 provided on the rear side of the screens 110 and 112.

As shown in FIG. 13, the screens 110 and 112 consist of a front screen 110 (first screen) arranged in front of the viewer (the spectacles 103), and a bottom screen 112 (second screen)

arranged on the bottom side of the viewer. The bottom screen 112 extends toward the viewer from the lower end of the front screen 110, whereby a continuous integrated screen is formed by the front screen 110 and the bottom screen 112.

Figure 14:
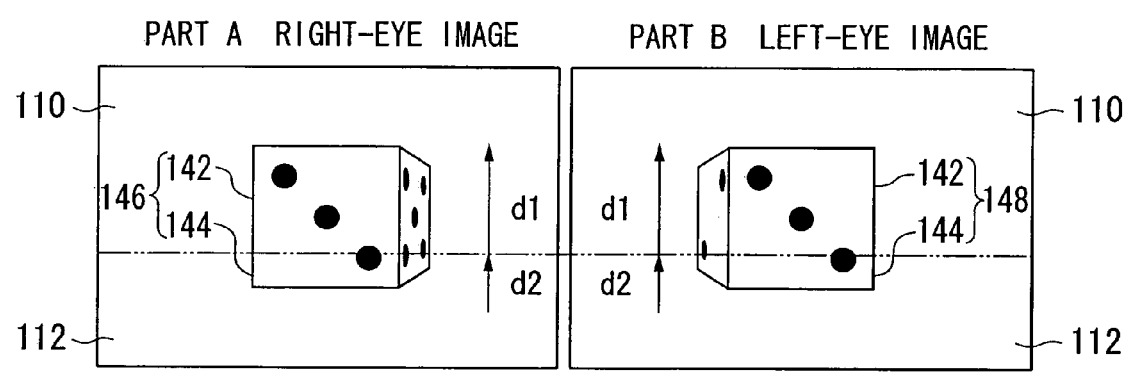
FIG. 14 is a view of images projected onto screens.
Figure 15:
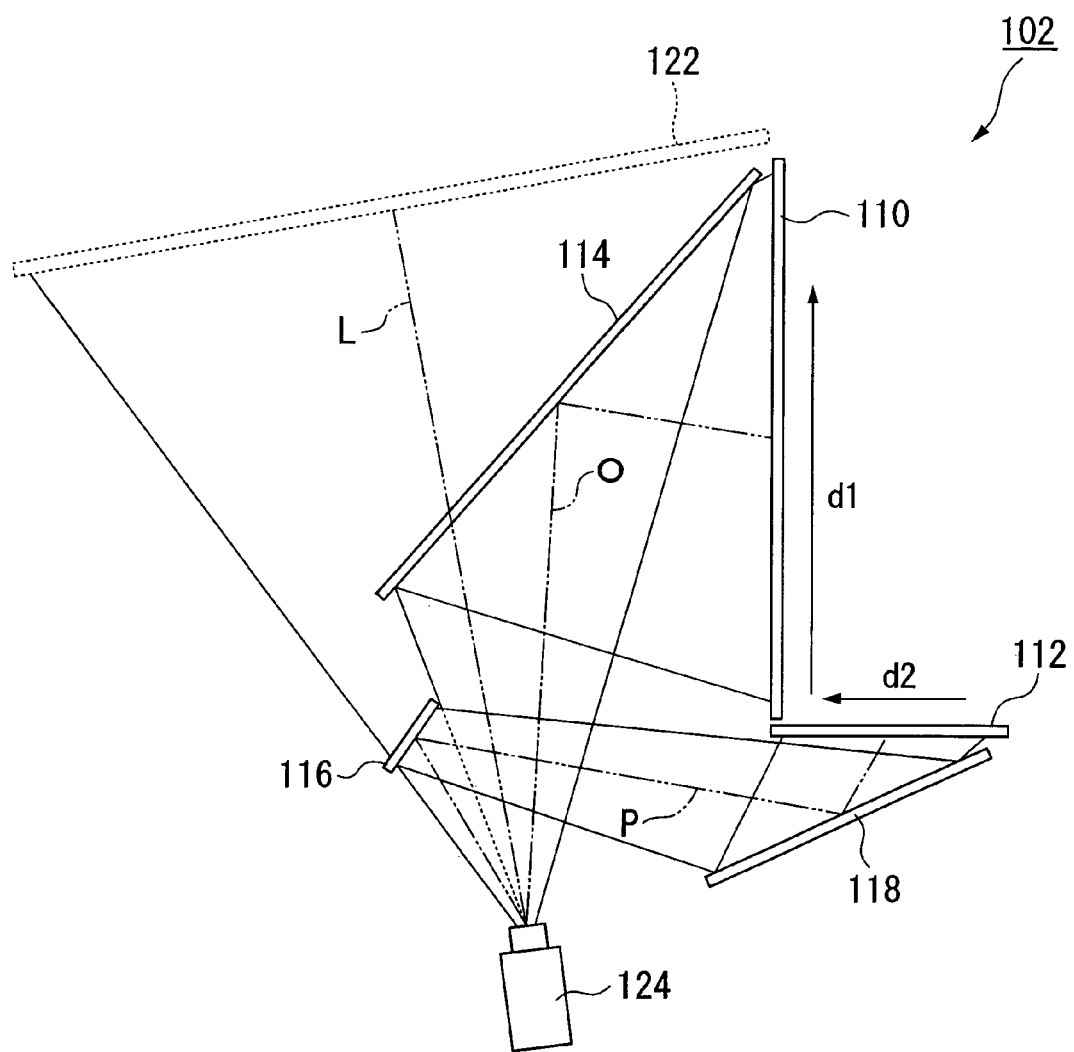
FIG. 15 is a cross-sectional view of the schematic configuration of the image display device pertaining to the fifth embodiment.

FIG. 14 Part A and Part B are views for the case where the front screen 110 and bottom screen 112 are seen from the viewer side. As shown in FIG. 14 Part A, a front-screen right-eye image 142 (first-screen right-eye image) is projected onto the front screen 110, while a bottom-screen right-eye image 144 (second-screen right-eye image) is projected onto the bottom screen 112. A continuous image 146 is formed by the front-screen right-eye image 142 and bottom-screen right-eye image 144. The direction of the arrow marks shown on the front screen 110 in FIG. 14 and FIG. 15 is the direction in which the images are frontal when the viewer views the images, and this arrow-mark direction is referred to as image front direction in the fifth embodiment. Similarly, the arrow-mark direction of the bottom screen 112 is referred to as image front direction. As the left-eye images projected in FIG. 14 Part B are similar to the above-described right-eye images (first-screen left-eye image and second-screen left-eye image), a description thereof is omitted.

Next, the internal structure of the case 120 of the image display device 102 of the fifth embodiment is described in detail.

FIG. 15 is a cross-sectional view of a schematic configuration of the interior of the case 120 of the image display device 102.

The interior of the case 120 of the image display device 102 is provided with a projector 124 (projection unit) for generating images for projection onto the screens, and with a front-screen reflecting mirror 114 (first reflecting section), a first bottom-screen reflecting mirror 116 (second reflecting section) and a second bottom-screen reflecting mirror 118 (second reflecting section) for reflecting the generated images and guiding them in the direction of the screens.

Figure 16:
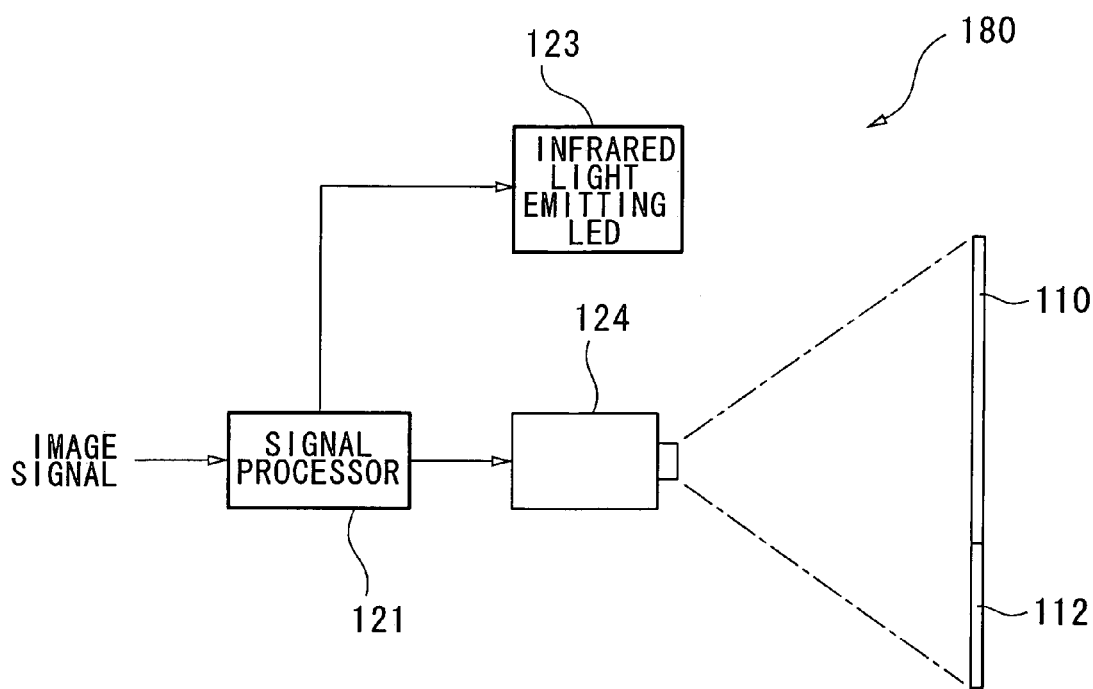
FIG. 16 is a view of a block diagram showing the functional configuration of the projection unit of the image display device pertaining to the fifth embodiment.

FIG. 16 is a block diagram showing a schematic configuration of the principal parts of a projection unit 180 of the image display device 102. As shown in FIG. 16, the projection unit is composed of a signal processor 121, an infrared light emitting LED (light emitting diode) 123, and the projector 124.

The signal processor 121 is connected to the projector 124, and outputs image signals inputted from the outside to the projector 124 at the specified timing. The image signals inputted from the outside consist of the four types of right-eye image signals composed of front-screen right-eye image signals and bottom-screen right-eye image signals, and left-eye image signals composed of front-screen left-eye image signals and bottom-screen left-eye image signals. The signal processor 121 alternately switches between the right-eye image signals and the left-eye image signals at, for example, a frequency of 60 Hz to 80 Hz, and outputs them with time-division to the projector 124.

The infrared light emitting LED 123 emits infrared light at wavelengths in the non-visible region according to drive signals inputted from the signal processor 121. Stated in more detail, the infrared light emitting LED 123 emits infrared light with variation of the light emitting time and light emitting pattern according to the types of drive signals inputted from the signal processor 121.

The projector 124 generates images corresponding to the various types of image signals inputted from the signal processor 121, and emits these generated images with time-division. The images consist of the four types of images of right-eye images composed of the front-screen right-eye image 142 and bottom-screen right-eye image 144, and left-eye images composed of the front-screen left-eye image 142 and bottom-screen left-eye image 144. In short, right-eye images and left-eye images are alternately emitted with time-division. As shown in FIG. 15, this projector 124 is arranged at the bottom rear inside the case 120 so that its emission side is inclined at the prescribed angle relative to the projection surfaces of the screens 110 and 112. As the projector 124, a 3-panel (3-LCD system) liquid crystal projector is used which employs three liquid crystal light valves as the optical modulation elements. With this method, a dichroic mirror transmits only light of the specified wavelength from the light emitted by a light source, and splits it into R (red), G (green) and B (blue); the light that has passed through each light valve is synthesized with a dichroic prism, and is then projected onto the screen. It is also possible to adopt a method or the like where a color wheel is rotated using a micro-mirror array device (registered trademark: DMD) as the optical modulation element, and the images of R (red), G (green) and B (blue) that transit this color wheel are projected onto the screens.

Figure 17:
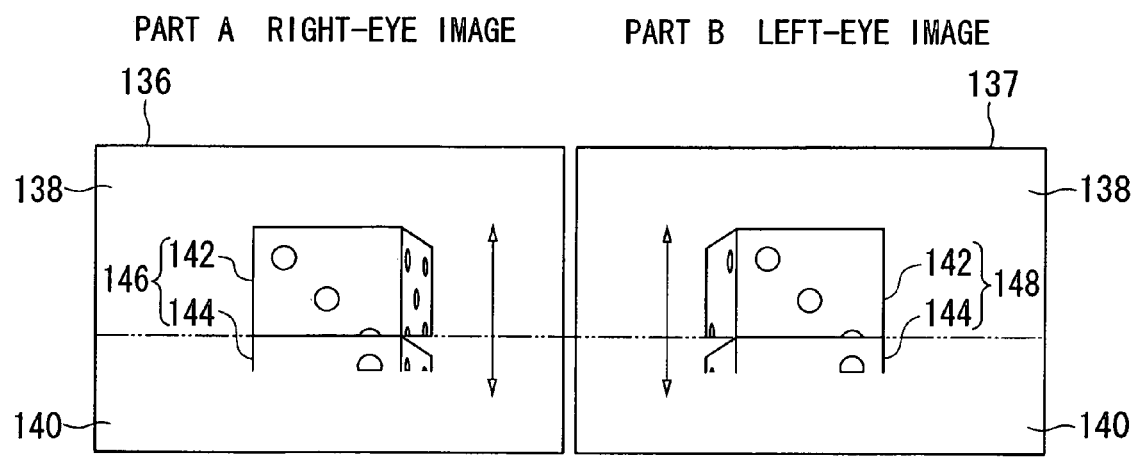
FIG. 17 is a plan view of a display region of a liquid crystal light valve of the image display device pertaining to the fifth embodiment.

FIG. 17 is a view of a typical representation of a display region 136 of a liquid crystal light valve of the projector 124. FIG. 17 Part A and FIG. 17 Part B respectively show typical representations of the display region 136 where the right-eye image 146 is displayed, and the display region 137 where the left-eye image 148 is displayed. As shown in FIG. 17, the display region 136 of the projector 124 is divided into a front-screen display region 138 that outputs the front-screen right-eye image 142 projected onto the front screen 110, and a bottom-screen display region 140 that outputs the bottom-screen right-eye image 144 projected onto the bottom screen 112. Consequently, the projector 124 is able to emit the front-screen right-eye image 142 and the bottom-screen right-eye image 144 in the right-eye image 146 as respectively independent images by the provision of image signals from the signal processor 121.

In the fifth embodiment, as shown in FIG. 14 and FIG. 17, the top and bottom of the front screen 110 respectively correspond to the top and bottom of the front-screen display region 138. Moreover, the viewer side (front side) and the opposite side facing away from the viewer (back side) of the bottom screen 112 correspond to the top and bottom of the bottom-screen display region 140. The directional arrows shown in FIG. 14 and FIG. 17 also correspond to this.

Returning to FIG. 15, the front-screen reflecting mirror 114 is arranged in the emission direction of the front-screen right-eye image 142 (front-screen left-eye image) at the rear side of the front screen 110. The first bottom-screen reflecting mirror 116 is arranged in the emission direction of the bottom-screen right-eye image 144 (bottom-screen left-eye image). The second bottom-screen reflecting mirror 118 is arranged in the reflection direction of the first bottom-screen reflecting mirror 116 underneath the bottom screen 112. Thus, in the fifth embodiment, the front-screen reflecting mirror 114 is arranged in an odd number of units, and the bottom-screen reflecting mirrors 116 and 118 are arranged in an even number of units. Consequently, the front-screen reflecting mirror 114 only receives and reflects the front-screen right-eye image 142 (front-screen left-eye image), while the bottom-screen reflecting mirrors only receive and reflect the bottom-screen right-eye image 144 (bottom-screen left-eye image 144).

Figure 18:
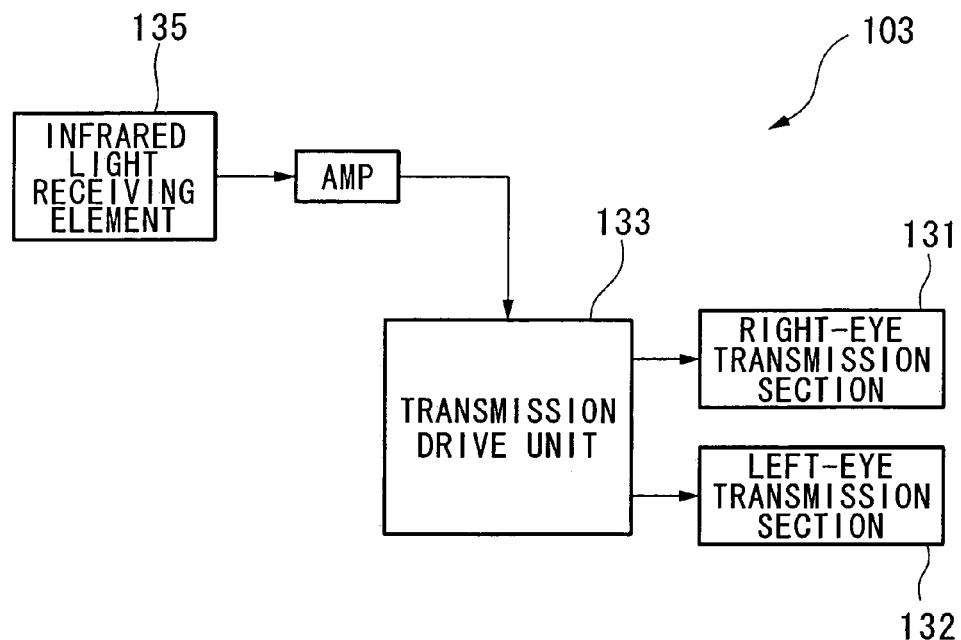
FIG. 18 is a view of a block diagram showing the functional configuration of the spectacles.

FIG. 18 is a block diagram showing the functional configuration of the spectacles 103. As shown in FIG. 13 and FIG. 18, the spectacles 103 are worn by the observer, and are provided with the right-eye transmission section 131, left-eye transmission section 132, infrared light-receiving optical element 135, and transmission drive unit 133.

The infrared light-receiving element 135 is installed at the front of the spectacles 103, receives the infrared light emitted from the infrared light-emitting LED 123 of the image display device 102, converts it to synchronous signals, and outputs it to the transmission drive unit 133. As the light emitting pattern and the like of the infrared light emitted from the image display unit 102 side differ according to the type of image, the waveform pattern of the synchronous signals that convert the infrared light on the spectacles side also differs according to the type of image.

The transmission drive unit 133 serves to drive the right-eye transmission section 131 and left-eye transmission section 132 composed of liquid crystal shutters, and is connected to the infrared light receiving element 135 via AMP (the amp). Based on the synchronous signals outputted by the light infrared light receiving element 135, the transmission drive unit 133 identifies whether the images projected onto screens 110 and 112 are right-eye images or left-eye images. Based on this identification information, the right-eye transmission section 131 is driven in the case where the synchronous signal pertains to a right-eye image, and the left-eye transmission section 132 is driven in the case where the synchronous signal pertains to a left-eye image.

A power supply source (such as a battery) that is not shown in the drawing is mounted on the spectacles 103, and this power supply source supplies power to the transmission drive unit 133.

Next, a description is provided regarding the operations of the stereoscopic image display device (display method) of the fifth embodiment.

First, when a plurality of image signals are inputted to the signal processor 121 from the outside, the signal processor 121 divides the plurality of image signals into, for example, frame units, and outputs them to the projector 124 with time-division.

Specifically, the signal processor 121 outputs right-eye image signals composed of a front-screen right-eye image signal and bottom-screen right-eye image signal to the projector 124, and subsequently outputs left-eye image signals composed of a front-screen left-eye image signal and bottom-screen left-eye image signal to the projector 124. In this manner, right-eye image signals and left-eye image signals are alternately (repetitively) outputted with time-division. In the fifth embodiment, as one image (right-eye image signal) is composed of a front-screen right-eye image signal (front-screen left-eye image signal) and bottom-screen right-eye image signal (bottom-screen left-eye image signal), the front-screen right-eye image signal (front-screen left-eye image signal) and bottom-screen right-eye image signal (bottom-screen left-eye image signal) are simultaneously outputted as one unit.

Right-eye image signals and left-eye image signals are alternately inputted to the projector 124 with time-division. Based on each inputted image signal, the projector 124 generates the images according to each image signal, and emits them. Below, a description is provided regarding the case where right-eye image signals are inputted to the projector 124.

First, as shown in FIG. 17 Part A, the projector 124 emits the front-screen right-eye image 142 generated in the same direction as the image front direction d1 of the front screen 110 shown in FIG. 14 Part A based on the front-screen right-eye image signal. Simultaneously, as shown in FIG. 17 Part A, the bottom-screen right-eye image 144 generated in a vertically inverted manner in the direction opposite to the image front direction d2 of the bottom screen 112 shown in FIG. 14 Part A based on the bottom-screen right-eye image signal, is emitted.

The front-screen right-eye image 142 emitted from the projector 124 is received by the front-screen reflecting mirror 114. The incoming front-screen right-eye image 142 is reflected by the front-screen reflecting mirror 114, and projected onto the front screen 110. As shown in FIG. 14 Part A, the image direction of the front-screen right-eye image 142 projected onto the front screen 110 conforms to the image direction of the front-screen right-eye image 142 emitted from the projector 124 shown in FIG. 17 Part A. Accordingly, the image direction of the front-screen right-eye image 142 projected onto the front screen 110 conforms to image front direction d1 of the front screen 110.

On the other hand, the bottom-screen right-eye image 144 emitted from the projector 124 is received by the first bottom-screen reflecting mirror 116. The incoming bottom-screen right-eye image 144 is reflected by the first bottom-screen reflecting mirror 116, is received by the second bottom-screen reflecting mirror 118, and is further reflected by the second bottom-screen reflecting mirror 118, and projected onto the bottom screen 112. As shown in FIG. 14 Part A, the image direction of the bottom-screen right-eye image 144 projected onto the bottom screen 112 is the reverse (vertical inversion) of the image direction of the bottom-screen right-eye image 144 emitted from the projector 124 shown in FIG. 17 Part A. Consequently, the image direction of the bottom-screen right-eye image 144 projected onto the bottom screen 112 conforms to image front direction d2 of the bottom screen 112.

In this manner, a continuous right-eye image 146 conforming to the image front directions d1 and d2 of the screens is projected onto the front screen 110 and bottom screen 112.

Subsequently, left-eye image signals are supplied to the projector 124. The projector 124 generates and emits the front-screen left-eye image 142 and bottom-screen left-eye image 144 shown in FIG. 17 Part B based on these image signals. Consequently, a continuous left-eye image 148 conforming to the image front directions d1 and d2 of the screens is displayed on the front screen 110 and bottom screen 112.

In this manner, right-eye images 146 and left-eye images 148 are alternately projected with time-division onto the front screen 110 and bottom screen 112, and parallax images composed of right-eye images 146 and left eye images 148 are formed.

In synchronization with the output of image signals to the projector 124, the signal processor 121 outputs drive signals for driving the infrared light emitting LED 123. The drive signals are composed of the two types of right-eye image signals and left-eye image signals.

Figure 19:
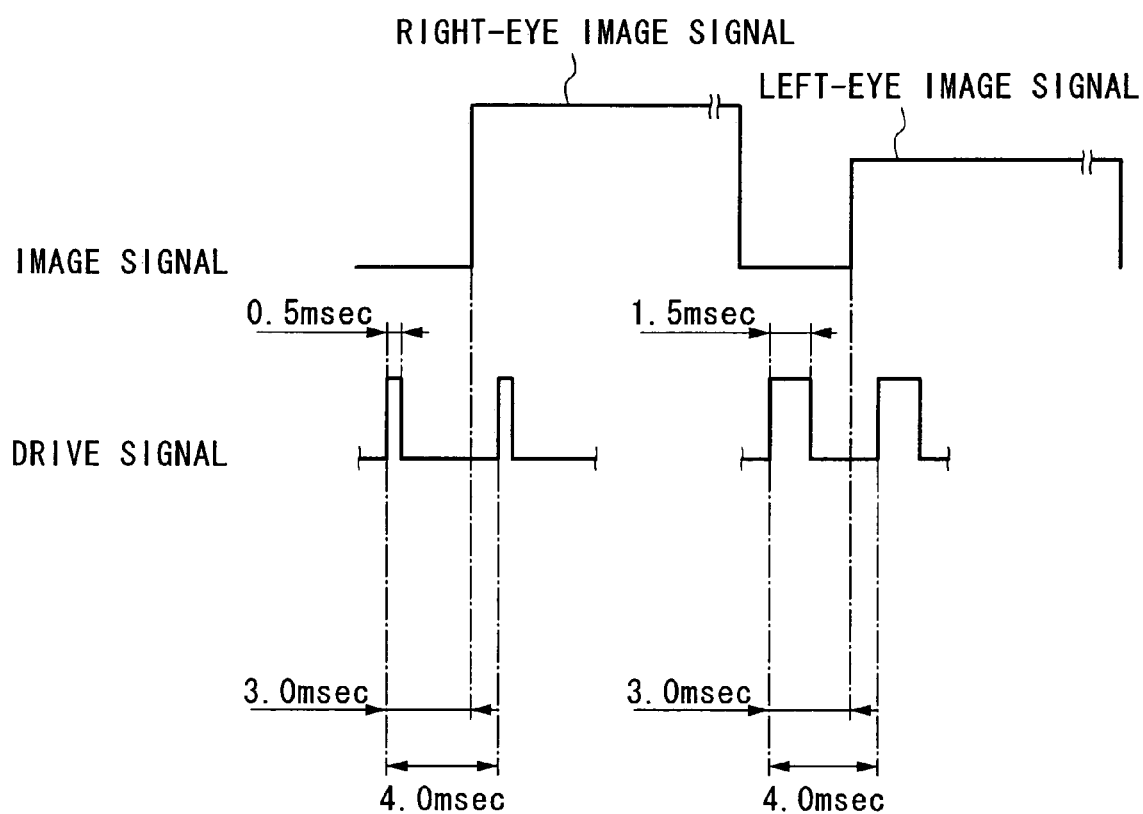
FIG. 19 is a view of explaining the waveform of the drive signals corresponding to the image signals.

FIG. 19 shows one example of drive signals outputted from the signal processor 121. The unit time of each drive signal is 4 msec. As shown in FIG. 19, in the case where, for example, the signal processor 121 outputs right-eye image signals (front-screen right-eye image and bottom-screen right-eye image) to the projector 124, a pulse signal with a pulse width of 0.5 msec is outputted once during the unit time. On the other hand, in the case where the signal processor 121 outputs left-eye image signals (front-screen left-eye image and bottom-screen left-eye image), a pulse signal with a pulse width of 1.5 msec is outputted once during the unit time.

Each drive signal is outputted from the signal processor 121 before the 3 msec in which the image signal corresponding to the respective drive signal is outputted from the signal processor 121. In this manner, synchronization of the output timing of the image signals and the output timing of the drive signals is arranged.

When the infrared light receiving element 135 receives the infrared light emitted from the aforementioned infrared light emitting LED 123, the spectacles 103 convert this infrared light to synchronous signals. These synchronous signals are outputted to the transmission drive unit 133 after being amplified by AMP (the amp). In the fifth embodiment, the synchronous signals outputted from the infrared light receiving element 135 are the same as the drive signals inputted to the infrared light emitting LED 123 of the image display device 102.

The transmission drive unit 133 drives the right-eye transmission section 131 and the left-eye transmission section 132 based on the various types of synchronous signals that are supplied. One example of a method for identifying right-eye image signals and left-eye image signals by the transmission drive unit 133 is described as follows.

In the case where right-eye images are projected onto the screens 110 and 112, pulse signals with a pulse width of 0.5 msec are inputted to the transmission drive unit 133 from the infrared light receiving element 135. At this time, as shown in FIG. 19, the signal voltage after 1 msec from the time of pulse signal input is Low, and the signal voltage after 2 msec from the time of pulse signal input is Low, whereby the transmission drive unit 133 recognizes that the right-eye image 146 is being projected onto the screens 110 and 112. On the other hand, in the case where a left-eye image is projected onto the screens 110 and 112, a pulse signal with a pulse width of 1.5 msec is inputted to the transmission drive unit 133 from the infrared light receiving element 135. At this time, as shown in FIG. 19, the signal voltage after 1 msec from the time of pulse signal input is High, and the signal voltage after 2 msec from the time of pulse signal input is Low, whereby the transmission drive unit 133 recognizes that the left-eye image 148 is being projected onto the screens 110 and 112.

After obtaining information as to the type of image projected onto the screens 110 and 112, the transmission drive unit 133 drives the right-eye transmission section 131 and left-eye transmission section 132 of the spectacles 103 so that the image light is transmitted.

Stated in more detail, in the case where the signal processor 121 on the image display device 102 side outputs image signals at a frequency of 80 Hz to the projector 124, the transmission drive unit 133 on the spectacles 103 side alternately switches the transmission parts of the spectacles 103 at the same frequency of 80 Hz in synchronization with this. For example, in the case where the transmission drive unit 133 of the spectacles 103 identifies the images projected onto the screens 110 and 112 as the right-eye image 146 from the synchronous signals, the right-eye transmission section 131 is driven so that the image light is transmitted. Consequently, the right-eye image 146 projected onto the screens 110 and 112 enters the right eye of the viewer. Subsequently, in the case where the transmission drive unit 133 of the liquid crystal shutter spectacles identifies the images projected onto the screens 110 and 112 as the left-eye image 148 from the synchronous signals, the left-eye transmission section 132 is driven so that the image light is transmitted. Consequently, the left-eye image 148 projected onto the screens 110 and 112 enters the left eye of the viewer.

Thus, in the fifth embodiment, when a right-eye image is projected onto the screens 110 and 112, the right-eye transmission section 131 of the spectacles 103 is synchronously driven, and when a left-eye image is projected onto the screens 110 and 112, the left-eye transmission section 132 of the spectacles 103 is synchronously driven.

As a result, as right-eye images 146 and left-eye images 148 are alternately substituted at high speed, the brain of the observer synthesizes the right-eye images 146 and left-eye images 148, forms parallax images, and perceives the images that are alternately projected onto the front screen 110 and bottom screen 112 as stereoscopic images.

In the fifth embodiment, the drive signal outputted from the signal processor 121 of the image display device 102 to the infrared light emitting LED 123 is outputted before the 3 msec in which the image signal outputted from the signal processor 121 to the projector 124 is outputted. Consequently, the signal indicating the reception result from the infrared light receiving element 135 is inputted to the transmission drive unit 133 before the 3 msec in which the image based on that image signal is displayed on the screens 110 and 112. Accordingly, preparation time is given to the transmission drive unit 133 in order to drive the right-eye transmission section 131 and the left-eye transmission section 132. In this manner, it is possible to completely synchronize the switching operation of the right-eye transmission section 131 and left-eye transmission section 132 with the timing of the projection of the right-eye image 146 or left-eye image 148 onto the screens 110 and 112.

In the fifth embodiment, the following relation exists with regard to the optical path length of the optical axis of each image from each projector to projection onto each screen.

The screen 122 shown in FIG. 15 is a virtual screen for the case where a right-eye image 146 emitted from the projector 124 is not refracted by a reflecting mirror, and proceeds directly to projection. In the fifth embodiment, the optical path length of the optical axis O of the front-screen right-eye image 142 that is emitted from the projector 124, reflected by the front-screen reflecting mirror 114, and projected onto the front screen 110, and the optical path length of the optical axis P of the bottom-screen right-eye image 144 that is emitted from the projector 124, reflected by the first bottom-screen reflecting mirror 116 and second bottom-screen reflecting mirror 118, and projected onto the bottom screen 112 are set so as to be identical to the optical path length of the virtual optical axis L. Accordingly, the optical path length of the optical axis O of the front-screen right-eye image 142 projected onto the front screen 110 is identical to the optical path length of the optical axis P of the bottom-screen right-eye image 144 projected onto the bottom screen 112.

In the fifth embodiment, the front-screen reflecting mirror 114, first bottom-screen reflecting mirror, second bottom-screen reflecting mirror, front screen 110 and bottom screen 112 are arranged at prescribed positions so that the optical-path length of the optical axis O of the front-screen right-eye image 142 and the optical path length of the optical axis P of the bottom-screen right-eye image 144 are identical.

With regard also to the optical path lengths of the optical axes of the front-screen left-eye image 142 and the bottom-screen left-eye image 144 of the left-eye image 148, the optical path lengths of the optical axes can be made identical as in the above-described case of the right-eye image 146. It is also possible to make the optical path lengths of the optical axes the right-eye image which is emitted from projector 124 and projected onto the screens, identical to the optical path lengths of the optical axes of the left-eye image which is emitted from projector 124 and projected onto the screens.

Figure 20:
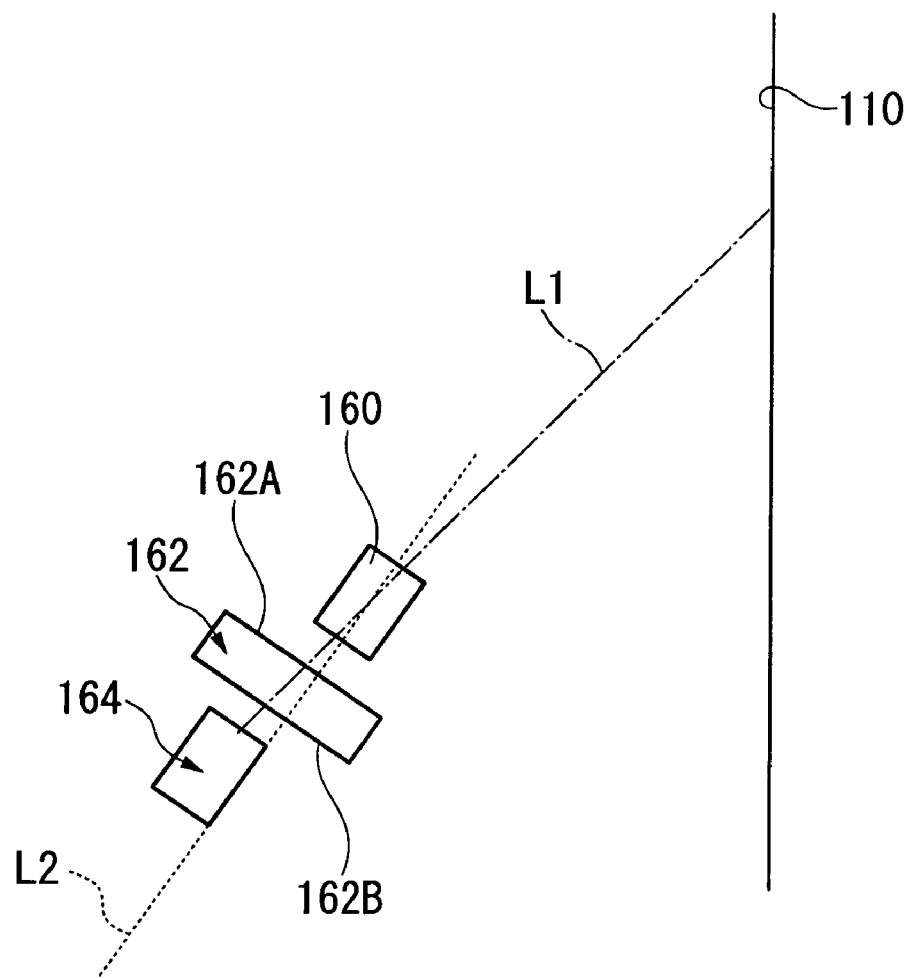
FIG. 20 is a view of principles of a shift optical system which corrects deflections projected onto a screen.

In the fifth embodiment, a thinner image display device is achieved by arranging the projector and the like so that the optical axes of the images emitted from the projector are in a non-vertical direction relative to the respective projection surfaces of each screen, and by projecting image light onto each screen from prescribed angles. However, in this case, distortions occur in the images projected onto each screen, because the image light is projected from a non-vertical direction relative to each screen. As a method for correcting this distortion, the method disclosed in Japanese Unexamined Patent Application, First Publication No. 2002-139794, may be adopted. FIG. 20 is a view that schematically shows the principles of a shift optical system that corrects this distortion. For example, in the case where the projector 124 is provided with a projection system (enlargement system) 160, a liquid crystal light valve 162 and a light source device 164, the light emission face 162A of the liquid crystal light valve 162 is arranged in the vertical direction relative to the optical axis L of the projection system 160. In addition, the light source device 164 is arranged so that the center axis (see optical path L1) of the light beam emitted from the liquid crystal light valve 162 and the optical axis L2 of the projection system 160 are askew. Consequently, the light (green light) is emitted from the light source device 164 in a non-vertical direction relative to the light incidence face 162B of the liquid crystal light valve 162. This type of method corrects the distortions projected onto each screen in the fifth embodiment.

It is also possible to correct the distortion of projected images by constructing an optical system (a so-called gate optical system) where the center axis of the light beam emitted from the liquid crystal light valve 162 conforms to the optical axis of the projection system 160, and the light emission face of the liquid crystal light valve 162 is arranged non-vertically relative to the optical axis of the projection system 160.

According to the fifth embodiment, the right-eye image 146 and left-eye image 148 emitted from the projector 124 are reflected by the reflecting section, and projected onto the front screen 110 and the bottom screen 112. In short, in the fifth embodiment, the images 146 and 148 emitted from the projector 124 are refracted (reflected) by the reflecting section, and projected onto the screens 110 and 112. Consequently, it is possible to narrow the projection space compared to the case where the images 146 and 148 are directly projected from the rear of the screens 110 and 112.

According to the fifth embodiment, it is also possible to project the images 146 and 148 emitted from the projector 124 onto the two screens 110 and 112 by a single projector 124, thereby enabling projection onto multiple screens by a single projector 124.

Furthermore, according to the fifth embodiment, the right-eye images 146 and left-eye images 148 are projected with time-division onto each screen 110 and 112, and parallax images composed of right-eye images 146 and left-eye images 148 are formed on each screen 110 and 112. The spectacles 103 are driven with time-division in synchronization with this, and right-eye images 146 and left-eye images 148 alternately enter the eyes of the viewer, where they are perceived as stereoscopic images.

Accordingly, according to the fifth embodiment, it is possible to achieve a thinner and more compact stereoscopic image display device, and to reduce costs.

In addition, according to the fifth embodiment, the optical path length of the optical axis of the right-eye images 146 (left-eye images 148) from the projector 124 to their projection onto the front screen 110 via the front-screen reflecting mirror and the optical path length of the optical axis of the right-eye images 146 (left-eye images 148) from the projector 124 to their projection onto the bottom screen 112 via the bottom-screen reflecting mirrors are optically equidistant, with the result that the focal points of the respective images projected onto the front screen 110 and bottom screen 112 are identical. Consequently, it is possible to prevent the right-eye images 146 (left-eye images 148) projected onto the two screens of the front screen 110 and bottom screen 112 from becoming out of focus.

Furthermore, according to the fifth embodiment, the optimal screen arrangement for the angle of visibility of the viewer is obtained by providing the two screens of the front screen 110 and bottom screen 112. Consequently, it is possible to reproduce a natural three-dimensional sense, and to realize stereoscopic images imparting a sense of presence.

Furthermore, in the stereoscopic image display device 101 of the fifth embodiment, the front-screen reflecting mirror 114 is arranged in an odd number of units, and the bottom-screen reflecting mirrors 116 and 118 are arranged in an even number of units, with the result that the front-screen right-eye image 142 (front-screen left-eye image) is reflected an odd number of times, and the bottom-screen right-eye image 144 (bottom-screen left-eye image) is reflected an even number of times, and respectively projected onto each screen 110 and 112. Accordingly, in the fifth embodiment, the bottom-screen right-eye image 144 (bottom-screen left-eye image) emitted from the projector 124 is vertically inverted in advance, and emitted. Consequently, the front-screen right-eye image 142 (front-screen left-eye image) and the bottom-screen right-eye image 144 (bottom-screen left-eye image) of the same direction are synthesized and projected, and a continuous right-eye image 146 (left-eye image) is formed on the front screen 110 and the bottom screen 112.

Sixth Embodiment

A sixth embodiment is described below with reference to drawings.

In the foregoing embodiment, the front-screen image is reflected once by a reflecting mirror, and projected onto the front screen, and the bottom-screen image is reflected twice by reflecting mirrors, and projected onto the bottom screen. In contrast, the sixth embodiment differs in the point that the bottom-screen image is reflected three times, and projected onto the bottom screen. As the remaining basic configuration of the stereoscopic image display device is the same as that of the aforementioned fifth embodiment, shared components are given the same code numbers, and detailed explanation thereof is omitted. Moreover, the front-screen right-eye image and front-screen left-eye image are referred to as the front-screen image, while the bottom-screen right-eye image and bottom-screen left-eye image are referred to as the bottom-screen image.

Figure 21:
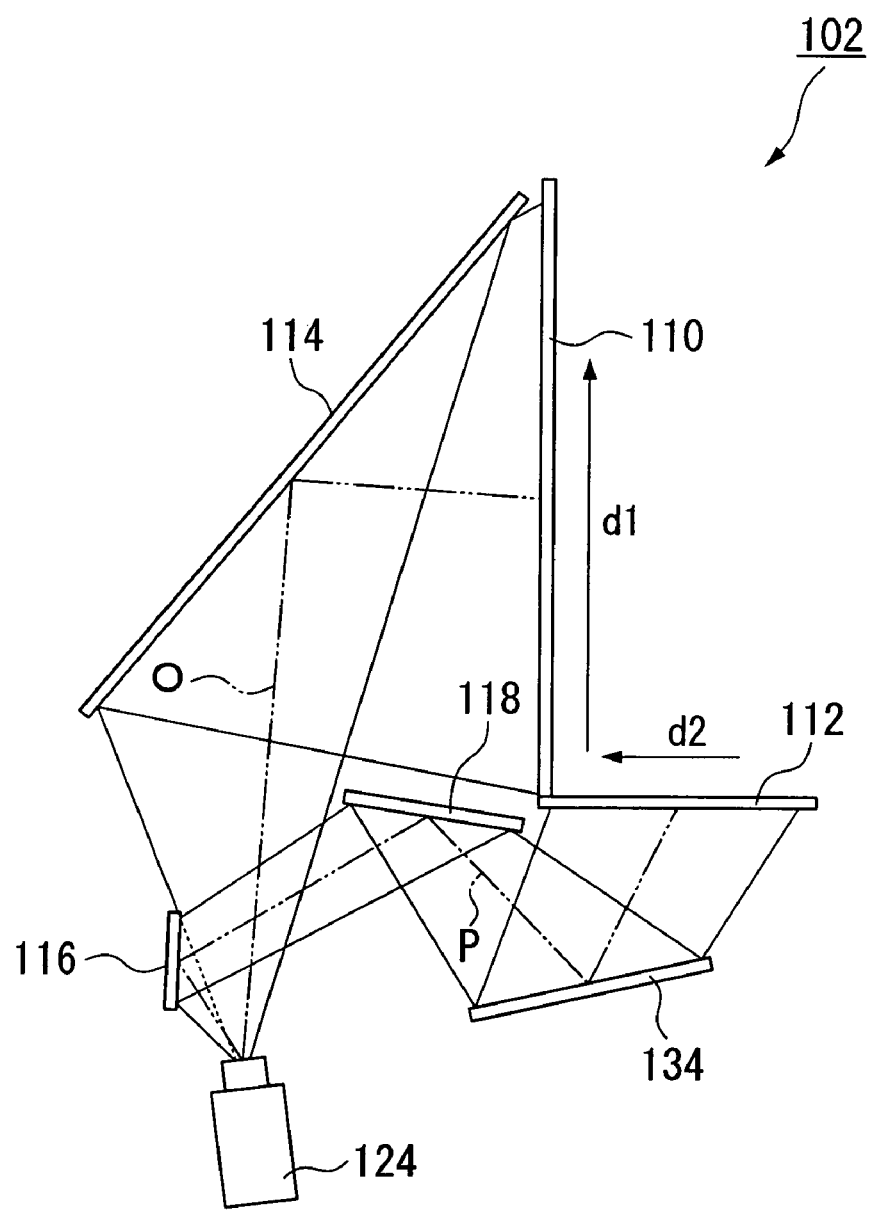
FIG. 21 is a cross-sectional view of the schematic configuration of the image display device pertaining to the sixth embodiment.
Figure 22:
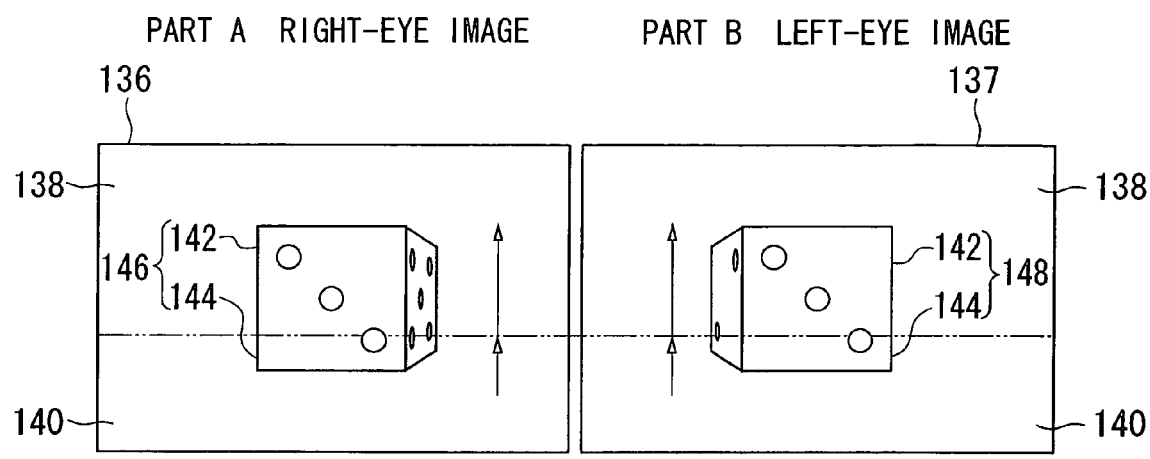
FIG. 22 is a plan view of a display region of a liquid crystal light valve of the image display device pertaining to the sixth embodiment.
Figure 23:
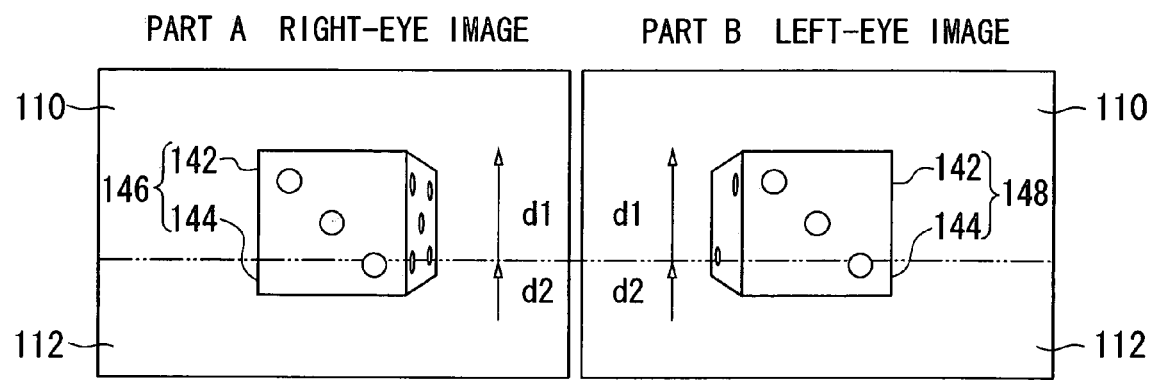
FIG. 23 is a view of images projected onto the screens of the image display device pertaining to the sixth embodiment.

FIG. 21 is a cross-sectional view of a typical schematic configuration of the image display device 102 of the sixth embodiment. FIG. 22 Part A and FIG. 22 Part B are typical plan views respectively showing the display region 136 that displays the right-eye image 146, and the display region 137 that displays the left-eye image 148. FIG. 23 Part A and Part B are typical plan views respectively showing the front screen 110 and bottom screen 112 of the sixth embodiment.

As shown in FIG. 21, the first bottom-screen reflecting mirror 116 is arranged in the emission direction of the bottom-screen image 144. The second bottom-screen reflecting mirror 118 is arranged in the reflection direction of the first bottom-screen reflecting mirror 116. Furthermore, the third bottom-screen reflecting mirror 134 (second reflecting section) is arranged in the reflection direction of the second bottom-screen reflecting mirror 118 underneath the bottom screen 112. In short, in the sixth embodiment, the front-screen reflecting mirror 114 is arranged in an odd number of units, and the bottom-screen reflecting mirrors 116, 118 and 134 are arranged in an odd number of units.

Next, the operations are described where a right-eye image 146 is emitted from the projector 124, and projected onto the front screen 110 and bottom screen 112. As the left-eye image 148 follows the same operations as the right-eye image 146, description thereof is omitted.

As shown in FIG. 22 Part A, the projector 124 emits the front-screen image 142 generated in the same direction as image front direction d1 of the front screen 110, and the bottom-screen image 144 generated in the same direction as image front direction d2 of the bottom screen 112.

The front-screen image 142 emitted from the projector 124 is received by the front-screen reflecting mirror 114. The incoming front-screen image 142 is reflected by the front-screen reflecting mirror 114, and projected onto the front screen 110.

As shown in FIG. 23 Part A, the image direction of the front-screen image 142 projected onto the front screen 110 conforms to the image direction of the front-screen image 142 emitted from the projector 124 shown in FIG. 22 Part A. Accordingly, the image direction of the front-screen image 142 projected onto the front screen 110 conforms to image front direction d1 of the front screen 110.

The bottom-screen image 144 emitted from the projector 124 is received by the first bottom-screen reflecting mirror 116. The incoming bottom-screen image 144 is reflected by the first bottom-screen reflecting mirror 116, and is received by the second bottom-screen reflecting mirror 118. The incoming bottom-screen image 144 is reflected by the second bottom-screen reflecting mirror 118 and by the third bottom-screen reflecting mirror 134, and is projected onto the bottom screen 112. As shown in FIG. 23 Part A, the image direction of the bottom-screen image 144 projected onto the bottom screen 112 conforms to the image direction of the bottom-screen image 144 emitted from the projector 124 shown in FIG. 22 Part A. Accordingly, the image direction of the bottom-screen image 144 projected onto the bottom screen 112 conforms to image front direction d2 of the bottom screen 112. In this manner, a continuous image 146 that conforms to image front directions d1 and d2 of the screens is projected onto the front screen 110 and bottom screen 112.

With regard to the sixth embodiment, the same operative effects may be cited as the foregoing embodiments. In short, it is possible to narrow the projection space used for the plurality of refractions by reflecting mirrors of the images emitted from the projector and for their projection onto the screens 110 and 112. Accordingly, it is possible to achieve a thinner and more compact stereoscopic image display device 101, and to reduce costs.

Furthermore, in the stereoscopic image display device 101 of the sixth embodiment, the front-screen reflecting mirror 114 is arranged in an odd number of units, and the bottom-screen reflecting mirrors 116, 118 and 134 are arranged in an odd number of units, with the result that the front-screen right-eye image 142 (front-screen left-eye image) is reflected an odd number of times, and the bottom-screen right-eye image 144 (bottom-screen left-eye image) is reflected an odd number of times, and respectively projected onto each screen 110 and 112. Accordingly, in the sixth embodiment, the front-screen right-eye image 142 (front-screen left-eye image) and the bottom-screen right-eye image 144 (bottom-screen left-eye image) emitted from the projector 124 are emitted in the same image direction. Consequently, the front-screen right-eye image 142 (front-screen left-eye image) and the bottom-screen right-eye image 144 (bottom-screen left-eye image) of the same direction are synthesized and projected, and a continuous right-eye image 146 (left-eye image) is formed on the front screen 110 and the bottom screen 112.

Seventh Embodiment

A seventh embodiment is described below with reference to drawings.

In the foregoing first embodiment, the foregoing second embodiment, and the foregoing fifth embodiment, the front-screen image was reflected once by the reflecting mirror, and projected onto the front screen, while the bottom-screen image was reflected twice by reflecting mirrors, and projected onto the bottom screen. In contrast, the seventh embodiment differs in that the front-screen image is reflected twice by reflecting mirrors, and projected onto the front screen, while the bottom-screen image is reflected three times, and projected onto the bottom screen. As the remaining basic configuration of the stereoscopic image display device is the same as that of the aforementioned fifth embodiment, shared components are given the same code numbers, and detailed explanation thereof is omitted. Moreover, the front-screen right-eye image and front-screen left-eye image are referred to as the front-screen image, while the bottom-screen right-eye image and bottom-screen left-eye image are referred to as the bottom-screen image.

Figure 24:
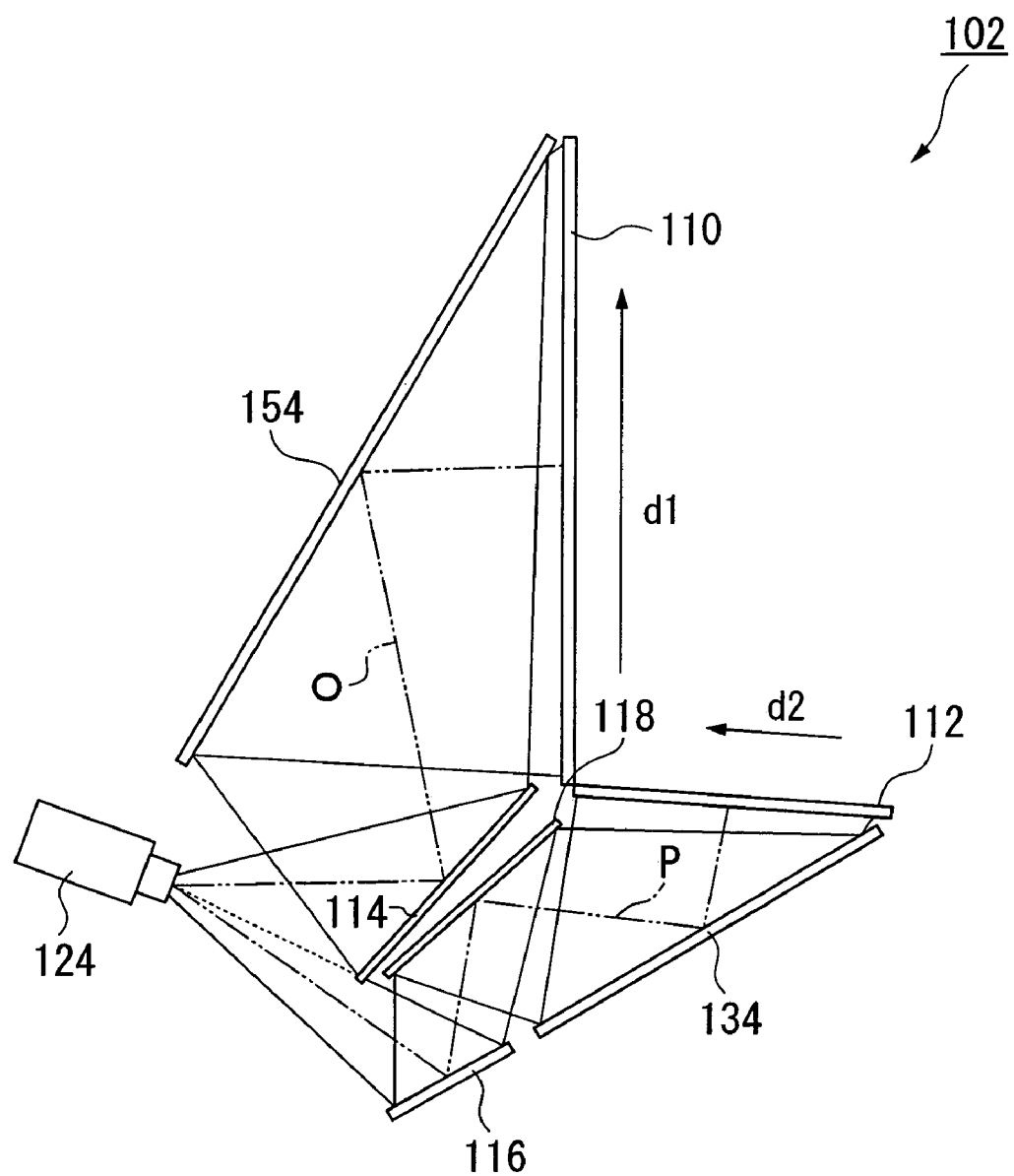
FIG. 24 is a cross-sectional view of the schematic configuration of the image display device pertaining to the seventh embodiment.
Figure 25:
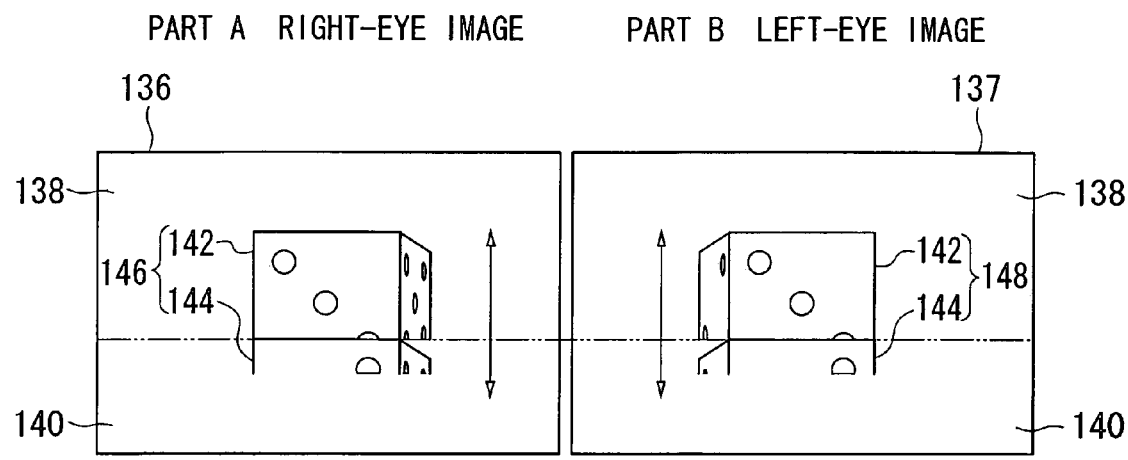
FIG. 25 is a plan view of a display region of a liquid crystal light valve of the image display device pertaining to the seventh embodiment.
Figure 26:
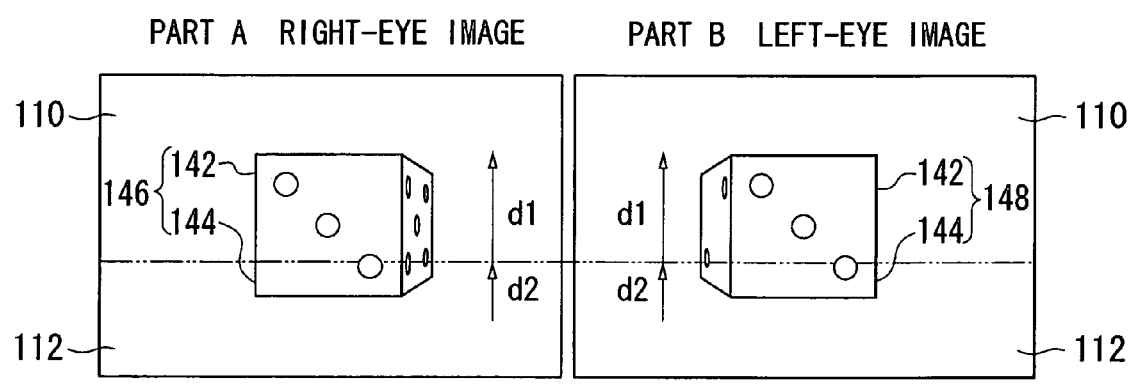
FIG. 26 is a view of images projected onto the screens of the image display device pertaining to the seventh embodiment.

FIG. 24 is a cross-sectional view of a typical schematic configuration of the image display device 102 of the seventh embodiment. FIG. 25 Part A and FIG. 25 Part B are typical plan views respectively showing the display region 136 that displays the right-eye image 146, and the display region 137 that displays the left-eye image 148. FIG. 26 Part A and Part B are typical plan views respectively showing the front screen 110 and bottom screen 112 of the seventh embodiment.

As shown in FIG. 24, the first front-screen reflecting mirror 114 (first reflecting section) is arranged in the emission direction of the front-screen image 142. The second front-screen reflecting mirror 154 (first reflecting section) is arranged in the reflection direction of the first front-screen reflecting mirror 114 behind the front screen 110. The first bottom-screen reflecting mirror 116 is arranged in the emission direction of the bottom-screen image 144. The second bottom-screen reflecting mirror 118 is arranged in the reflection direction of the first bottom-screen reflecting mirror 116. Furthermore, the third bottom-screen reflecting mirror 134 is arranged in the reflection direction of the second bottom-screen reflecting mirror 118 underneath the bottom screen 112. In short, in the seventh embodiment, the front-screen reflecting mirrors 114 and 154 are arranged in an even number of units, and the bottom-screen reflecting mirrors 116, 118 and 134 are arranged in an odd number of units.

Next, the operations are described where a right-eye image 146 is emitted from the projector 124, and projected onto the front screen 110 and bottom screen 112. As the left-eye image 148 follows the same operations as the right-eye image 146, description thereof is omitted.

As shown in FIG. 25 Part A, the projector 124 emits the front-screen image 142 generated in the same direction as the image front direction d1 of the front screen 110. On the other hand, as shown in FIG. 25 Part A, the projector 124 emits the bottom-screen image 144 generated in a vertically inverted manner in the direction opposite to the image front direction d2 of the bottom screen 112.

The front-screen image 142 emitted from the projector 124 is received by the front-screen reflecting mirror 114. The incoming front-screen image 142 is reflected by the first front-screen reflecting mirror 114 and the second front-screen reflecting mirror 154, and is projected onto the front screen 110. As shown in FIG. 26 Part A, the image direction of the front-screen image 142 projected onto the front screen 110 conforms to the image direction of the front-screen image 142 emitted from the projector 24 shown in FIG. 25 Part A. Accordingly, the image direction of the front-screen image 142 projected onto the front screen 110 conforms to the image front direction d1 of the front screen 110.

Moreover, the bottom-screen image 144 emitted from the projector 124 is received by the first bottom-screen reflecting mirror 116. The incoming bottom-screen image 144 is reflected by the first bottom-screen reflecting mirror 16, and is received by the second bottom-screen reflecting mirror 118. The incoming bottom-screen image 144 is reflected by the second bottom-screen reflecting mirror 118 and by the third bottom-screen reflecting mirror 134, and is projected onto the bottom screen 112. As shown in FIG. 26 Part A, the image direction of the bottom-screen image 144 projected onto the bottom screen 112 is the reverse (vertical inversion) of the image direction of the bottom-screen image 144 emitted from the projector 124 shown in FIG. 25 Part A. Consequently, the image direction of the bottom-screen image 144 projected onto the bottom screen 112 conforms to the image front direction d2 of the bottom screen 112. In this manner, a continuous image 146 that conforms to image front directions d1 and d2 of the screens is projected onto the front screen 110 and bottom screen 112.

With regard to the seventh embodiment, the same operative effects may be cited as the foregoing embodiments. In short, it is possible to narrow the projection space used for the plurality of refractions by reflecting mirrors of the images emitted from the projector 124 and for their projection onto the screens 110 and 112. Accordingly, it is possible to achieve a thinner and more compact stereoscopic image display device 101, and to reduce costs.

Furthermore, in the stereoscopic image display device 101 of the seventh embodiment, the front-screen reflecting mirrors 114 and 154 are arranged in an even number of units, and the bottom-screen reflecting mirrors 116, 118 and 134 are arranged in an odd number of units, with the result that the front-screen right-eye image 142 (front-screen left-eye image) is reflected an even number of times, and the bottom-screen right-eye image 144 (bottom-screen left-eye image) is reflected an odd number of times, and respectively projected onto each screen 110 and 112. Accordingly, in the seventh embodiment, the bottom-screen right-eye image 144 (bottom-screen left-eye image) emitted from the projector 124 is vertically inverted in advance, and emitted. Consequently, the front-screen right-eye image 142 (front-screen left-eye image) and the bottom-screen right-eye image 144 (bottom-screen left-eye image) of the same direction are synthesized and projected, and a continuous right-eye image 146 (left-eye image) is formed on the front screen 110 and the bottom screen 112.

Eighth Embodiment

Figure 27:
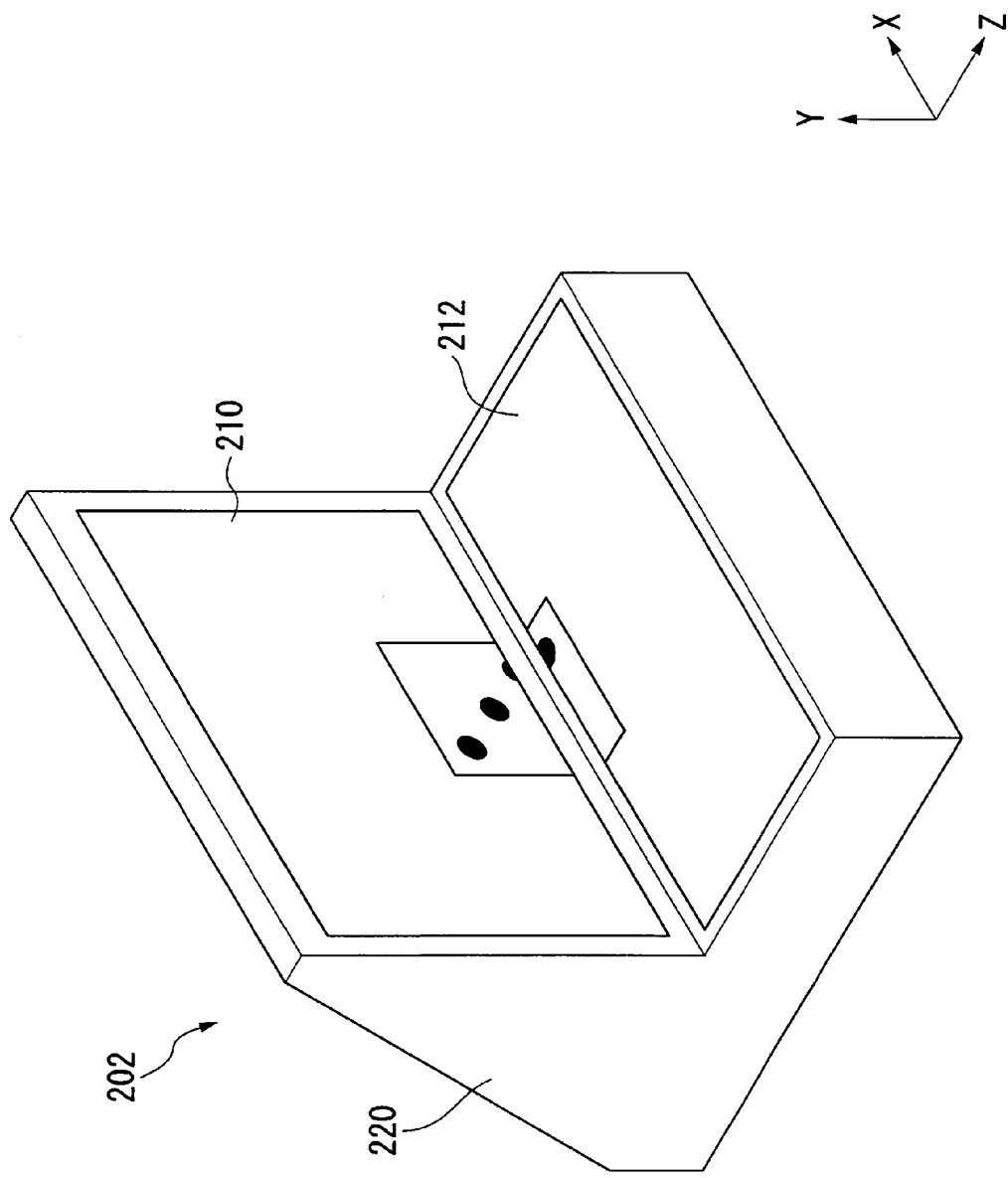
FIG. 27 is a perspective view of the schematic configuration of an image display device.

FIG. 27 is a perspective view of the schematic configuration of an image display device 202 pertaining to the eighth embodiment. As shown in FIG. 27, the image display device 202 pertaining to the eighth embodiment is composed of the screens 210 and 212 onto which the images are projected, and the case 220 provided on the rear side of the screens 210 and 212.

As shown in FIG. 27, the screens 210 and 212 consist of a front screen 210 (first screen) arranged in front of the viewer, and a bottom screen 212 (second screen) arranged on the bottom side of the viewer. The bottom screen 212 extends toward the viewer from the lower end of the front screen 210, whereby a continuous integrated screen is formed by the front screen 210 and the bottom screen 212.

FIG. 29 is a view for the case where the front screen 210 and bottom screen 212 are seen from the viewer side. As shown in FIG. 29, a front-screen image 242 is projected onto the front screen 210, while a bottom-screen image 244 is projected onto the bottom screen 212. A continuous image 247 is formed by the front-screen image 242 and bottom-screen image 244. The direction of the arrow marks shown on the front screen 210 in FIG. 29 is the direction in which the images are frontal when the viewer views the images, and this arrow-mark direction is referred to as image front direction d1 in the eighth embodiment. Similarly, the arrow-mark direction of the bottom screen 212 is referred to as image front direction d2.

Figure 28:
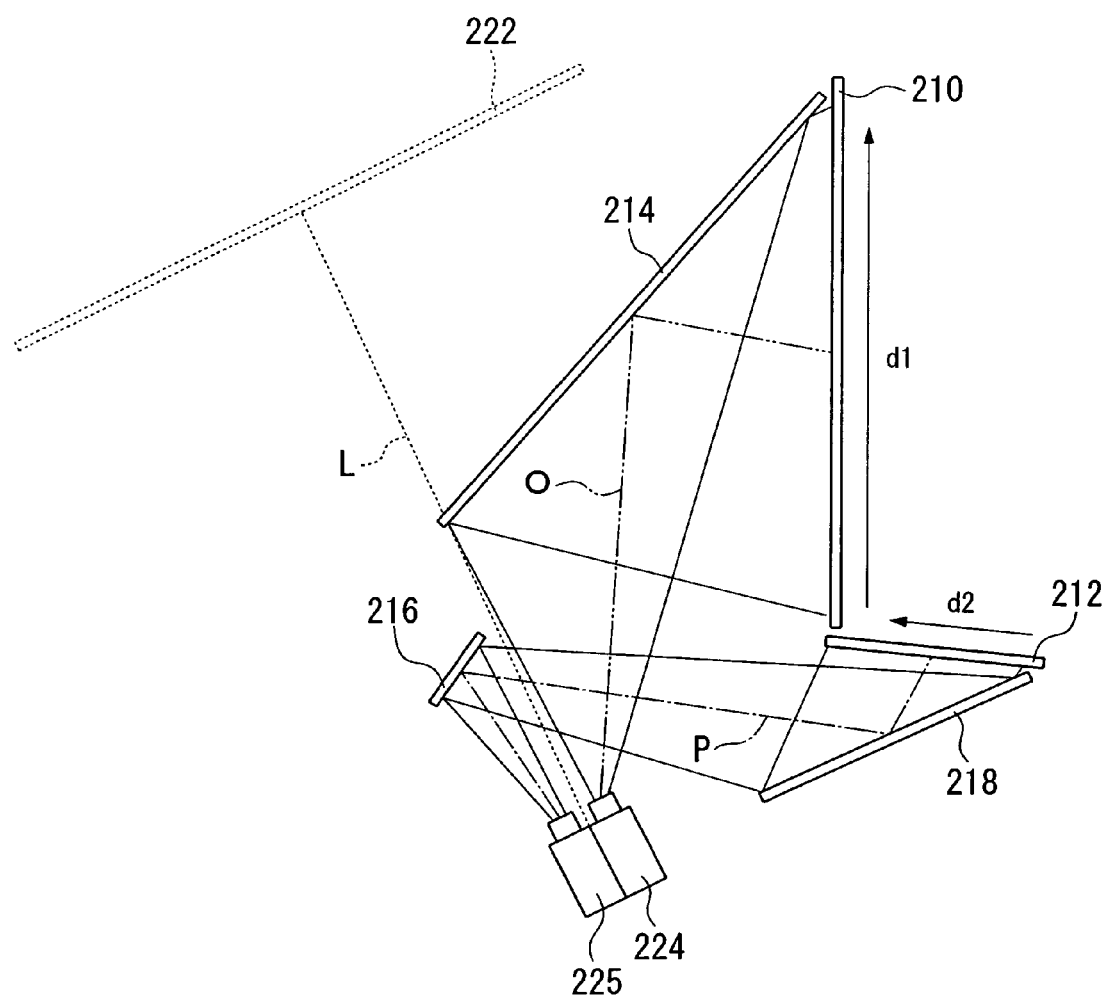
FIG. 28 is a cross-sectional view of the schematic configuration of the image display device pertaining to the eighth embodiment.

FIG. 28 is a cross-sectional view of a typical schematic configuration of the interior of the case 220 of the image display device 202.

The interior of the case 220 of the image display device 202 is provided with a front-screen projector 224 and bottom-screen projector 225 for generating images for projection onto the screens, and with a front-screen reflecting mirror 214 (first reflecting section), a first bottom-screen reflecting mirror 216 (second reflecting section) and a second bottom-screen reflecting mirror 218 (second reflecting section) for reflecting the generated images and guiding them in the direction of the screens.

The front-screen projector 224 is a projector for generating and emitting images for projection onto the front screen, and the bottom-screen projector 225 is a projector for generating and emitting images for projection onto the bottom screen. As shown in FIG. 28, the front-screen projector 224 and bottom-screen projector 225 are arranged at the bottom rear inside the case 220 so that their respective emission sides are inclined at the prescribed angle relative to the projection surfaces. As the front-screen projector 224 and bottom-screen projector 225, a 3-panel (3-LCD system) liquid crystal projector is used which employs three liquid crystal light valves as the optical modulation elements. With this method, a dichroic mirror transmits only light of the specified wavelength from the light emitted by a light source, and splits it into R (red), G (green) and B (blue); the light that has passed through the respective light valve is synthesized with a dichroic prism, and is then projected onto the screen. It is also possible to use a single-panel liquid crystal projector employing a single liquid crystal light valve as the optical modulation element, or a projector employing a micro-mirror array device as the optical modulation element.

FIG. 30 Part A and FIG. 30 Part B are typical plan views showing the display region 236 of a liquid crystal light valve of the front-screen projector 224, and the display region 237 of a liquid crystal light valve of the bottom-screen projector 225. The images displayed in these display regions are respectively emitted from each projector 224 and 225. In the eighth embodiment, a front-screen image is emitted from the display region 236 of the front-screen projector 224, and a bottom-screen image is emitted from the display region 237 of the bottom-screen projector 225. Consequently, the front-screen projector 224 and bottom-screen projector 225 emit respectively independent images, and one continuous image is formed on the screens.

In the eighth embodiment, as shown in FIG. 29 and FIG. 30, the top and bottom of the front screen 210 respectively correspond to the top and bottom of the front-screen display region 236. Moreover, the viewer side (front side) and the opposite side facing away from the viewer (back side) of the bottom screen 212 correspond to the top and bottom of the bottom-screen display region 237. The directional arrows shown in FIG. 29 and FIG. 30 also correspond to this.

Returning to FIG. 28, the front-screen reflecting mirror 214 is arranged in the emission direction of the front-screen image at the rear side of the front screen 210. The first bottom-screen reflecting mirror 216 is arranged in the emission direction of the bottom-screen image. The second bottom-screen reflecting mirror 218 is arranged in the reflection direction of the first bottom-screen reflecting mirror 216 underneath the bottom screen 212. Thus, in the eighth embodiment, the front-screen reflecting mirror 214 is arranged in an odd number of units, and the bottom-screen reflecting mirrors 216 and 218 are arranged in an even number of units. Consequently, the front-screen reflecting mirror 214 only receives and reflects the front-screen image 242, while the bottom-screen reflecting mirrors only receive and reflect the bottom-screen image 244.

Next, a description is provided regarding the operations where images emitted from each projector 224 and 225 are projected onto the screens 210 and 212.

First, as shown in FIG. 30 Part A, the front-screen projector 224 emits the front-screen image 242 generated in the same direction as the image front direction d1 of the front screen 210 shown in FIG. 29. On the other hand, as shown in FIG. 30 Part B, the bottom-screen projector 225 emits the bottom-screen image 244 generated in a vertically inverted manner relative to the image front direction d2 of the bottom screen 212 shown in FIG. 29.

The front-screen image 242 emitted from the front-screen image projector 224 is received by the front-screen reflecting mirror 214. The incoming front-screen image 242 is reflected by the front-screen reflecting mirror 214, and projected onto the front screen 210. As shown in FIG. 29, the image direction of the front-screen image 242 projected onto the front screen 210 conforms to the image direction of the front-screen image 242 emitted from the front-screen projector 224 shown in FIG. 30 Part A. Accordingly, the direction of the front-screen image 242 projected onto the front screen 210 conforms to image front direction d1 of the front screen 210.

On the other hand, the bottom-screen image 244 emitted from the bottom-screen projector 225 is received by the first bottom-screen reflecting mirror 216. The incoming bottom-screen image 244 is reflected by the first bottom-screen reflecting mirror 216, is received by the second bottom-screen reflecting mirror 218, is further reflected by the second bottom-screen reflecting mirror 218, and is projected onto the bottom screen 212. As shown in FIG. 29, the image direction of the bottom-screen image 244 projected onto the bottom screen 212 is the reverse (vertical inversion) of the image direction of the bottom-screen image 244 emitted from the bottom-screen projector 225 shown in FIG. 30 Part B. Consequently, the image direction of the bottom-screen image 244 projected onto the bottom screen 212 conforms to image front direction d2 of the bottom screen 212.

In this manner, a continuous image 247 conforming to the image front directions of the screens is displayed on the front screen 210 and bottom screen 212.

In the eighth embodiment, the following relation exists with regard to the optical path length of the optical axis of each image from each projector to projection onto the respective screen.

The screen 222 shown in FIG. 28 is a virtual screen for the case where a front-screen image 242 emitted from the front-screen projector 224 is not refracted by a reflecting mirror, and proceeds directly to projection. In the eighth embodiment, the optical path length of the optical axis O of the front-screen image 242 that is emitted from the front-screen projector 224, reflected by the front-screen reflecting mirror 214, and projected onto the front screen 210, and the optical path length of the optical axis P of the bottom-screen image 244 that is emitted from the front-screen projector 224, reflected by the first bottom-screen reflecting mirror 216 and second bottom-screen reflecting mirror 218, and projected onto the bottom screen 212 are set so as to be identical to the optical path length of the virtual optical axis L. Accordingly, the optical path length of the optical axis O of the front-screen image 242 projected onto the front screen 210 is identical to the optical path length of the optical axis P of the bottom-screen image 244 projected onto the bottom screen 212.

In the eighth embodiment, the front-screen reflecting mirror 214, first bottom-screen reflecting mirror 216, second bottom-screen reflecting mirror 218, front screen 210 and bottom screen 212 are arranged at prescribed positions so that the optical path length of the optical axis O of the front-screen image 242 and the optical path length of the optical axis P of the bottom-screen image 244 are identical.

Figure 31:
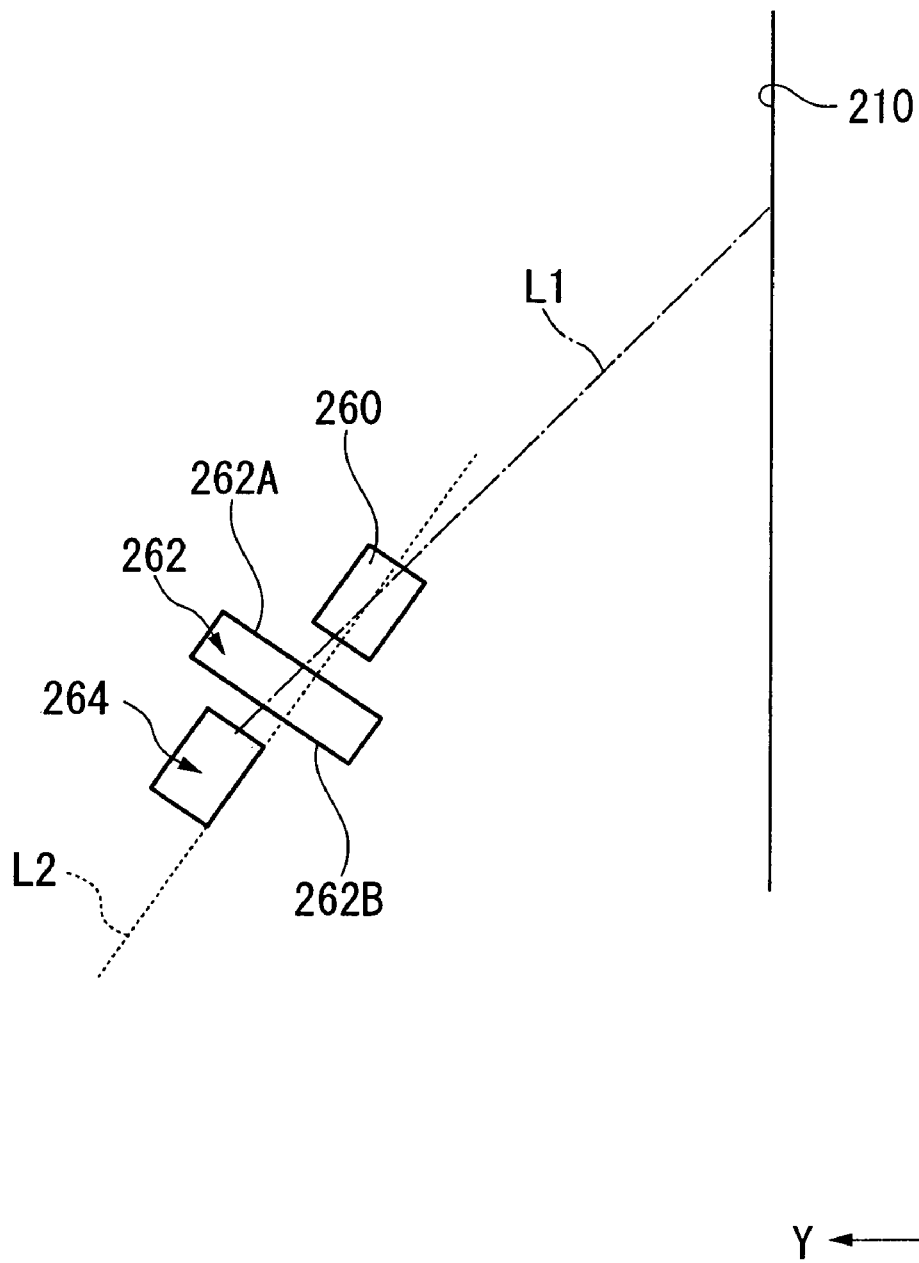
FIG. 31 is a view of principles of a shift optical system which corrects deflections projected onto a screen.

In the eighth embodiment, a thinner image display device is achieved by arranging the projectors and the like so that the optical axes of the images emitted from the projectors are in a non-vertical direction relative to the respective projection surfaces of each screen, and by projecting the image light onto each screen from prescribed angles. However, in this case, distortions occur in the images projected onto each screen, because the image light is projected from a non-vertical direction relative to each screen. As a method for correcting this distortion, the method disclosed in Japanese Unexamined Patent Application, First Publication No. 2002-139794, may be adopted. FIG. 31 is a drawing that simplifies the principles of the shift optical system that corrects the deflection projected onto the screens. For example, in the case where the front-screen projector 224 is provided with a projection system 260 (enlargement system), a liquid crystal light valve 262 and a light source device 264, the light emission face 262A of the liquid crystal light valve 262 is arranged in the vertical direction relative to optical axis L2 of the projection system 260. In addition, the light source device 264 is arranged so that the center axis (see optical path L1) of the light beam emitted from the liquid crystal light valve 262 and the optical axis L2 of the projection system 260 are askew. Consequently, light (green light) is emitted from the light source device 264 in a non-vertical direction relative to light incidence face 262B of the liquid crystal light valve 262. This type of method corrects the deflections projected onto each screen in the eighth embodiment.

It is also possible to correct the distortion of projected images by constructing an optical system (a so-called gate optical system) where the center axis of the light beam emitted from the liquid crystal light valve 262 conforms to the optical axis of the projection system 260, and the light emission face of the liquid crystal light valve 262 is arranged non-vertically relative to the optical axis of the projection system 260.

According to the eighth embodiment, the front-screen image 242 emitted from the front-screen projector 224 and the bottom-screen image 244 emitted from the bottom-screen projector 225 are reflected by the reflecting mirrors, and projected onto the front screen 210 and bottom screen 212. In short, in the eighth embodiment, the image is refracted (reflected) by the reflecting mirrors, and projected onto the screens. Consequently, it is possible to narrow the projection space compared to the case where the images are directly projected from the rear of the screens. Accordingly, it is possible to achieve a thinner and more compact image display device 202, and to reduce costs.

In addition, according to the eighth embodiment, the optical path length of the optical axis of the front-screen images 242 from the front-screen projector 224 to their projection onto the front screen 210 via the front-screen reflecting mirror, and the optical path length of the optical axis of the bottom-screen images 244 from the bottom-screen projector 225 to their projection onto the bottom screen 212 via the bottom-screen reflecting mirrors are optically equidistant, with the result that the focal points of the respective images projected onto the front screen 210 and the bottom screen 212 are identical. Consequently, it is possible to prevent the front-screen images 242 and bottom-screen images 244 projected onto the two screens of the front screen 210 and bottom screen 212 from becoming out of focus.

Furthermore, according to the eighth embodiment, the optimal screen arrangement for the angle of visibility of the viewer is obtained by providing the two screens of the front screen 210 and bottom screen 212. Consequently, it is possible to realize natural images imparting a sense of presence.

Furthermore, in the image display device 202 of the eighth embodiment, the front-screen reflecting mirror 214 is arranged in an odd number of units, and the bottom-screen reflecting mirrors 216 and 218 are arranged in an even number of units, with the result that the front-screen image 242 is reflected an odd number of times, and the bottom-screen image 244 is reflected an even number of times, and respectively projected onto each screen 210 and 212. Accordingly, in the eighth embodiment, the bottom-screen image 244 emitted from the bottom-screen projector 225 is vertically inverted in advance, and emitted. Consequently, the front-screen image 242 and the bottom-screen image 244 of the same direction are synthesized and projected, and a continuous 247 is formed on the front screen 210 and bottom screen 212.

Ninth Embodiment

A ninth embodiment is described below with reference to drawings.

In the foregoing embodiment, the front-screen image was reflected once by the reflecting mirror, and projected onto the front screen, while the bottom-screen image was reflected twice by reflecting mirrors, and projected onto the bottom screen. In contrast, the ninth embodiment differs in that the bottom-screen image is reflected three times, and projected onto the bottom screen. As the remaining basic configuration of the stereoscopic image display device is the same as that of the aforementioned eighth embodiment, shared components are given the same code numbers, and detailed explanation thereof is omitted.

Figure 32:
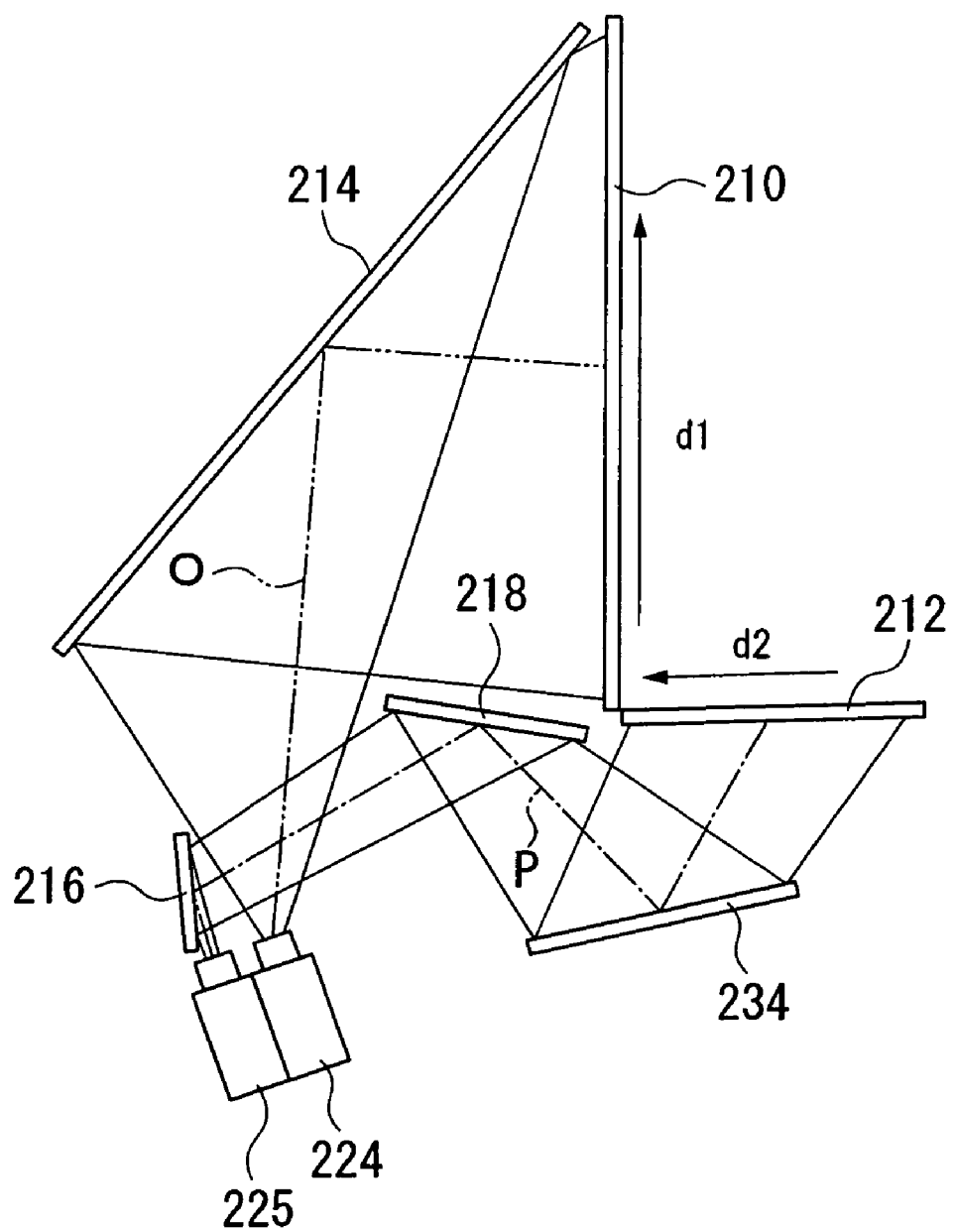
FIG. 32 is a cross-sectional view of the schematic configuration of the image display device pertaining to the ninth embodiment.

FIG. 32 is a cross-sectional view of a typical schematic configuration of the image display device 202 of the ninth embodiment. FIG. 33 Part A and Part B are typical plan views respectively showing the display region 236 of a liquid crystal light valve of the front-screen projector 224, and the display region 237 of a liquid crystal light valve of the bottom-screen projector 225. FIG. 34 is a view for the case where the front screen 210 and bottom screen 212 are viewed from the viewer side.

As shown in FIG. 32, the first bottom-screen reflecting mirror 216 is arranged in the emission direction of the bottom-screen image 244. The second bottom-screen reflecting mirror 218 is arranged in the reflection direction of the first bottom-screen reflecting mirror 216. Furthermore, the third bottom-screen reflecting mirror 234 (second reflecting section) is arranged in the reflection direction of the second bottom-screen reflecting mirror 218 underneath the bottom screen 212. The arrangement of the front-screen reflecting mirror 214 is the same as in the aforementioned eighth embodiment. Consequently, in the ninth embodiment, the front-screen reflecting mirror 214 is arranged in an odd number of units, and the bottom-screen reflecting mirrors 216, 218, and 234 are arranged in an odd number of units.

As shown in FIG. 33 Part A, the front-screen projector 224 emits the front-screen image 242 generated in the same direction as image front direction d1 of the front screen 210. Similarly, as shown in FIG. 33 Part B, the bottom-screen projector 225 emits the bottom-screen image 244 generated in the same direction as image front direction d2 of the bottom screen 212.

The front-screen image 242 emitted from the front-screen projector 224 is received by the front-screen-reflecting mirror 214. The incoming front-screen image 242 is reflected by the front-screen reflecting mirror 214, and projected onto the front screen 210. As shown in FIG. 34, the image direction of the front-screen image 242 projected onto the front screen 210 conforms to the image direction of the front-screen image 242 emitted from the front-screen projector 224 shown in FIG. 33 Part A. Accordingly, the image direction of the front-screen image 242 projected onto the front screen 210 conforms to image front direction d1 of the front screen 210.

The bottom-screen image 244 emitted from the bottom-screen projector 225 is received by the first bottom-screen reflecting mirror 216. The incoming bottom-screen image 244 is reflected by the first bottom-screen reflecting mirror 216, and is received by the second bottom-screen reflecting mirror 218. The incoming bottom-screen image 244 is reflected by the second bottom-screen reflecting mirror 218 and by the third bottom-screen reflecting mirror 234, and projected onto the bottom screen 212. As shown in FIG. 34, the image direction of the bottom-screen image 244 projected onto the bottom screen 212 conforms to the image direction of the bottom-screen image 244 emitted from the bottom-screen projector 225 shown in FIG. 33 Part B. Accordingly, the image direction of the bottom-screen image 244 projected onto the bottom screen 212 conforms to image front direction d2 of the bottom screen 212.

In this manner, a continuous image 247 that conforms to image front directions d1 and d2 of the screens is displayed on the front screen 210 and bottom screen 212.

With regard to the ninth embodiment, the same operative effects may be cited as the foregoing embodiments. In short, it is possible to narrow the projection space used for the plurality of refractions by reflecting mirrors of the images emitted from the projectors and for their projection onto the screens. Accordingly, it is possible to achieve a thinner and more compact image display device 202, and to reduce costs.

Furthermore, in the image display device 202 of the ninth embodiment, the front-screen reflecting mirror 214 is arranged in an odd number of units, and the bottom-screen reflecting mirrors 216, 218 and 234 are arranged in an odd number of units, with the result that the front-screen image 242 is reflected an odd number of times, and the bottom-screen image 244 is reflected an odd number of times, and respectively projected onto each screen 210 and 212. Accordingly, in the ninth embodiment, the front-screen image 242 and the bottom-screen image 244 are emitted in the same image direction. Consequently, the front-screen image 242 and the bottom-screen image 244 of the same direction are synthesized and projected, and a continuous image 247 is formed on the front screen 210 and the bottom screen 212.

Tenth Embodiment

A tenth embodiment is described below with reference to drawings.

In the foregoing first embodiment, the foregoing second embodiment, the foregoing fifth embodiment, and the foregoing eighth embodiment, the front-screen image was reflected once by the reflecting mirror, and projected onto the front screen, while the bottom-screen image was reflected twice by reflecting mirrors, and projected onto the bottom screen. In contrast, the tenth embodiment differs in that the front-screen image is reflected twice by reflecting mirrors, and projected onto the front screen, while the bottom-screen image is reflected three times, and projected onto the bottom screen. As the remaining basic configuration of the stereoscopic image display device is the same as that of the aforementioned eighth embodiment, shared components are given the same code numbers, and detailed explanation thereof is omitted.

Figure 35:
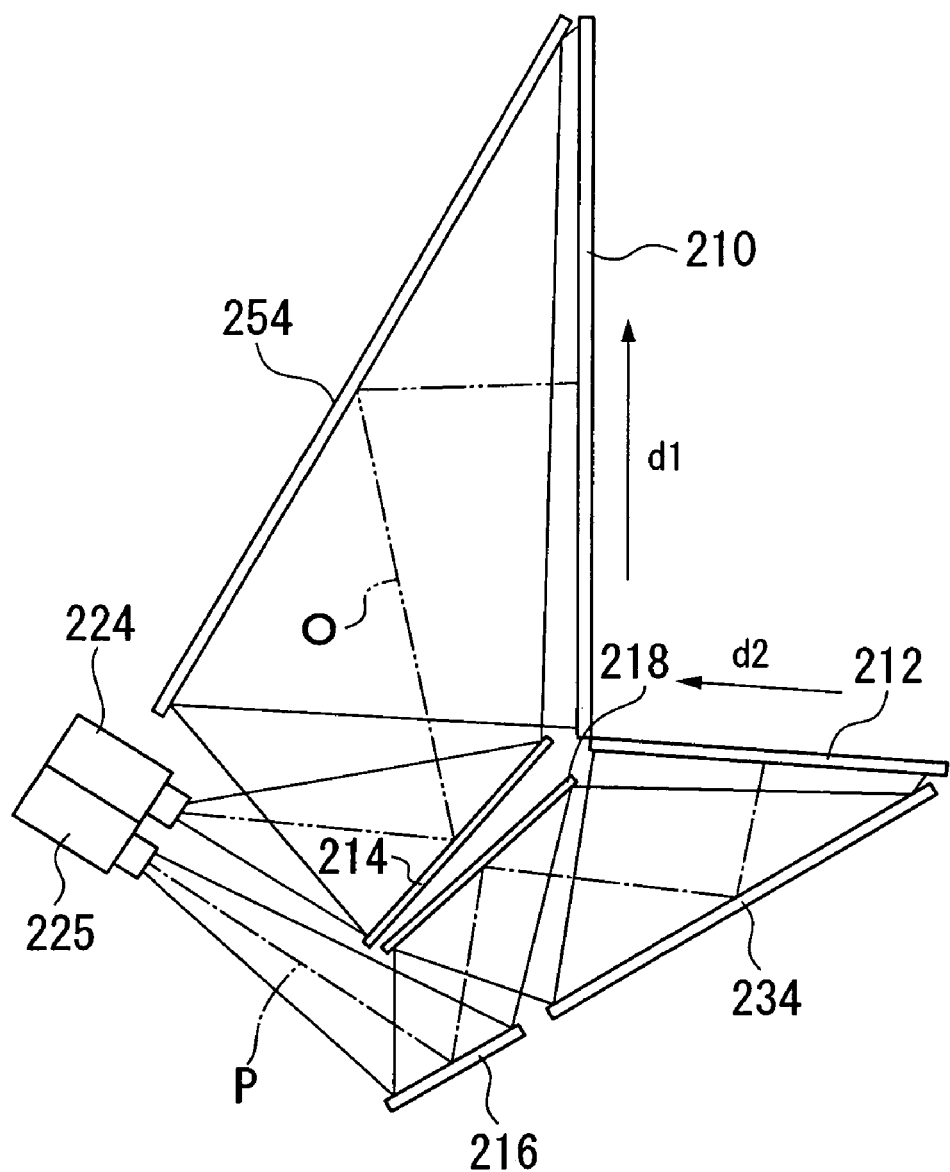
FIG. 35 is a cross-sectional view of the schematic configuration of the image display device pertaining to the tenth embodiment.

FIG. 35 is a cross-sectional view of a typical schematic configuration of the image display device 202 of the tenth embodiment. FIG. 36 Part A and Part B are typical plan views respectively showing the display region 236 of a liquid crystal light valve of the front-screen projector 224, and the display region 237 of a liquid crystal light valve of the bottom-screen projector 225. FIG. 37 is a view for the case where the front screen 210 and bottom screen 212 are viewed from the viewer side.

As shown in FIG. 35, the first front-screen reflecting mirror 214 (first reflecting section) is arranged in the emission direction of the front-screen image 242. The second front-screen reflecting mirror 254 (first reflecting section) is arranged in the reflection direction of the first front-screen reflecting mirror 214 behind the front screen 210. The first bottom-screen reflecting mirror 216 is arranged in the emission direction of the bottom-screen image 244. The second bottom-screen reflecting mirror 218 is arranged in the reflection direction of the first bottom-screen reflecting mirror 216. Furthermore, the third bottom-screen reflecting mirror 234 (second reflecting section) is arranged in the reflection direction of the second bottom-screen reflecting mirror 218 underneath the bottom screen 212. Consequently, in the tenth embodiment, the front-screen reflecting mirrors 214 and 254 are arranged in an even number of units, and the bottom-screen reflecting mirrors 216, 218 and 234 are arranged in an odd number of units.

As shown in FIG. 36 Part A, the front-screen projector 224 emits the front-screen image 242 generated in the same direction as image front direction d1 of the front screen 210. On the other hand, as shown in FIG. 36 Part B, the bottom-screen projector 225 emits the bottom-screen image 244 generated in an inverted manner in the direction opposite to image front direction d2 of the bottom screen 212.

The front-screen image 242 emitted from the front-screen projector 224 is received by the front-screen reflecting mirror 214. The incoming front-screen image 242 is reflected by the first front-screen reflecting mirror 214 and by the second front-screen reflecting mirror 254, and projected onto the front screen 210. As shown in FIG. 37, the image direction of the front-screen image 242 projected onto the front screen 210 conforms to the image direction of the front-screen image 242 emitted from the front-screen projector 224 shown in FIG. 36 Part A. Accordingly, the image direction of the front-screen image 242 projected onto the front screen 210 conforms to image front direction d1 of the front screen 210.

On the other hand, the bottom-screen image 244 emitted from the bottom-screen projector 225 is received by the first bottom-screen reflecting mirror 216. The incoming bottom-screen image 244 is reflected by the first bottom-screen reflecting mirror 216, and is received by the second bottom-screen reflecting mirror 218. The incoming bottom-screen image 244 is reflected by the second bottom-screen reflecting mirror 218 and by the third bottom-screen reflecting mirror 234, and projected onto the bottom screen 212. As shown in FIG. 37, the image direction of the bottom-screen image 244 projected onto the bottom screen 212 conforms to the image direction of the bottom-screen image 244 emitted from the bottom-screen projector 225 shown in FIG. 36 Part B. Accordingly, the image direction of the bottom-screen image 244 projected onto the bottom screen 212 conforms to image front direction d2 of the bottom screen 212.

In this manner, a continuous image conforming to the image front directions of the screens is displayed on the front screen 210 and bottom screen 212.

With regard to the tenth embodiment, the same operative effects may be cited as the foregoing embodiments. In short, it is possible to narrow the projection space used for the plurality of refractions by reflecting mirrors of the images emitted from the projectors and for their projection onto the screens. Accordingly, it is possible to achieve a thinner and more compact image display device 202, and to reduce costs.

Furthermore, in the image display device 202 of the tenth embodiment, the front-screen reflecting mirrors 214 and 254 are arranged in an even number of units, and the bottom-screen reflecting mirrors 216, 218 and 234 are arranged in an odd number of units, with the result that the front-screen image 242 is reflected an even number of times, and the bottom-screen image 244 is reflected an odd number of times, and respectively projected onto each screen 210 and 212. Accordingly, in the tenth embodiment, bottom-screen image 244 emitted from the bottom-screen projector 225 is inverted in advance, and emitted. Consequently, the front-screen image 242 and the bottom-screen image 244 of the same direction are synthesized and projected, and a continuous image 247 is formed on the front screen 210 and the bottom screen 212.

While preferred embodiments of the invention have been described and illustrated above, it should be understood that these are exemplary of the invention, and are not to be considered as limiting. Additions, omissions, substitutions, and other modifications can be made without departing from the spirit or scope. Accordingly, the invention is not to be considered as being limited by the foregoing description, and is only limited by the scope of the appended claims.

For example, in the foregoing embodiments, only images were projected from each projector onto each screen, but one is not limited thereto. Specifically, it is also possible to project parallax images having mutually different polarization directions relative to each screen from the respective projectors, and to realize images imparting a sense of presence by using polarizing spectacles.

Furthermore, it is also possible to alternately project right-eye images and left-eye images onto the screens from each projector, and to realize images imparting a sense of presence by using liquid crystal shutter spectacles or the like synchronized with this.

What is claimed is:

1. A stereoscopic image display device comprising:
   a first display section emitting right-eye images composed of first-screen right-eye images and second-screen right-eye images;
   a second display section emitting left-eye images composed of first-screen left-eye images and second-screen left-eye images;

a first reflecting section reflecting the first-screen right-eye images emitted from the first display section and the first-screen left-eye images emitted from the second display section;

a second reflecting section reflecting the second-screen right-eye images emitted from the first display section and the second-screen left-eye images emitted from the second display section;

a first screen onto which the first-screen right-eye images and the first-screen left-eye images that are reflected by the first reflecting section are projected, and on which parallax images composed of the first-screen right-eye images and the first-screen left-eye images are formed;

a second screen onto which the second-screen right-eye images and the second-screen left-eye images that are reflected by the second reflecting section are projected, and on which parallax images composed of the second-screen right-eye images and the second-screen left-eye images are formed; and a parallax image selection section having a right-eye transmission section transmitting only the first-screen right-eye images and the second-screen right-eye images among the parallax images projected onto the first screen and the second screen, and a left-eye transmission section transmitting only the first-screen left-eye images and the second-screen left-eye images among the parallax images projected onto the first screen and the second screen.

2. A stereoscopic image display device according to claim 1, wherein an optical path length of an optical axis of the first-screen right-eye images from a point of the emission of the first-screen right-eye images by the first display section to a point of the projection of the first-screen right-eye images onto the first screen via the first reflecting section is identical to an optical path length of an optical axis of the second-screen right-eye images from a point of the emission of the second-screen right-eye images by the first display section to a point of the projection of the second-screen right-eye images onto the second screen via the second reflecting section.

3. A stereoscopic image display device according to claim 1, wherein an optical path length of an optical axis of the first-screen left-eye images from a point of the emission of the first-screen left-eye images by the second display section to a point of the projection of the first-screen left-eye images onto the first screen via the first reflecting section is identical to an optical path length of an optical axis of the second-screen left-eye images from a point of the emission of the second-screen left-eye images by the second display section to a point of the projection of the second-screen left-eye images onto the second screen via the second reflecting section.

4. A stereoscopic image display device according to claim 1, further comprising:
a first polarizing plate converting the right-eye images emitted from the first display section to a polarized light of a first direction; and
a second polarizing plate converting the left-eye images emitted from the second display section to a polarized light of a second direction which intersects the first direction, wherein the right-eye transmission section of the parallax image selection section transmits the polarized light of the first direction, and the left-eye transmission section transmits the polarized light of the second direction.

5. A stereoscopic image display device according to claim 1, further comprising:

a first wavelength separation section transmitting a light of a first wavelength band among the right-eye images emitted from the first display section; and
a second wavelength separation section transmitting a light of a second wavelength band among the left-eye images emitted from the second display section, wherein the right-eye transmission section of the parallax image selection section transmits the light of the first wavelength band, and the left-eye transmission section transmits the light of the second wavelength band.

6. A stereoscopic image display device according to claim 1, wherein either a plurality of the first reflecting section or a plurality of the second reflecting section are provided and arranged behind the first screen and the second screen.

7. A stereoscopic image display device according to claim 1, wherein the first screen is arranged in front of the parallax image selection section, the second screen extends from the lower end of the first screen toward the parallax image selection section.

8. A stereoscopic image display device according to claim 1, wherein:
the first-screen right-eye images emitted from the first display section are reflected a first odd number of times or a first even number of times by the first reflecting section, and projected onto the first screen;
the second-screen right-eye images emitted from the first display section are reflected a second even number of times and projected onto the second screen, in the case where the first reflecting section conducts reflection the first odd number of times and conducts projection onto the first screen;
the second-screen right-eye images emitted from the first display section are reflected a second odd number of times and projected onto the second screen, in the case where the first reflecting section conducts reflection the first even number of times and conducts projection onto the first screen; and
the second-screen right-eye images emitted from the first display section are emitted in a vertically inverted manner relative to the first-screen right-eye images emitted from the first display section.

9. A stereoscopic image display device according to claim 1, wherein:
the first-screen left-eye images emitted from the second display section are reflected a first odd number of times or a first even number of times by the first reflecting section, and projected onto the first screen;
the second-screen left-eye images emitted from the second display section are reflected a second even number of times and projected onto the second screen, in the case where the first reflecting section conducts reflection the first odd number of times and conducts projection onto the first screen;
the second-screen left-eye images emitted from the second display section are reflected a second odd number of times and projected onto the second screen, in the case where the first reflecting section conducts reflection the first even number of times and conducts projection onto the first screen; and
the second-screen left-eye images emitted from the second display section are emitted in a vertically inverted manner relative to the first-screen left-eye images emitted from the second display section.

10. A stereoscopic image display device comprising:
a display section conducting time-division emission of right-eye images composed of first-screen right-eye images and second-screen right-eye images, and left-eye images composed of first-screen left-eye images and second-screen left-eye images;

a first reflecting section reflecting the first-screen right-eye images and the first-screen left-eye images that are emitted with time-division from the display section;

a second reflecting section reflecting the second-screen right-eye images and the second-screen left-eye images that are emitted with time-division from the display section;

a first screen onto which the first-screen right-eye images and the first-screen left-eye images reflected by the first reflecting section are projected with time-division;

a second screen onto which the second-screen right-eye images and the second-screen left-eye images reflected by the second reflecting section are projected with time-division; and an image selection section having a right-eye transmission section transmitting the right-eye images which are projected with time-division onto the first screen and the second screen, and a left-eye transmission section transmitting the left-eye images which are projected with time-division onto the first screen and the second screen.

11. A stereoscopic image display device according to claim 10, wherein an optical path length of an optical axis of the first-screen right-eye images from a point of the emission of the first-screen right-eye images by the display section to a point of the projection of the first-screen right-eye images onto the first screen via the first reflecting section is identical to an optical path length of an optical axis of the second-screen right-eye images from a point of the emission of the second-screen right-eye images by the display section to a point of the projection of the second-screen right-eye images onto the second screen via the second reflecting section.

12. A stereoscopic image display device according to claim 10, wherein an optical path length of an optical axis of the first-screen left-eye images from a point of the emission of the first-screen left-eye images by the display section to a point of the projection of the first-screen left-eye images onto the first screen via the first reflecting section is identical to an optical path length of an optical axis of the second-screen left-eye images from a point of the emission of the second-screen left-eye images by the display section to a point of the projection of the second-screen left-eye images onto the second screen via the second reflecting section.

13. A stereoscopic image display device according to claim 10, wherein either a plurality of the first reflecting section or a plurality of the second reflecting section are provided and arranged behind the first screen and the second screen.

14. A stereoscopic image display device according to claim 10, wherein the first screen is arranged in front of the image selection section, and the second screen extends from the lower end of the first screen toward the image selection section.

15. A stereoscopic image display device according to claim 10, wherein:

the first-screen right-eye images emitted from the display section are reflected a first odd number of times or a first even number of times by the first reflecting section, and projected onto the first screen;

the second-screen right-eye images emitted from the display section are reflected a second even number of times and projected onto the second screen, in the case where the first reflecting section conducts reflection the first odd number of times and conducts projection onto the first screen;

the second-screen right-eye images emitted from the display section are reflected a second odd number of times and projected onto the second screen, in the case where the first reflecting section conducts reflection the first even number of times and conducts projection onto the first screen; and the second-screen right-eye images emitted from the display section are emitted in a vertically inverted manner relative to the first-screen right-eye images emitted from the display section.

16. A stereoscopic image display device according to claim 10, wherein:

the first-screen left-eye images emitted from the display section are reflected a first odd number of times or a first even number of times by the first reflecting section, and projected onto the first screen;

the second-screen left-eye images emitted from the display section are reflected a second even number of times and projected onto the second screen, in the case where the first reflecting section conducts reflection the first odd number of times and conducts projection onto the first screen;

the second-screen left-eye images emitted from the display section are reflected a second odd number of times and projected onto the second screen, in the case where the first reflecting section conducts reflection the first even number of times and conducts projection onto the first screen; and the second-screen left-eye images emitted from the display section are emitted in a vertically inverted manner relative to the first-screen left-eye images emitted from the display section.

17. An image display device comprising:

a first display section emitting first-screen images;

a second display section emitting second-screen images;

a first reflecting section reflecting the first-screen images emitted from the first display section;

a second reflecting section reflecting the second-screen images emitted from the second display section;

a first screen onto which the first-screen images reflected by the first reflecting section are projected; and a second screen onto which the second-screen images reflected by the second reflecting section are projected, wherein the first reflecting section and the second reflecting section are provided behind the first screen and the second screen, and either a plurality of the first reflecting section or a plurality of the second reflecting section are provided, wherein:

the second screen extends in a direction perpendicular to the first screen, from the lower end of the first screen;

the first-screen images projected on the first screen and the second-screen images projected on the second screen are parallax images including right-eye images and left-eye images;

the first-screen images are either of the right-eye images or the left-eye images; and the second-screen images are the other of the right-eye images or the left-eye images, which are different from the first-screen images.

18. An image display device according to claim 17, wherein an optical path length of an optical axis of the first-screen images from a point of the emission of the first-screen images by the first display section to a point of the projection of the first-screen images onto the first screen via the first reflecting section is identical to an optical path length of an optical axis of the second-screen images from a point of the emission of the second-screen images by the second display section to a point of the projection of the second-screen images onto the second screen via the second reflecting section.

19. An image display device according to claim 17, wherein:
  the first-screen images emitted from the first display section are reflected a first odd number of times or a first even number of times by the first reflecting section, and projected onto the first screen;
  the second-screen images emitted from the second display section are reflected a second even number of times by the second reflecting section and projected onto the second screen, in the case where the first reflecting section conducts reflection the first odd number of times;
  the second-screen images emitted from the second display section are reflected a second odd number of times by the second reflecting section and projected onto the second screen, in the case where the first reflecting section conducts reflection the first even number of times; and
  the second-screen images emitted from the second display section are emitted in a vertically inverted manner relative to the first-screen images emitted from the first display section.

* * * * *